United States Patent
Hockey et al.

(10) Patent No.: US 11,869,005 B2
(45) Date of Patent: Jan. 9, 2024

(54) SYSTEM AND METHOD LINKING TO ACCOUNTS USING CREDENTIAL-LESS AUTHENTICATION

(71) Applicant: Plaid Inc., San Francisco, CA (US)

(72) Inventors: William Hockey, San Francisco, CA (US); Nick Agin, San Francisco, CA (US); Baker Shogry, San Francisco, CA (US); Samir Naik, San Francisco, CA (US); Jonathan Chao, San Francisco, CA (US)

(73) Assignee: Plaid Inc., San Francisco, CA (US)

( * ) Notice: Subject to any disclaimer, the term of this patent is extended or adjusted under 35 U.S.C. 154(b) by 258 days.

(21) Appl. No.: 17/024,332

(22) Filed: Sep. 17, 2020

(65) Prior Publication Data
US 2021/0081947 A1    Mar. 18, 2021

Related U.S. Application Data

(60) Provisional application No. 62/901,266, filed on Sep. 17, 2019.

(51) Int. Cl.
*G06Q 20/40* (2012.01)
*H04L 9/40* (2022.01)

(52) U.S. Cl.
CPC ..... *G06Q 20/4014* (2013.01); *H04L 63/0838* (2013.01)

(58) Field of Classification Search
None
See application file for complete search history.

(56) References Cited

U.S. PATENT DOCUMENTS

| | | | |
|---|---|---|---|
| 7,577,554 B2 | 8/2009 | Lystad et al. | |
| 9,231,942 B1 | 1/2016 | Pinkerton et al. | |
| 9,262,771 B1 | 2/2016 | Patel | |
| 9,760,645 B1 | 9/2017 | Park | |
| 10,142,307 B1 * | 11/2018 | Page | H04L 63/08 |

(Continued)

FOREIGN PATENT DOCUMENTS

WO    2018017767 A1    1/2018

OTHER PUBLICATIONS

U.S. Appl. No. 17/395,900, filed Aug. 6, 2021, William Hockey.

(Continued)

*Primary Examiner* — Kirsten S Apple
*Assistant Examiner* — Matthew Cobb
(74) *Attorney, Agent, or Firm* — Harrity & Harrity, LLP

(57) ABSTRACT

A system and method for linking to accounts using credential-less authentication that includes: within a first application context at an account-linking computing service: receiving a request to establish an account link, establishing the account link to a user account of an account service using user credentials, and receiving user identifying information of the first application context and storing the user identifying information in association with the account link; and within a second application context at the account-linking computing service: receiving user identifying information of the second application context, searching and identifying a candidate account link using the user identifying information of the second application context, verifying eligibility for access to the account link, and permitting access to the account link upon successful verification of eligibility.

20 Claims, 46 Drawing Sheets

(56) References Cited

U.S. PATENT DOCUMENTS

| | | | |
|---|---|---|---|
| 10,250,612 B1* | 4/2019 | Raposa | H04L 63/108 |
| 10,452,523 B1 | 10/2019 | Vijayalekshmi | |
| 11,120,158 B2* | 9/2021 | Hockey | G06Q 40/12 |
| 2005/0268107 A1* | 12/2005 | Harris | H04L 63/0853 |
| | | | 713/182 |
| 2005/0273773 A1 | 12/2005 | Gold et al. | |
| 2008/0195534 A1 | 8/2008 | Landis et al. | |
| 2008/0276242 A1 | 11/2008 | Taniguchi et al. | |
| 2008/0288621 A1 | 11/2008 | Snell et al. | |
| 2009/0254476 A1 | 10/2009 | Sharma et al. | |
| 2012/0030125 A1 | 2/2012 | RamaKrishnanNair | |
| 2012/0150742 A1 | 6/2012 | Poon et al. | |
| 2013/0212234 A1 | 8/2013 | Bartlett et al. | |
| 2014/0081667 A1 | 3/2014 | Joao | |
| 2014/0215595 A1 | 7/2014 | Prasad et al. | |
| 2014/0330732 A1 | 11/2014 | Grignon | |
| 2015/0066805 A1 | 3/2015 | Candee et al. | |
| 2015/0249660 A1 | 9/2015 | Bailey et al. | |
| 2015/0317613 A1* | 11/2015 | Clark | G06Q 20/12 |
| | | | 705/44 |
| 2015/0350485 A1 | 12/2015 | Kamada | |
| 2016/0028715 A1 | 1/2016 | Sivashanmugam et al. | |
| 2016/0080381 A1 | 3/2016 | Hall | |
| 2016/0350747 A1 | 12/2016 | Pruthi et al. | |
| 2017/0041963 A1 | 2/2017 | Edge | |
| 2017/0068954 A1* | 3/2017 | Hockey | H04L 9/3228 |
| 2017/0098294 A1 | 4/2017 | Kim et al. | |
| 2018/0005316 A1 | 1/2018 | Robbin et al. | |
| 2018/0034811 A1 | 2/2018 | Meng | |
| 2018/0039988 A1 | 2/2018 | Gupta | |
| 2018/0064609 A1 | 3/2018 | Hines | |
| 2018/0067631 A1 | 3/2018 | Thiercelin et al. | |
| 2018/0095997 A1 | 4/2018 | Beveridge et al. | |
| 2018/0295514 A1* | 10/2018 | Brown | H04W 12/069 |
| 2019/0012647 A1 | 1/2019 | Bouey et al. | |
| 2019/0102574 A1 | 4/2019 | Roberts et al. | |
| 2019/0200227 A1* | 6/2019 | Woodward | H04M 7/126 |
| 2019/0207771 A1 | 7/2019 | Hecht et al. | |
| 2019/0278928 A1 | 9/2019 | Rungta et al. | |
| 2019/0318122 A1 | 10/2019 | Hockey et al. | |
| 2019/0370615 A1 | 12/2019 | Murphy et al. | |
| 2020/0134001 A1 | 4/2020 | Kantamsetty et al. | |
| 2020/0211002 A1 | 7/2020 | Steinberg | |
| 2021/0182850 A1 | 6/2021 | Morse et al. | |
| 2022/0028012 A1 | 1/2022 | Hockey et al. | |

OTHER PUBLICATIONS

U.S. Appl. No. 17/125,544, filed Dec. 17, 2020, Eric Morse.
Martin Skara, Reconstructing Custom Fragments of google Knowledge Graph on the fly? (Year:2020).
Extended European Search Report for Application No. EP20865318.8, dated Jul. 19, 2023, 7 pages.

* cited by examiner

Proxy Instance User A Bank 1 121

User: "User A"
Institution: "Bank 1 141"
Credentials: <User A Credentials Bank 1>
Properties: <User A Properties Bank 1>

Proxy Instance User A Bank 2 122

User: "User A"
Institution: "Bank 2 142"
Credentials: <User A Credentials Bank 2>
Properties: <User A Properties Bank 2>

Proxy Instance User B Bank 2 123

User: "User B"
Institution: "Bank 2 142"
Credentials: <User B Credentials Bank 2>
Properties: <User B Properties Bank 2>

FIGURE 12

Dev Account B Proxy Instance User A Bank 1 421

Dev Account B User: "User A"
Institution: "Bank 1 141"
Credentials: <User A Credentials Bank 1>
Properties: <User A Properties Bank 1>

Dev Account B Proxy Instance User A Bank 2 422

Dev Account B User: "User A"
Institution: "Bank 2 142"
Credentials: <User A Credentials Bank 2>
Properties: <User A Properties Bank 2>

Dev Account B Proxy Instance User B Bank 2 423

Dev Account B User: "User B"
Institution: "Bank 2 142"
Credentials: <User B Credentials Bank 2>
Properties: <User B Properties Bank 2>

Dev Account A Proxy Instance User C Bank 1 424

Dev Account A User: "User C"
Institution: "Bank 1 141"
Credentials: <User C Credentials Bank 1>
Properties: <User C Properties Bank 1>

Dev Account A Proxy Instance User C Bank 2 425

Dev Account A User: "User C"
Institution: "Bank 2 142"
Credentials: <User C Credentials Bank 2>
Properties: <User C Properties Bank 2>

FIGURE 14B

NEW USER WITH STATE SUBMIT

```
\curl -X POST https://bankAPI.example/auth \
  -d client_id={CLIENT_ID} \
  -d secret={SECRET} \
  -d credentials='{
    "username":"plaid_test",
    "password":"plaid_good",
    "state":"tx"}' \
  -d type={TYPE}
```

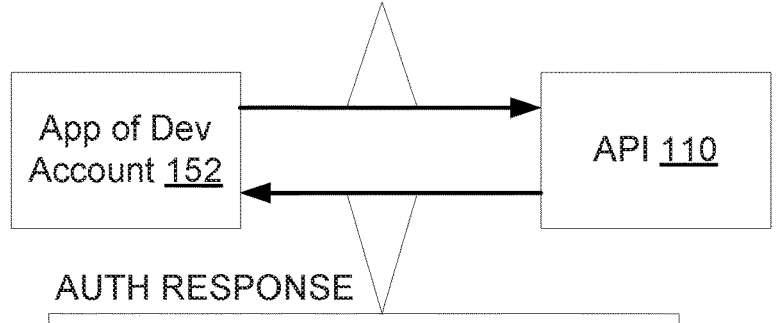

AUTH RESPONSE

```
http code 200
{"accounts": [{
  "_id": "52db1be4be13cbXXXXXXXXXX",
  "_item": "52af631671c3bdXXXXXXXXXX",
  "_user": "52af630f71c3bdXXXXXXXXXX",
  "balance": {
    "available": 1400,
    "current": 1230
  },
  "meta": {
    "name": "My Savings",
    "number": "31015"
  },
  "numbers": {
    "routing": "0000000",
    "account": "1111111",
    "wireRouting": "2222222"
  },
  "institution_type": "chase",
  "type": "depository",
  "status": "normal",
},
...], "access_token": "xxxxx"}
```

FIGURE 17

NEW USER WITH STATE SUBMIT

```
\curl -X POST https://bankAPI.example/transaction \
 -d client_id={CLIENT_ID} \
 -d secret={SECRET} \
 -d transaction='{
   "withdrawal_account_token":"jasdlkfjio34i29",
   "deposit_account_token":"Bjsklaidf9djanjk",
   "amount":"515.15"}' \
 -d type={TYPE}
```

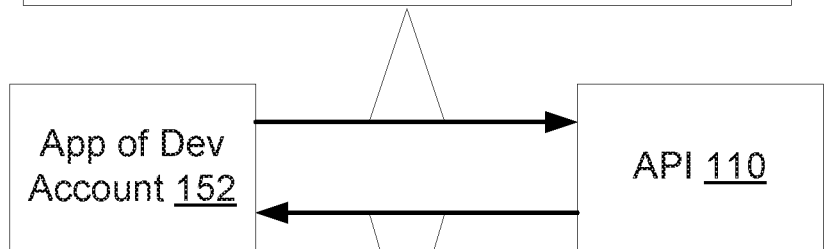

AUTH RESPONSE

```
http code 200
{"transaction": [{
  "_id": "52db1be4be13cbXXXXXXXXXX",
  "status": "processing",
},
...], "transaction_access_token": "xxxxx"}
```

FIGURE 18

Success!

You have completed linking. View/Select your accounts below.

— 2010

Savings – 0001
Account: 000002
Routing: 000003
(Use account for payment with this merchant) — 2020      $1,200

Checking – 0002
Account: 000002
Routing: 000003
(Use account for payment with this merchant)      $1,000

Premier Checking – 0003
Account: 000002
Routing: 000003
(Use account for payment with this merchant)      $7,000

Credit Card – 0004
(Use account for payment with this merchant)      ($2,200)

Total Assets      $7,000

FIGURE 30A

Account De-authorization ~2030

The following accounts are linked with this merchant:

Checking – 0002   $1,000
Account: 000002
Routing: 000003
Current permissions:
 - One transaction per month
 - Limit of $200 per transaction ( De-authorize this account ) ~2040

...

( De-authorize all accounts ) ~2042

FIGURE 30B

Success!

You have completed linking. View/Select your accounts below.

Savings – 0001  — 2052  *Authorize "App A" to access data associated with this account*  $1,200
Account: 000002
Routing: 000003

Checking – 0002  *Authorize "App A" to access data associated with this account*  $1,000
Account: 000002
Routing: 000003

Premier Checking – 0003  *Authorize "App A" to access data associated with this account*  $7,000
Account: 000002
Routing: 000003

Credit Card – 0004  *Authorize "App A" to access data associated with this account*  ($2,200)

Total Assets  — 2054  *Authorize "App A" to access data associated with all accounts*  $7,000

SYSTEM AND METHOD LINKING TO ACCOUNTS USING CREDENTIAL-LESS AUTHENTICATION

CROSS-REFERENCE TO RELATED APPLICATIONS

This application claims the benefit of U.S. Provisional Application No. 62/901,266, filed on 17 Sep. 2019, which is incorporated in its entirety by this reference.

TECHNICAL FIELD

There are many barriers to accessing and interacting with the financial information and services of online banking and financial accounts. Security, while extremely important is one barrier. Ease of integrating with other systems is another barrier.

Security around access to online banking and financial accounts are vitally important. Failure to provide secure authentication can result in severe financial repercussions for individuals and businesses. While critically important, authentication and the process through which a user gains access to account information and functionality can serve as a preventative barrier to accessing their account.

There are several applications and services that have been introduced in recent years that provide new ways of interacting with financial accounts. Adoption of such applications and services however can be limited because of the steps required to begin seeing the full utility of such applications and services. For example, upon downloading a new financial app to a phone, a user may have to first create a new user account for that app, enter profile information for that app, and then one-by-one authenticate and grant the app access to various financial accounts. This process would also typically be repeated for each new app or service used by the user. Because such authentication processes are involved and sometimes complicated (e.g., entering unique authentication credentials for each account), repeating them for each new application or service can be such a severe barrier that it results as a deterrent for using any new application or service.

This invention relates generally to the field of digital account management, and more specifically to a new and useful system and method for linking to accounts using credential-less authentication.

BACKGROUND

Thus, there is a need in the digital account management field to create a new and useful system and method for linking to accounts using credential-less authentication. This invention provides such a new and useful system and method.

BRIEF DESCRIPTION OF THE FIGURES

FIG. 12 illustrates aspects of some example proxy instances, according to an embodiment;

FIG. 14B illustrates aspects of some example proxy instances, according to an embodiment;

FIG. 17-18 illustrate examples of API request and response flows of the system, according to an embodiment;

FIGS. 29A-29J and 30A-30C illustrate example interactive user interfaces of the system, according to various embodiments.

DESCRIPTION OF THE EMBODIMENTS

Figure 1:
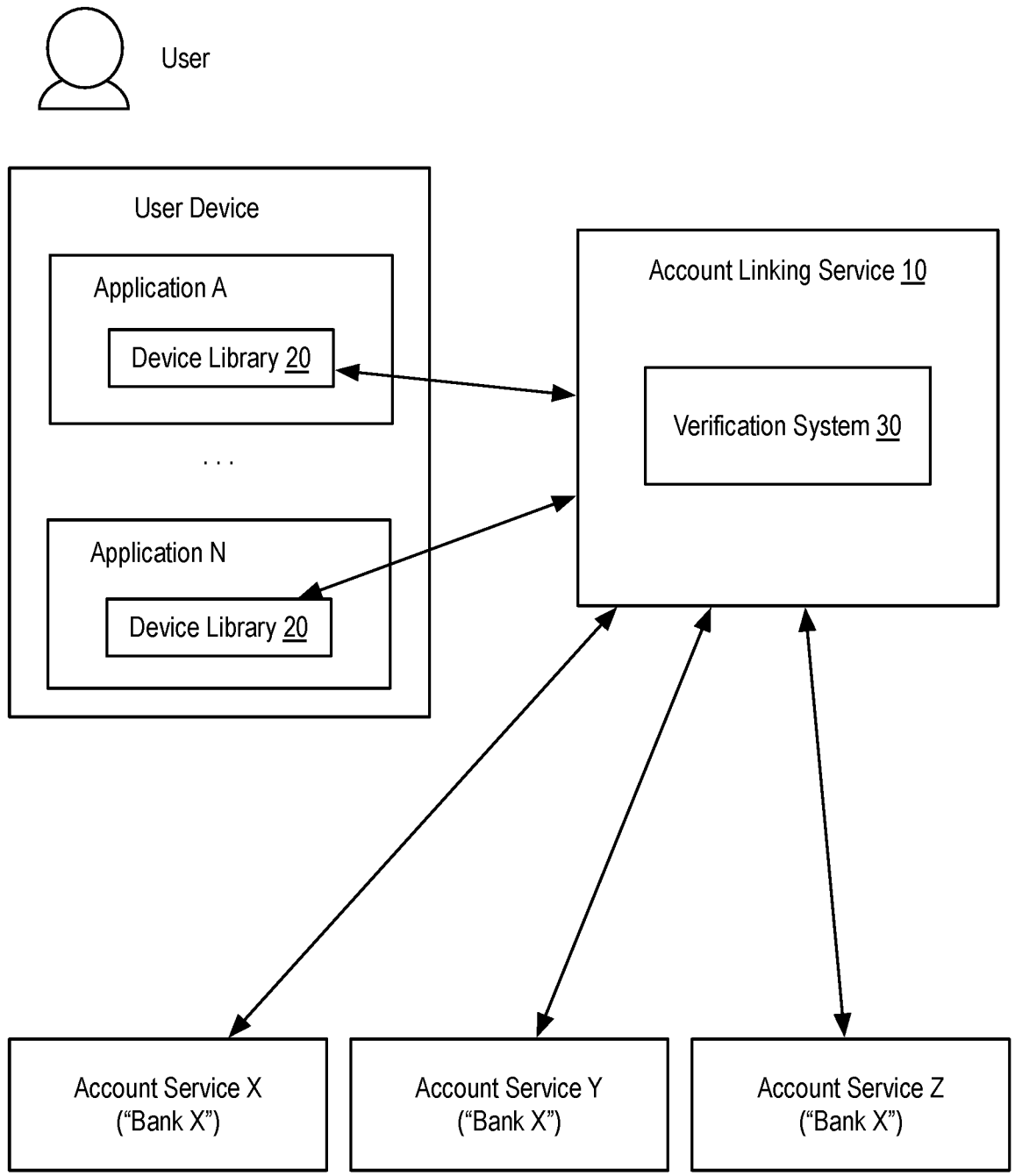
FIG. 1 is a schematic representation of a first system.

The following description of the embodiments of the invention is not intended to limit the invention to these embodiments but rather to enable a person skilled in the art to make and use this invention.

1. Overview

A system and method for linking to accounts using credential-less authentication provide a mechanism through which an account-linking service can grant an application/service access to a user account of an account service. The system and method are preferably used in connection with an account-linking service that is used across multiple digital applications/services and is used in accessing user accounts on various account services. The system and method can preferably grant access to one or more previously linked accounts of a user across different application/ service scopes. In this way, a user may initially provide user account credentials to enable an account-linking service to grant a first application access to an account service, and then when a second application initiates accessing the same account service on behalf of a user, the account-linking service may grant access to the account service using an authentication process that does not depend on retrieving the account credentials. The system and method may provide a form of an enhanced returning user experience and variation of credential-less authentication that does not rely on collection of user's primary account credentials for the particular account service.

Herein, credential-less authentication characterizes the procedure wherein after initially providing account credentials and authenticating with an account service, access to the user account can be authenticated without collecting the account credentials of the account service (e.g., the primary username and password). Account credentials or more specifically user authentication credentials will generally include username and password, but may include other necessary information used during an authentication process. In some variations, alternative forms of authentication such as using a one-time passcode, passcode verification, a user challenge, or other authentication steps may be used. The credential-less authentication is preferably used in enhancing and improving the user experience of a returning user that had previously submitted user account credentials of an account service in a different application/service scope.

Accordingly, the system and method function to streamline granting an application access to a previously linked account of a third party account service. The system and method can preferably establish a persistent account-link that can be seamlessly and securely transferred across multiple vendors and applications. The system and method is specifically applied to the technological problem of authenticating a user accessing an application or service from a client computing device. For example, the system and method can be used where a user may establish authentication of a user account with an account service within the context of a first installed $3^{rd}$ party application on a phone and then use the system and method to facilitate streamlined authentication of the same account with the account service within the context of a second installed $3^{rd}$ party application. The system and method is preferably implemented with an account-linking service acting as a intermediary computing service that manages interactions with application and account services as distinct communication legs. The system and method may similarly be applied to other types of computing devices and/or client devices such as with browser-accessed applications and services.

In a preferred application, the system and method can be used in connecting with a financial service that facilitates access to financial account information and functionality. In the field of financial technology applications, the account-linking service may be used across a number of different applications and services to facilitate accessing and interacting with banking and financial accounts of a user of the different applications. More specifically, different user applications will make use of the account-linking service to facilitate accessing a bank account. The system and method of preferred embodiments can augment the process through which a user authenticates with the particular bank account by providing alternative authentication mechanisms once a user has established an account link to a bank account with the account-linking service.

In one example scenario illustrating use of the system and method, a user may have two different applications: application A and application B, and the user may have an account with at least one external account service: Bank Account X. When initially using application A, the user may create an account for the application A and then proceed to link Bank Account X to application A. Application A may use an account-linking service to facilitate access to Bank Account X. As such the account-linking may collect account credentials from the user and complete authentication with the bank system to access Bank Account X. Application A may use access to Bank Account X for any suitable purpose such as reporting spending trends. At a later point, the user may then use application B that also uses the application-linking service to access bank account information on behalf of a user. Instead of needing to fully complete the authentication with the bank system a second time to access Bank Account X, the application-linking service may be able to securely verify eligibility with credential-less authentication and grant use of the previously linked Bank Account X to Application B.

The system and method may additionally or alternatively be used in other fields of use. The system and method may be particularly useful for API service providers that are used by one set of applications/services to access accounts of a second set of services.

The system and method is preferably used to alter the user experience of authenticating and granting access to various account services within different user applications/services.

In one variation, the system and method may additionally or alternatively be used to enable a new form of access to payment channels, and thereby creating new tools to facilitate making and receiving payments.

In another variation, the system and method may additionally be used in augmenting the security of third-party account services. For example, a supplemental layer of multi-factor authentication may be implemented to enhance the security of accessing account service that lacks such authentication procedures.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

As one potential benefit, the system and method can facilitate an enhanced user experience. The system and method may remove the need for a user to repeatedly provide user account credentials across multiple applications to grant all those applications access to a particular third-party user account. In many cases, a user will want to link multiple accounts, and so the ease with which accounts may be linked after the initial credential based linking can significantly improve the user experience.

As another potential benefit, the system and method can enhance the security of granting access to accounts by enabling authentication procedures based on alternative signals that are less likely to be compromised than a username and password combination. Furthermore, the system and method promote a technological design that encourages users to use secure and unique account credentials. When a user is required to repeatedly enter security credentials, some users will opt to use more easily remembered and entered credentials (e.g., using the same password across account services). By enabling a novel approach to authentication across applications, the system and method may reduce this source of user frustration, which may lead to users employing more secure account credentials. In some variations, the system and method may be used to augment and enhance the authentication process. For example, in some instances, a third party account service without two factor authentication may be enhanced by the account-linking service injecting a form of multi-factor authentication.

As another potential benefit, the system and method may enable such easy and secure access to financial account services that use of direct access to these financial account services may be used as alternative payment and financial tools by various digital tools.

2. System

As shown in FIG. 1, a system for linking to accounts using credential-less authentication can include an account-linking service 10, a device library 20, and a verification system 30. During operation, portions of the system preferably interact with an application (e.g., application clients and/or application servers), a user computing device, and/or a third party account service.

The system is preferably implemented wherein the account-linking service 10 is integrated into one or more applications/services that are used by various users. The users will generally have user accounts on one or more third-party account services. The applications/services use the account-linking service 10 to, on behalf of a user, gain access to user accounts on the third-party account services.

In general, the system is used when there are multiple applications making use of the account-linking service 10. In one exemplary scenario, those applications may be operable on the same computing device. For example, a user may have multiple native applications installed on a personal computing device such as a smart phone. Furthermore, those applications may be sandboxed within the operating system of the computing device such that data access and integration between any two applications is restricted or even prevented. For example, secure data of one application may be set to have unreadable permissions for other native applications. In another exemplary scenario, applications may be operable and accessible through a network connected client application such as a web browser or the like. For example, the system may be used across multiple web applications offered by different websites. In general, the applications operate across application clients (operable on a user device) and application servers or other network-accessible computing resources that perform backend computation and server-side interactions.

Herein, an application/service characterizes any suitable computer system performing some function. An application will generally be or include a user application client operable on a computer or personal computing device such as a smart phone, tablet, smart wearable device, or any suitable computing device. A service (e.g., software service) will generally be a computer-based system accessible in some manner to facilitate computational-based services. For example, a service may be a service accessed programmatically using an application programming interface (API). In many instances, a user application will operate in connection with one or more cloud based systems. The application/service herein may be more concisely referred to as just an "application" but one knowledgeable in the art can appreciate that a software service or any suitable software system or collection of computing systems may alternatively operate in a similar role.

As described above, the system is preferably used in the financial technology space. As such, the applications can include a variety of financial-related user applications. Some examples, of financial user applications can include expense management applications, spending tracking, lending and loan management tools, financial account consolidation, digital payment tools, payment of financial rewards and point management tools, and/or other suitable types of financial applications. In general, the system does not have to be limited by the type of application, and the system can be employed across a diversity of types of applications.

In some variations, users may have user accounts or profiles for the applications. Herein, such user accounts are described as user application accounts to distinguish from user accounts on external account services. In some instances, user application account information such as a phone number, email address, payment records, account authentication information, and the like may be used as input to the verification system 30.

In some preferred applications of the system, the system is used when two or more applications are operated on a shared device. For example, the system may be used to facilitate credential-less authentication to link a user account to an third party account service for a second application when the user account has previously been linked for a first application installed and operated on the same device.

As mentioned, a device is preferably a computing device such as a personal computing device like a desktop computer, a laptop, a tablet, a smart phone, a smart wearable, an alternative smart device (e.g., a car computer system, etc.), and/or any suitable computing device. In some instances, the device may make use of a cellular data connection wherein the device includes a subscriber identity module (SIM) card. Additionally or alternatively, the system may include a Wi-Fi, ethernet or other suitable type of network connection. The system may additionally integrate with any suitable type of security element or service. The system may additionally integrate with device profile information in generating a device fingerprint, which may be used as an authentication signal when verifying qualifying credential-conditions for authentication.

An account service as used herein characterizes some digital service different from the application and the account-linking service 10. The system may involve one or more account services. An account service can include an account system that manages user accounts. The account service is preferably a digital network accessible computing service that hosts data of generally a plurality of user accounts. An account service preferably has a digital process for authentication of user credentials when permitting access to a user accounts data. As a digital service, an account service includes a network accessible computing service to which data communication requests can be directed and to which, in response, the computing services outputs structured data and stored information associated with a user account. In some varieties of account services, the account service may be presented as an account portal accessible through a website. In other varieties of account services, the account service may be a private backend server infrastructure used by a native applications operating a client device. This private backend server may use private APIs not exposed for general consumption. In another varieties of account services, the account service may include an exposed/public API such that data of a user account can be directly accessed from the account service using programmatic channel of the API.

In the preferred financial technology use case, the account services can include proprietary and external financial services. The account services can include banking systems, credit card systems, loan provider systems, investment systems, cryptocurrency or alternative currency systems, and/or other suitable financial systems on which users have user accounts to access personal information. In some instances, a user account may only provide access to information related to the user such as account profile information, account summary information, account history information like transaction records, account alerts and notifications, and/or other suitable type of information. Additionally or alternatively a user account may provide access to various actions that can be performed such as initiating a payment to an outside entity or depositing money (e.g., a check).

The account service preferably authenticates a user account using a set of user credentials such as a username and password. The account service preferably includes an exposed endpoint for receiving credentials of a user account. Additional credentials or authentication procedures may additionally be used. For example, two factor authentication like an SMS/message code, one-time password, digital certificate, biometric verification, and/or other forms of authentication may be used in authenticating an account with an account service. The account service may additionally include an authentication module that is configured with an authentication process for guiding users through multi-step authentication flow.

An account service may or may not offer a public or private API for interacting with the account service. The account-linking service 10 in either scenario can provide a normalized and consistent mechanism whereby multiple account services may be accessed by an application.

The account-linking service 10 functions as a digital service that provides programmatic access to user account services. The account linking service is preferably a network-accessible computing service (e.g., a computing platform). The account-linking service 10 preferably includes computing devices with one or more computer readable mediums (e.g., non-transitory computer-readable mediums) storing instructions that, when executed by one or more computer processors, cause computing device to perform or coordinate operations related to the methods described herein.

Applications preferably integrate with the account-linking service 10 to gain access to a user's user accounts of various account services. The account link can enable access to information of a third party account service or to functionality of a third party account service. An application can use a device library 20 (e.g., a SDK of the account-linking service 10), use an API of the account-linking service 10, and/or use an alternative integration mechanism to integrate functionality of the application with the account-linking service 10. When used to link to a bank account of a user, the account-linking service 10 may facilitate access to transaction data (e.g., transaction logs with descriptions, merchant names, time, and amounts, etc.). The account-linking service 10 may additionally or alternatively facilitate performing actions like initiating a transaction (e.g., inbound or outbound deposits) and/or any suitable interaction with the bank account.

The account-linking service 10 can function as an intermediary proxy service facilitating interaction between applications and external account services like bank account systems. The account-linking service 10 preferably establishes access to a user account by using user credentials and authentication input from a user and thereby instantiates a linked account for that user for that particular account service.

The account-linking service 10 can preferably provide a normalized application and/or user facing interface. The account-linking service 10 is preferably normalized in the sense that the underlying programmatic interface for the application and the user interface for the user to an account service is abstracted away, and made substantially consistent across different account services. From a development standpoint, an application can gain access to and interact with one account service in a substantially similar manner to accessing and interacting with another account service because of normalized interface of the account-linking service 10 for interacting with different account services. Similarly, a user establishing an account link for an application is presented with a user interface that is substantially consistent across different account services.

The account-linking service 10 is preferably used to provide outside developers with an accessible interface to account services. As such, the account-linking service 10 is preferably a multi-tenant system that allows numerous accounts (i.e., application or developer accounts) to share use of the system. An application is preferably associated with one such application account within the account-linking service 10. The account-linking service 10 may provide credentials used in authenticating the identity of the application. Multiple different instances of the application can use the application account to establish account links of different end users with their respective account services.

The account-linking service 10 can provide an interface into a variety of information and action resources for an account service. Information relating to a user account is preferably accessible through querying particular API resources. For example, a list of transactions and information about each individual transaction may be accessible through different API calls. Information can additionally relate to account summary information, account details such as address and contact information, information about other parties such as the entities involved in a transaction, and/or any suitable information. Access to a linked account of the account-linking service may additionally be used to trigger or facilitate performing some action. For example, an API call may be used in transferring money, updating account information, setting up alerts, or performing any suitable action. Those skilled in the art will appreciate that such exemplary API features that any suitable API feature possibilities and semantic architecture may be used.

In one variation, the account-linking service 10 leverages exposed APIs of the various account services to access user accounts on the respective account services, thereby establishing an account link for the user and accessing the account service on behalf of the user.

In another variation, the account-linking service 10 includes an application proxy system. A virtualized "image" or digital simulation of an application instance is maintained in the application proxy system and used to access an unexposed API of the institution.

The application proxy system preferably manages a simulation of a first-party software application accessing an institution. The application proxy system operates in cooperation with one or more institution interface modules to establish a data model and/or a data image that acts as a virtualized or simulated application instance (also referred to herein as an "application proxy instance," "proxy instance," "virtualized instance," "simulated instance," and/or the like). From the perspective of the account service, the proxy instance appears as a first-party application (e.g., a bank application) installed on a physical user device that is being used by a user. In other words, the requests received from the proxy instance are treated like requests from a first-party mobile app, desktop app, or web-based application of the user.

The application proxy system may store and maintain a plurality of application proxy instances. The proxy instances may include configuration settings and properties that, when used according to a defined institution interface, will appear as requests from first-party applications of the account service. A different proxy instance may be created and maintained for each user account-institution pair. A given user may have multiple user accounts with different account services. A proxy instance may include a set of properties that can be used to authenticate the proxy instance with the account service. The application proxy system provides a method to programmatically create a proxy instance for a user. The user may provide some account credentials that can be used in an initial registration of the proxy instance with the non-public or public API of the institution. The proxy instance may be characterized as a set of properties that can be stored and maintained. Some of those properties may be automatically generated, may be provided from the institution during negotiating registration, may be properties of the application that is being simulated, and/or may include any suitable identifying and authenticating information. The properties may include a unique user identifier code, an authentication token, a MAC address, or any suitable information. When a request is made to a bank on behalf of a user, the properties of the proxy instance may be invoked to gain access to the institution on behalf of the associated user.

An institution interface module functions to model the internal interface of at least one application with an account service. An institution interface module may be established for each account service with which the system can interface. For example, an institution interface module may exist for each bank and/or credit card company that is available in the system. The institution interface module may include a set of rules and processes of a particular institution. The institution interface module may include a proxy sub-module that defines how the institution recognizes and/or authenticates a particular application. Some banks may depend on the MAC address of a device, some may depend on asymmetric cryptography tokens, and others may generate encrypted tokens. The proxy sub-module is used in establishing the proxy instance information. The institution interface module can additionally include institution protocol sub-module, which defines a mapping between provided API functionality and the form and mode of communication with the external account service. The institution protocol sub-module can define the headers, body, and other properties of messages sent to the associated account service. The protocol sub-module may additionally define how data should be processed to form that message. In some cases, the data may be encrypted in a standard or proprietary format, which the protocol sub-module can define. Additionally, the protocol sub-module can define the communication flow to fulfill a request. In some cases, multiple requests may need to be made to complete a request objective. Other aspects of interacting with an interface of an external account service may additionally be built into the institution interface module such as multi-factor authentication rules.

An institution interface module may be constructed based on use of an actual first-party application. In one implementation, the institution interface is a set of instructions stored on a computer-readable medium that when executed by one or more processors cause the institution interface to facilitate interactions with one or more account services in response to directives from the account-linking service. For example, communication of, and/or source code of, the first-party application can be parsed and analyzed to establish some or all of an institution interface module. In some implementations, source code of a first-party application of an external institution is parsed and analyzed to establish some or all of an institution interface module for the external institution. In some implementations, communication between an external institution and a first-party application of the external institution is parsed and analyzed to establish some or all of an institution interface module for the external institution.

The account-linking service 10 may include and/or operate as an API service wherein an application communicatively interfaces with the account-linking service 10. The API service is preferably a RESTful API but may alternatively be any suitable API such as graphQL, SOAP, or custom protocol. The RESTful API works according to an HTTP request and response model. HTTP requests (or any suitable request communication) to the system preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service 1o can include various resources, which act as endpoints that act as a mechanism for specifying requested information or requesting particular actions. The resources can be expressed as URI's or resource paths. The RESTful API resources can additionally be responsive to different types of HTTP methods such as GET, PUT, POST and/or DELETE.

In one exemplary implementation, an API service may be used to programmatically add a user, complete authentication, access transaction information, and other actions. For example, an application may POST to a "/connect" REST API resource to authenticate a user; if the institution includes multi-factor authentication, then a "/connect/step" resource can be submitted to complete multi-factor authentication credentials; and then performing a GET on the "/connect" resource can access transactional data. The API may additionally include informational resources to access information about entities involved in transactions. For example, the API may allow a particular business resource to be accessed to obtain contextual information about the business such as name, location, and classification.

The device library 20 functions to facilitate integration of an application and the account-linking service 10. The device library 20 is preferably offered as a software development kid (SDK). The SDK may include user interface elements that provide user interface views that guide user interaction of a user when establishing or managing access to a user account of an account service. More specifically, the SDK may a set of instructions stored on a computer-readable medium (e.g., a non-transitory computer-readable medium) that when executed by one or more processors define the presentation and/or interaction of user interface elements that cause the application to guide user interaction of a user when establishing or managing access to a user account of an account service.

In one flow of user interfaces, the device library 20 includes configuration to facilitate initially establishing a link to a user account (e.g., selection of an appropriate account service and collection of account credentials and user input). In another flow of user interfaces, the device library 20 includes configuration to facilitate establishing a link to the user account using any verification procedure for credential-less authentication. The device library 20 preferably includes instructions that define the logic for selection of the appropriate flow. For example, if it is the user's first time linking with an account service or if an application and user don't qualify for credential-less authentication then the flow for initially establishing a link is used. If the user is a returning user and a condition for credential-less authentication within the application is permitted, then the flow for credential-less authentication can be used. The device library 20 may additionally facilitate interacting with the API service of the account-linking service 10.

The verification system 30 functions to analyze various input signals to determine the form of authentication to apply when linking to an account. The verification system 30 is preferably used in determining when and how a form of credential-less authentication can occur. In some variations, the verification system 30 can include a set of optional authentication procedures that can be used when regulating authentication and permitting account linking.

The verification system 30 may additionally be used in regulating initial authentication with an account service. Without the account-linking service 10 having previously established a link to an account, the authentication procedure will include at least the authentication procedure of the account service. This will generally include collection of user account credentials (e.g., username and password) and may additionally include other authentication steps such as information verification, device verification (e.g., SMS code or one-time-passwords), biometric verification, and/or other authentication steps.

The verification system 30 can be used to add authentication procedures to the authentication process. The account-linking service 10 may have existing information and user authentication capabilities that can be added as a supplemental layer to a third party account service. This may be used when an account service includes a native authentication procedure that satisfies a set condition. For example, an account service may lack a form of multi-layer authentication. The account-linking service 10 may add SMS pin-code verification using an established phone number of the user prior to permitting linking to an account.

Primarily, the verification system 30 can be used in regulating the linking of a user account to an application. The verification system 30 can detect when at least one signal establishes an association between a user of two applications, which can indicate when previously linked accounts of a user may be eligible for alternative authentication procedures. When a user in one application potentially has an association to previously linked accounts, the verification system 30 can direct one or more forms of verification.

Configuration to establish an association may use user profile information. A substantially unique and verifiable identifier such as an email address, phone number, a device identifier, a browser cookie, and/or other suitable types of identifiers may be used. In one variation, the device identifier may include or be generated from a device profile. The device profile can be a collection of device properties that can be used to act as an identifier that is unique or substantially unique (e.g., highly collision-resistant to instances of different devices generating the same device profile). In some instances, multiple signals may be required to establish a potential association of an application user and linked accounts.

Preferably, after detecting a potential association, the association is verified using an authentication procedure described herein. At least a subset of the forms of verification will not include collection of user account credentials used to initially establish the account link.

The nature of the authentication procedure may depend on the level of access to a linked account that is being requested by the application. In one variation, an application may specify access limits that do not present significant risk to permitting that level of access. For example, requesting access to collect account details to setup direct deposit to the user account may be an access level with lower verification requirements. Other levels of access may trigger greater levels of verification. For example, requesting access to setup outgoing payments of an amount greater than some threshold from a user account may be an access level with greater verification requirements.

In some variations, the signal of a potential association may be sufficient in verifying the association such as for access requests with lower verification requirements.

In one variation, verification can be performed through device addressed communication. Preferably, a phone number is used to communicate a passcode. The passcode may be communicated using SMS/MMS or a voice call. Alternatively, any suitable communication medium may be used in delivering the passcode. In a similar manner, other multi-factor authentication mechanisms may be used such as a previously configured authenticator application that generates one-time-passwords, a hardware-based key generator, digital certificate verification, and/or any suitable form of supplemental identity verification.

In one variation, verification can be provided by the application. In some instances, the application may secure access to the user application account using a form of multi-layer authentication such as a SMS pin code, an authenticator app one-time password, biometric verification (e.g., fingerprint or facial identification). Results of such application-directed user verification signals may be relayed and verified by the verification system 30. In this way, if a user performs a secure form of identity verification with the application, they can avoid performing a redundant form of verification again to subsequently access an account. For example, if an application performs phone number verification of a user and that phone number is one that could have been used by the verification system 30 to verify the identity of the user, then a phone delivered code (e.g., SMS or voice message) used by the application may additionally serve to verify identity of the user for linking accounts to the application. In some variations, the application may additionally be verified as a trusted party such that the application can be delegated user identity verification on behalf of the account-linking service 10.

In another variation, verification may leverage multi-factor verification of the account service. Some account services may have multi-factor verification procedures that depend on input by the user. The verification system 30 preferably tracks which account services have such multi-factor verification procedures and invoke the secondary verification procedures when authenticating with such account services. In this way, the account-linking service 10 can automatically use stored user credentials for the initial factor of authentication with the account service and then delegate subsequent secondary factors of authentication to the account service. The account service may, for example, may use passcodes delivered to phone number to complete authentication of a user account.

In another variation, verification may additionally or alternatively verify against a SIM card swap scenario. The verification can use carrier-level signals that indicate if a SIM card has been moved between devices. This may be used independent or in addition to other forms of verification.

In another variation, verification may additionally use linked account access to verify identity of a user prior to granting access to the account on behalf of the user. If the user is the same user to whom the user account belongs, the user will presumably possess knowledge of information and activity related to the user account. Since the account-linking service 10 has permitted access to the user account previously established, that access can be leverage to use it to verify the user. In one implementation, recent activity of the user account may be presented in an information challenge. For example, a user may be requested to verify which of a set of potential financial transactions are real for the user account. Additionally, the verification system 30 may leverage the account-linking service 10's access to multiple user accounts of different account services to verify identity of a user. In this way, the information challenges may pull information from different account services.

3. Method

Figure 2:
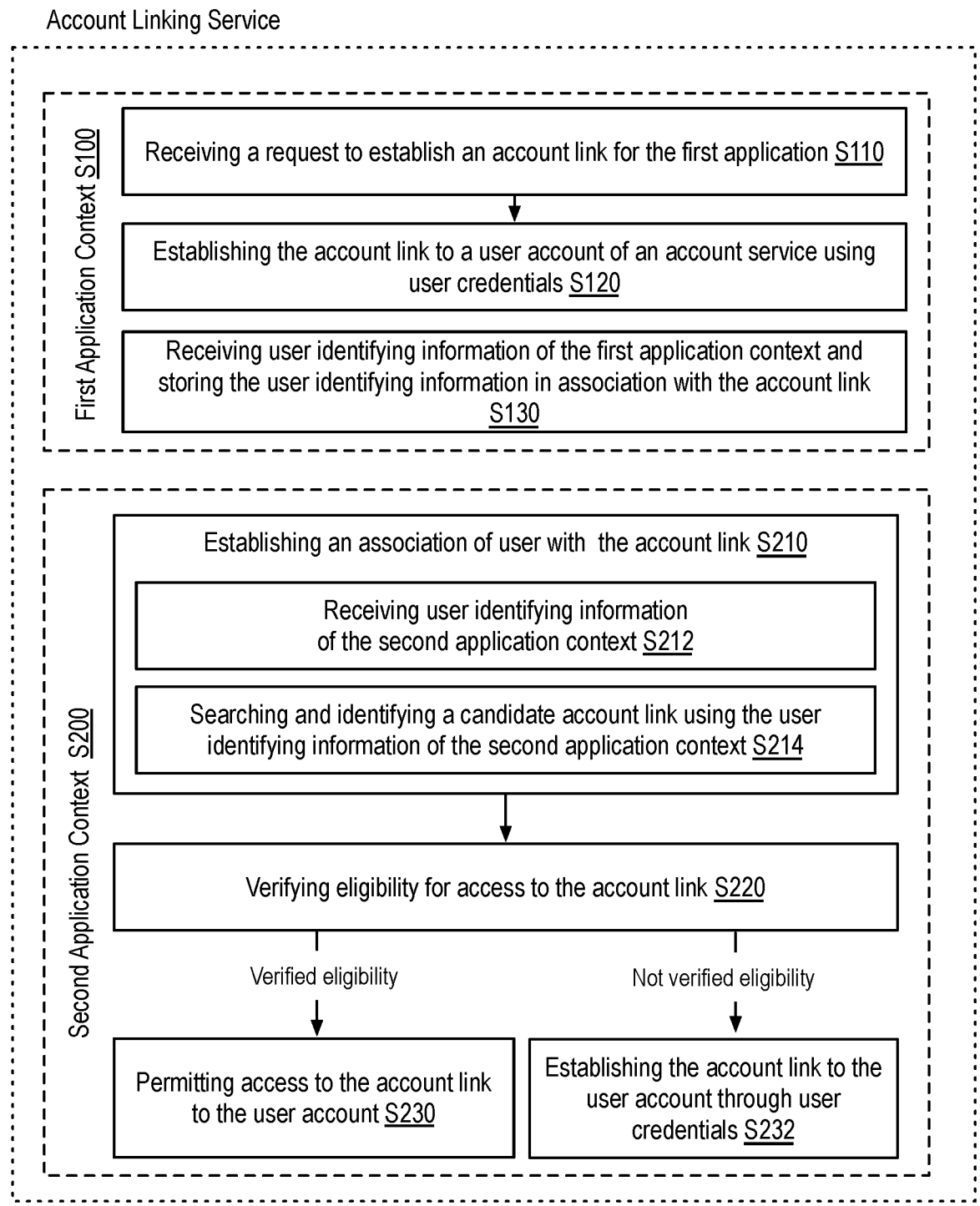
FIG. 2 is a flowchart representation of a first method.

As shown in FIG. 2, a method for linking to accounts using credential-less authentication can include within a first application context, receiving a request to establish an account link S110, establishing the account link to a user account of an account service using user credentials S120, and receiving user identifying information of the first application context and storing the user identifying information in association with the account link S130; and within a second application context, establishing an association of a user to the account link S210, verifying eligibility for access to the account link S220, permitting access to the account link S230 upon successful verification of eligibility, and establishing the account link to the user account of the account service using user credentials S232.

The method is preferably used in connection with the use of an account-linking service by an application. Prior to using an account-linking service to access information and/or control activity of a user account on an external account service, an account link must be established for a user and permitted to be used by the application. The method preferably functions to enable account links established by the account-linking service to be more easily enabled for use by applications and services that didn't originally prompt the establishment of the linked account. From a user perspective, this may be perceived as a reduction of signup friction since they may be alleviated from repeatedly entering user credentials of each account for each account service on each application that the user wants to setup.

Access to the account link will, in one preferred embodiment, not permit reading of the account link, but instead permit an application to interact with the user account and account service associated with the account link (where the interactions are performed through the account-linking service). In general, the account link will be a secure data store that includes any user credentials (e.g., username, password, authentication challenge information, multi-factor authentication information, and the like). The user credentials stored in the account link are used by the account-linking service to interact with the account service and perform interactions as the associated user account.

In some variations, the account link may relate to a stored authenticated session, which can be stored as part of the account link or be referenced through the account link. For example, a sandboxed session with an account service may be maintained and persistently stored such that it can be reused after a user has authenticated. This sandboxed session may be an application instance, a virtualized application instance, a browser instance, or any suitable client environment. When used with a virtualized instance of an application, the sandboxed session stores and maintains authentication details such that the virtualized instance can be used directly to interact with an account service, possibly without needing to re-authenticate. Though in some instances a sandboxed session may need to reauthenticate.

User credentials for each user account and account service will generally need to be established individually. In one implementation, this set of user credentials and user account information for one related user may be stored within a single account link. In another implementation, the set of user credentials and user account information may be stored as individual account links. The method may be used to access one or multiple related account links depending on implementation details.

Figure 3:
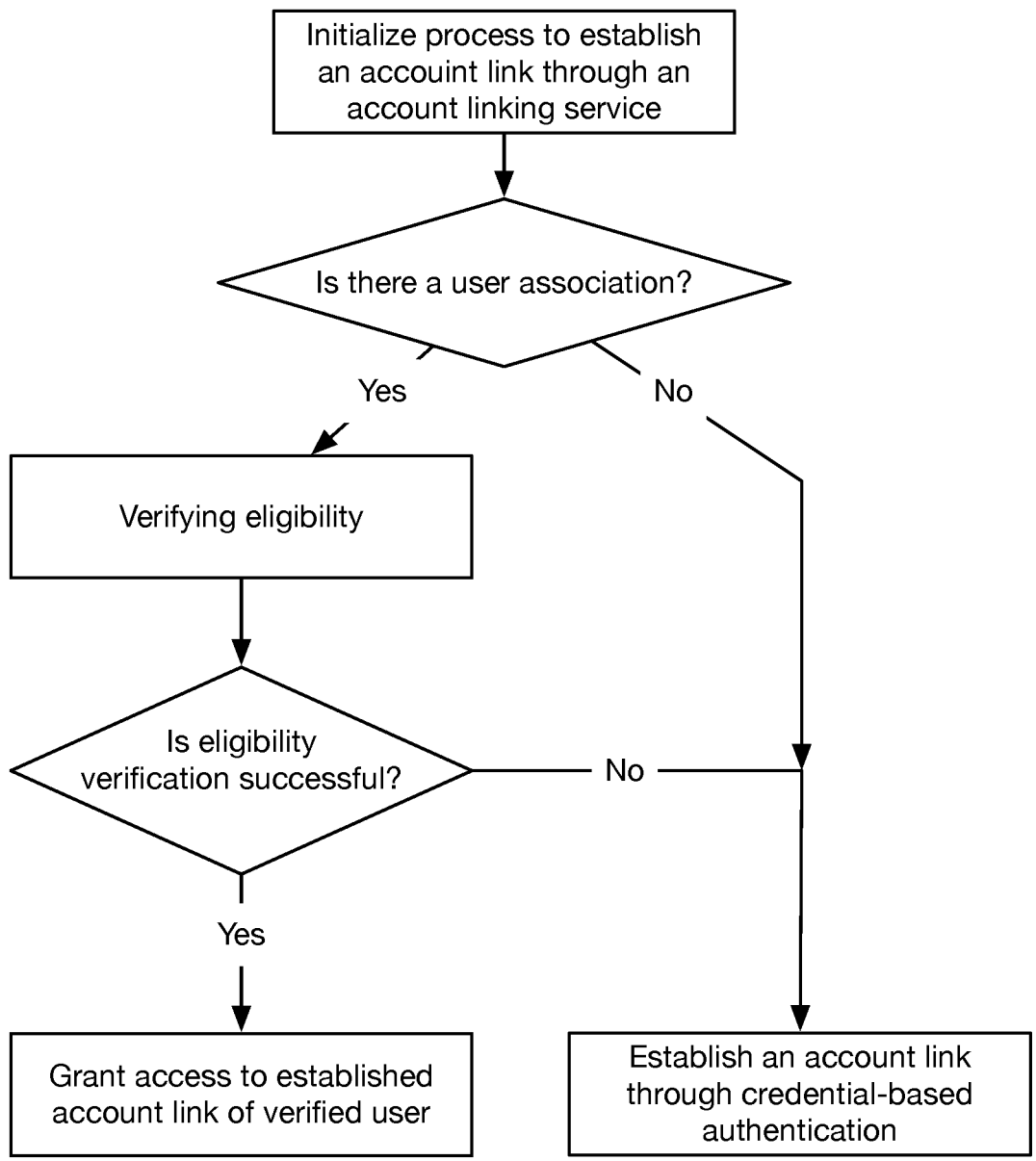
FIG. 3 is a flowchart representation of logical transitions between account linking processes.

As shown in FIG. 3, the method prompts a dynamic process to establishing access to an account link within an application that is based on: if an association can be established with a previously established account link and if such an association can be verified. The resulting user experience can result in a user flow in one scenario with a user providing user credentials if a previous account link is not available or is not eligible for use. The resulting user experience can result in a user flow in another scenario verifying permitted access to an account link and granting access to an application to use the account link without retrieving user credentials from the user.

As a more detailed description of the user experience, a user opens a first application that makes use of the account-linking service to connect with a user's bank account. The user goes through an authentication process that includes supplying account credentials for the user's bank account and thereby establishing an account link to the user bank account within the first application. That application can then use interact with the user account of the account service using the account-linking service. Later, if a user uses a second application, then the method may enable access to the account link to be more easily granted by verifying an association of the user with the account link. Various verification conditions are discussed herein such as using a OTP passcode verification, cookie verification, and/or using device profile verification.

Figure 4:
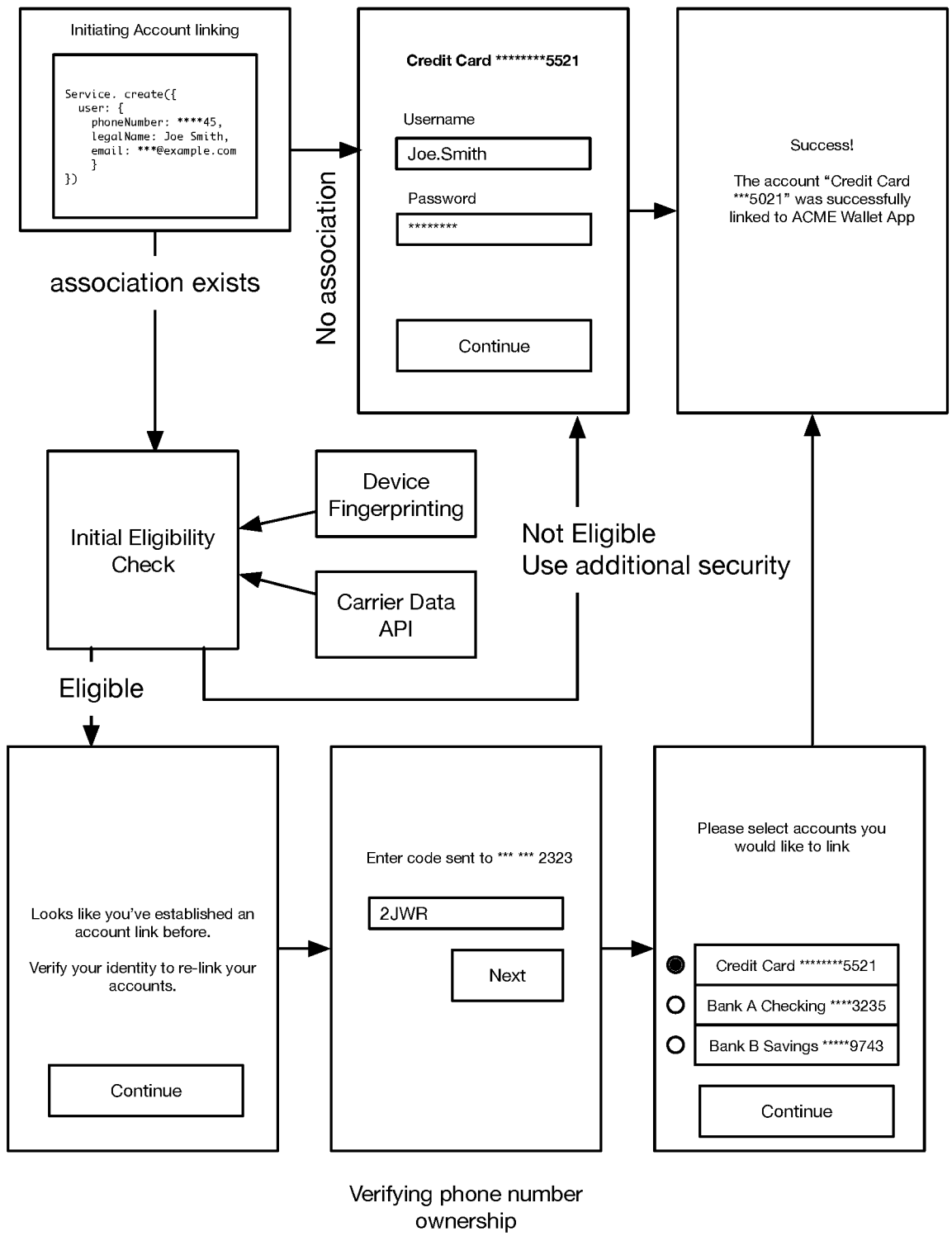
FIG. 4 is a schematic representation of user interface flows.

The method may additionally be used in providing and/or rendering appropriate user interface elements in facilitating moving a user through an appropriate user experience flow as shown in FIG. 4.

In general, an application may be capable of establishing multiple account links to multiple user accounts and/or multiple account services. For example, an application may establish two or more account links for a user to the user's various financial user accounts on different banking systems. Establishing an account link through a credential-less user flow may be used in establishing multiple account links with consolidated verification and/or distinct instances of verification. Additionally, access to a subset of account links may be granted through a credential-less user flow and a second subset of account links may be granted through credential-based user flow. For example, within one application, the application may be granted to two previously account links of a user by verifying user and device identity using a one-time-passcode delivered to a phone and the application may be granted to a third account link of a user by establishing the account link using a credential-based authentication user flow.

In some variations, the method may be modified to supply supplemental authentication security to an account service. If, for example, an account service lacks multi-factor verification, the method may be modified to inject a user verification procedure prior to granting access to an account link to the account service. In a preferred variation, the authentication process is managed through the account-linking service, and therefore the injection of additional authentication steps may be performed seamlessly with the experience seeming to be a cohesive experience.

As described above, the method is preferably used in the financial technology space and can enable establishing account links to various financial institutions (e.g., the account services). Applications may request access to such account links so as to retrieve account information (e.g., account statement information, transaction information, etc.) and/or to direct actions of the account (e.g., initiate payment, change settings of an account, etc.).

In some variations, the method may additionally be applied to establishing the account link so as to facilitate digital payments. Access to an account link for a user account of a financial account service like a checking account of a bank can enable a more streamlined process to direct ACH transfers, wire transfers, and/or other suitable types of transactions. In this manner, the method may be modified to offer flexible access a new set of payment rails that can be accessed in a simpler manner.

The method when implemented from the perspective of an account-linking service manages receiving and responding to requests from various different application contexts. An application context can include any communication or digital interaction with the account-linking service that is communicated with indication of an associated application. An associated application may be indicated using application account credentials or tokens, or other information that are uniquely associated with a particular application (e.g., a developer account within the account-linking platform). For example, server-side API requests from an application server made on behalf of an application may include secret tokens to indicate interactions within the application context of that application. In one implementation, a client identifier and secret token are stored securely within the server computing resources of an application and used for backend server communications to a server of the account-linking service. In other examples, a temporary token associated with an application may also be used to identify an application context. In one implementation, a temporary token may be generated by the account-linking service and communicated to a backend server of an application; the temporary token can then be communicated to an application client for direct interaction with the account-linking service. In some cases, in addition to identifying an associated application, a communication from an application instance to the account-linking service may indicate a client identifier, which may be used to distinguish between different client devices.

Herein, the method is described as a set of processes performed within a first and second application context. In general the first application context describes interactions with computing resources of a first application and the second application context describes interactions with computing resources of a second application. The first and second applications may, in many cases, be different independent applications. As independent applications, they may have no direct knowledge of each other, which means there will be no direct operational integration between the two applications. The method may, however, be used with applications that do have some interaction. In some implementations, the two application contexts may relate to the same application but for some reason the application does not make use of a permitted account link. Reference to first and second are used to signal different interaction scopes. The first application context is used herein to reference interactions with an application that initially is involved when establishing the account link and the second application context is used herein to reference interactions with an application that may be eligible to take advantage of the previously established account link because of a shared user association. A third application context or any other number of application contexts can additionally perform authentication or make use of credential-less authentication.

Figure 7:
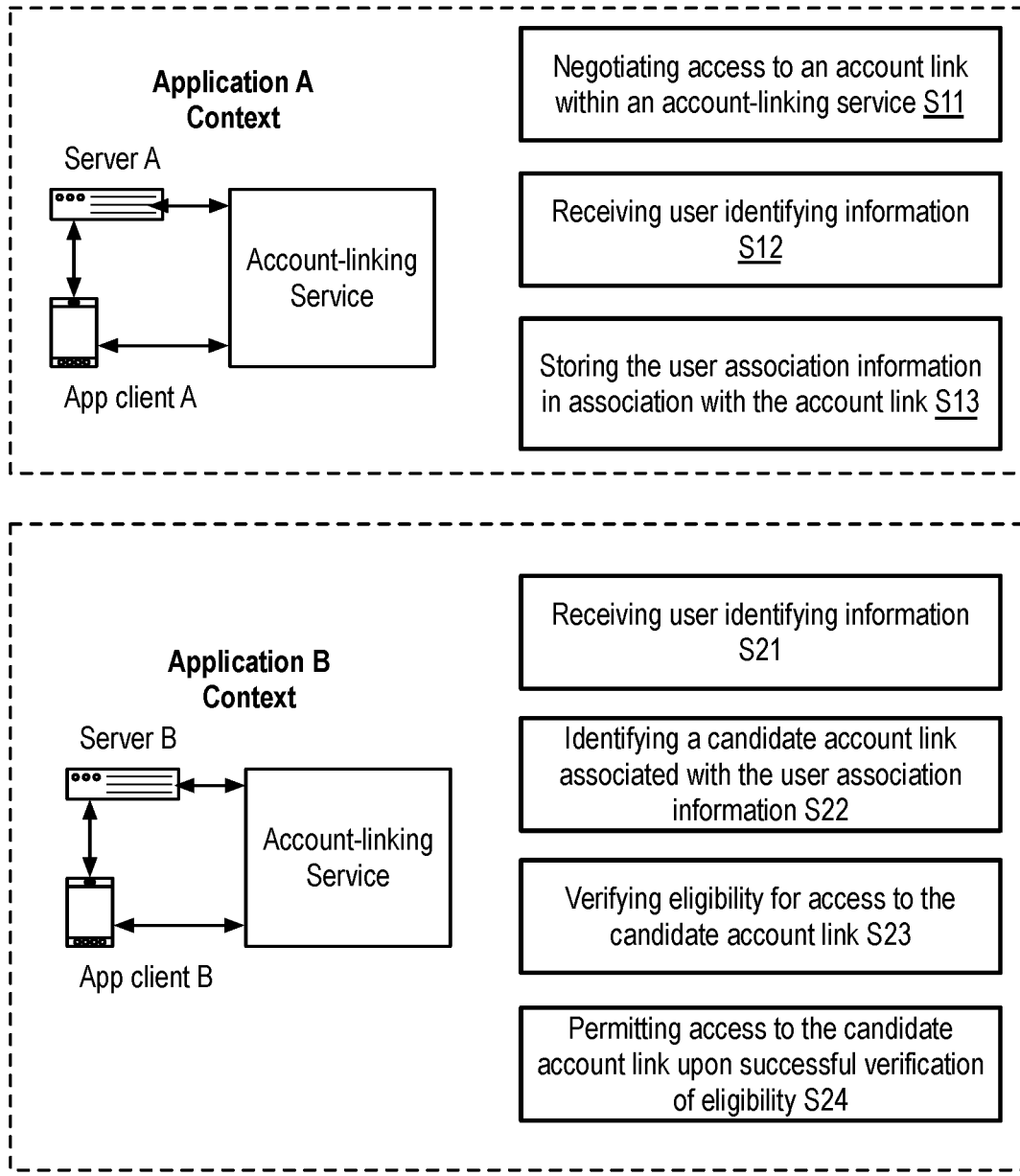
FIG. 7 is a flowchart representation of one variation of a method.

As shown in FIG. 7, an alternative generalized variation of a method for linking account access across application contexts can include: within a first application context: negotiating access to an account link within an account-linking service S11, receiving user identifying information S12, and storing the user association information in association with the account link S13; and within a second application context: receiving user identifying information S21 (e.g., application communicated association information), identifying a candidate account link associated with the user association information S22, verifying eligibility for access to the candidate account link S23, and permitting access to the candidate account link upon successful verification of eligibility S24.

Figure 8:
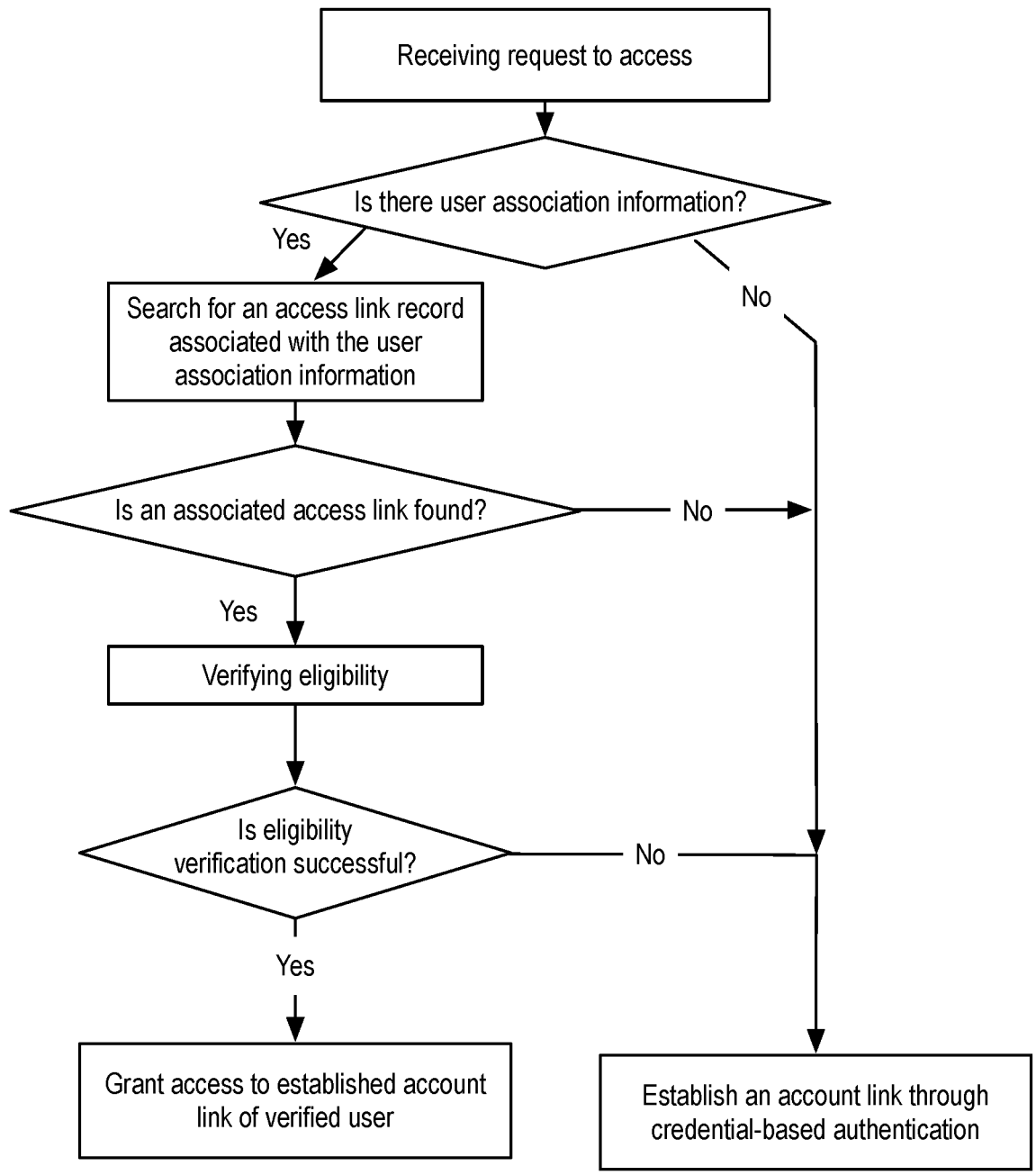
FIG. 8 is a flowchart representation of different conditions for evaluating eligibility to access an account link.

As shown in FIG. 8, the generalized variation of the method may have various alternative results when interacting with the second application context. In the case that no account link is identified with an association with the application-communicated user association information, negotiating access to an account link within an account-linking service as in the first application context. In the case, that eligibility for access to the account link is denied during verification, negotiating access to an account link within an account-linking service can be performed. This negotiation may be performed as in the first application context where user credentials are collected and used by the account-linking in authenticating a user account with an account service, and then storing the account link resource and granting permission to the second application context to use the account link. Negotiation may alternatively collect user credentials and authenticating them against user credential records stored in connection with the candidate account link, and granting access to the candidate account link if verified through explicit confirmation of the user credentials to the as in the first application context. If they don't match, then the supplied user credentials can be tried with the account service. This may function to link the account link records through explicitly authentication with the credentials. After establishing access to an account link, the user associated information may be stored or updated accordingly for subsequent linking attempts made by other applications.

The method preferably initiates with linking to at least one user account of an account service within a first application context S100, which would involve receiving a request to establish an account link S110, establishing the account link to a user account of an account service using user credentials S120, and receiving user identifying information of the first application context and storing the user identifying information in association with the account link S130. Any suitable number of account links may be established through any suitable number of applications. Blocks S10, S120, and S130 serve to describe the initial process for an account-linking service initially setting up a given account link for a user.

Block S110, which includes receiving a request to establish an account link, functions to initiate use of the account-linking service to setup access to an account on behalf of an application. The request is preferably associated with a first application context. In one variation, the request may be initiated within the first application client. In another variation, the request may be received through an API of the account-linking service with the request being associated with an account of the application (e.g., using developer account credentials of the application operator to make a request from an application server).

The request is preferably generated and transmitted to the account-linking service in response to the first application prompting use of an account linkage service to add or otherwise configure an account link. This generally will include requesting to add a new account linkage. This may additionally or alternatively include requesting to modify access to an account link. In one instance, the application may have a set of permissions when accessing an account link and the application may initiate a new request to change that set of permissions. For example, an application may have access only to account history of a bank account, but may want to update permissions to initiate ACH transfers through the bank account.

Receiving a request to establish an account link may initiate presenting of account service options, receiving selection of an account service, and then proceeding in a user flow for establishing the account linkage using user credentials S120. For example, when starting the linking process a view may be presented guiding the user to select an institution the user wants to link to the application, after the user selects the appropriate institution, a user interface guides the user through establishing an account link with the appropriate account service.

Block S120, which includes establishing the account link to a user account of an account service using user credentials, functions to configure the account-linking service to access a user account of an account service on behalf of a user. Preferably, an established account link is initially restricted to use/access by the originating application. The account-linking service maintains configuration to access the user account and perform appropriate actions (e.g., collecting information and/or directing various interactions) in response to direction of the application.

Establishing the account link using user credentials will preferably involve facilitating completion of an authentication process dictated by the external account service. This may include supplying user credentials to the external account service and optionally completing other authentication processes such as supplying additional information and/or multi-factor authentication steps. Establishing the account link may include collecting user credentials and supplying the user credentials to the account service. In the event that an account service has additional layers of authentication, establishing the account link may additionally include relaying multi-factor authentication challenges and responses between an application and the account service. User credentials and/or other authentication information is preferably securely stored and managed at the account-linking service such that the account-linking service can preserve an ability to later access the account service without needing a user to resupply credentials.

In one preferred variation involving the use of a guided authentication module, establishing the account link to the user account can include: serving an authentication module to an application client of the first application context, collecting account credentials from the authentication module, performing an authentication process with the account service using the user account credentials, and storing the user account credentials as part of a secure data store of the account link in response to successful authentication with the accounts service.

Serving an authentication module to an application client of the first application context functions to relay information to the application client so that an authentication user interface can be rendered on the application client. In one variation, the authentication module may be a native user interface rendered based on custom code of the application client or alternatively rendered through an SDK of the account-linking service. In another variation, the authentication module may be an html rendered site, which may be displayed within the application client in an iframe or webview. In one variation of the html rendered site, the application client pushes the user state to a browser session to view the authentication module, and in general, the user state is returned to the application client after completion of interacting with the authentication module (e.g., after successfully completing authentication, unsuccessfully completing authentication, or canceling authentication).

As part of the authentication module, there is preferably a user interface form facilitating collecting account credentials from the authentication module. This may include collecting username and password for a user account on a particular external account service. These user credentials are preferably securely submitted to the account-linking service such that the account-linking service can use them on the user's behalf to interact with the account service. Performing an authentication process with the account service using the user account credentials, functions to authenticate the user credentials with the account service thereby gaining access to the user account. The user account credentials are preferably stored if authentication is successful with the account service. The user account credentials are preferably stored in a secure data store of the account link. In one implementation, the account link is the data store of user account credentials and any additional information. This may be indexed or mapped to user identifying information and/or an access token or key so that the application can reference the account link for use in later interactions.

Establishing the account link may additionally include configuring access permissions for an account which functions to set the restrictions and capabilities of an application when using an account link. Access permissions may be specified when receiving an account link access request such that the account link access request includes a set of requested access permissions or where the set of requested access permissions are otherwise communicated to the account-linking service. The access permissions are preferably used to set the permitted interactions and usage policy for a given account link.

As an example of various access permission options for a financial account-linking service: an authentication access permission option may enable retrieval of account and routing numbers, which can be used for confirming account information for ACH authentication; a transaction access permission option may enable read access to transaction data; an identity access permission option may enable read or information verification capabilities for various user identity information of a user account; a balance access permission option may grant read access to account balances of one or more financial accounts; and a payment permission option may enable control over payment transfers. Other suitable permission options may alternatively be used.

Depending on the account service, the method may include accessing through a provided programmatic interface (e.g., a bank account API) or by emulating user interface access of the account service.

In one variation, establishing the account link is performed through API access provided by the account service. Depending on the configuration of the account service this may include the account service granting permission to the account-linking service to act on behalf of the user. For example, the account service may grant access to a user account according to how a user responds to a notification that the account-linking service is requesting access to their user account.

The systems and processes for authentication used in some variations can include generating or instantiating a proxy, virtualized, or simulated instance of a software application of an account service that is configured to interface with external systems of the account service via public or non-public (e.g., proprietary) application programming interfaces (APIs). The virtualized or simulated instances of the software applications may be authenticated with the external systems as if the virtualized/simulated instances are actually first-party software applications executing on a user computing device.

A variation of emulating user interface access can include in one preferred variation authenticating with the account service with a virtualized instance of an application as a form of virtualized authentication. In the authentication module variation above, performing the authentication process with the account service can include performing authentication using the virtualized instance of an application. The collected user account credentials are preferably submitted to the account service through the virtualized instance and used to authenticate as a user account. The implementation of virtualized authentication used in some variations can include generation of proxy, virtualized, or simulated instances of software applications that are configured to interface with external systems via public or non-public (e.g., proprietary) application programming interfaces (APIs). The virtualized or simulated instances of the software applications may be authenticated with the external systems as if the virtualized/simulated instances are actually first-party software applications executing on a user computing device. The virtualized instance of the application can be a browser session or an application session operated and controlled by the account-linking service that is used to programmatically emulate human access to a web app or native app. Authentication procedures are preferably relayed from the virtualized instance to a user interface of the application. In this way, the interface of the application is a proxy for the actual user interfaced managed by the account-linking service. The mode of access to a financial institution may additionally depend on the available institution interface module. Accordingly, based on the financial institution, an appropriate institution interface module can be selected. Process of virtualized authentication is described in more detail below and can be incorporated into the method for linking to accounts using credential-less authentication in any suitable manner.

Block S130, which includes receiving user identifying information of the first application context and storing the user identifying information in association with the account link, functions to map user associated information to the account link so that other it may be referenced in other application contexts. The user identifying information will generally be some form of information that can be used across different application contexts for identifying a user. The user identifying information may include a name, an email address, a phone number, an alternative account name (e.g., social media username for receiving messages) or communication endpoint, a mailing address, and/or other identifying information.

The user identifying information may be received in a variety of ways. In some cases, the user identifying information originates from multiple sources such as the first application and the user account of the account service.

In one variation, receiving user identifying information of the first application context comprises receiving user identifying information in a communication from the first application (e.g., application client or application server). For example, user identifying information that is known or available to the application may be submitted to the account-linking service. In the case, where a phone number of another communication is communicated, the user identifying information may additionally include confirmation details of the information such as when the phone number was last confirmed. This may be used later in determining if the phone number can or should be used for verifying an association to an account link.

In another variation, receiving user identifying information of the first application context comprises retrieving user identifying information from the user account of the account service. After authenticating and obtaining assess to the user account, the account-linking service may access various forms of available user identifying information like name, address, email address, phone number, and the like. In some cases, this may be transparent to the first application and/or not shared to the first application. When the first application does provide user identifying information retrieving information from the user account may be used to confirm and/or clean the information. For example, a phone number may be submitted by an application client or server, and then a partial phone number retrieved from the user account of a financial account service can be used to confirm if there is a match, which may result in higher confidence in using the phone number in verifying eligibility for access. In the case, where there is a discrepancy between the information, the user identifying information closer to a source of truth is used. For example, phone number information confirmed in a user account may be trusted over one supplied by an application. Similarly, when in the second application context, phone information established from the original creation of the account link may be used over the phone information provided by the second application if a phone communicated OTP is to be used for verification.

The user identifying information is preferably securely stored within a database or other computer-readable medium of the account-linking service. A mapping or database reference can be stored so that the user identifying information is associated with one or more account links. An corresponding account link can preferably be found by querying a database of user identifying information.

Figure 9:
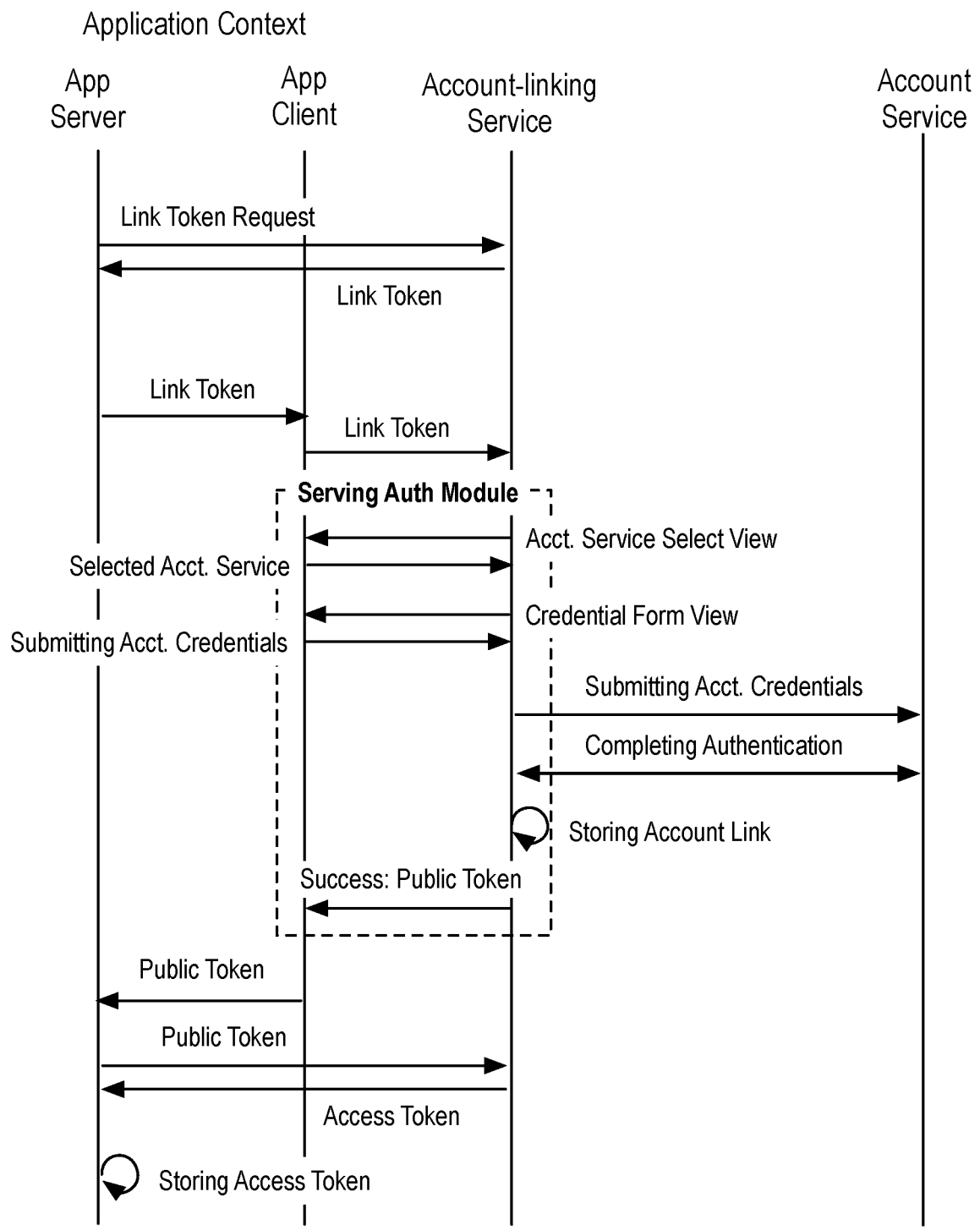
FIG. 9 is a communication flow diagram showing negotiating access and use of security tokens to manage access.

The method may be used across a variety of security implementations. In a one-time use access token variation, the method makes use of an integration model depending on an application's client-side and server side interactions. Various security integration models may be adapted to the authentication processes described herein. As shown in FIG. 9, one exemplary integration of an application can include receiving a request to create a link token from an application server (e.g., wherein the request is received from a back-end server of the application); generating a link token and communicating the link token to the application server; in connection with the link token, initiating and serving an authentication module to an application client (the link token will generally be previously communicated from the application server to the application client); initiating an authentication process of an external account service within an application client through the authentication module; with successful authentication, storing account credentials as part of an account link and communicating a public token to the application client (e.g., as a API response, as a callback, as an asynchronous communication, etc.); receiving a request supplying the public token from the application server and responding with the access token (e.g., exchanging a public token with the access token generally happens after the application client communicates the public token to an application server). The application server preferably securely stores the access token along with any account link identifying information (e.g., an account link item identifier used to specify the set of credentials associated with an account service). The application server may then use the access token to signal to the account-linking service permission to access the user account of the account service.

When initiating an authentication module, the application client will generally call an SDK method of the account-linking service that initiates a user interface served from the account-linking service. The authentication module as described herein can be a drop-in user interface module that handles user credential, multi-factor validation, and/or other account linking related steps within an application when establishing an account link. The authentication module user interface may be a webpage, an i-frame window, a webview, a natively rendered application view (controlled by the SDK), an applet, and/or the like.

When described so as to discuss the steps occurring from with computing resources of the application and the account-linking service, this process can include: the account-linking service serving an authentication module user interface and managing relaying of authentication steps between the application client and a server of an account service; at an application client, presenting account service selection, receiving selection of a first account service (i.e., a selected account service) and communicating the selected account service to the account-linking service; at the application client, presenting a user account credential form; at the account-linking service, collecting user account credential from submission of the user account credential form; at the account-linking service, submitting the user account credentials through an integration interface with the first account service; at the account-linking service and the application client, optionally completing any additional authentication steps which may or may not prompt additional updates to the user interface of the application client (e.g., security questions, passcode confirmations, and the like may be relayed between the client application and the account service through the account-linking service); at the account-linking service, storing the user account credentials and, communicating an access token to an application server (or other suitable system) or making any suitable change to grant the application to interact with the user account of the account link.

This integration process can be augmented through the method by supplying user identifying information during each of the application contexts. The user identifying information may be stored and mapped to an account link as in S100 and/or used to perform alternative verification to avoid direct user authentication as in S200.

After establishing an account link for a user, other applications may be granted access to the account link without the user re-supplying user credentials for the account link. Credential-less authentication and the granting of access to an account link for another application preferably S200 includes, within a second application context establishing an association of a user to the account link S210, verifying eligibility for access to the account link S220, and permitting access to the account link upon successful verification of eligibility S230 or establishing the account link to the user account of the account service using user credentials upon failure to successfully verify eligibility S232.

Block S210, which includes establishing an association of a user to the account link in a second application context, functions to match a user as a returning user of which an account link has previously been established. In other words, establishing an association determines if the user of the second application can be mapped to a user of another application for which an account link was previously configured. The account link will presumably be accessible by the other application and by determining an association of the users of these two applications as the same user, and then the method can proceed with verifying if the account link can be permitted to be used by the second application.

The association of a user is preferably evaluated within a second application context. A second application context can include user information obtained from within a different application. A second application context may additionally or alternatively include user information communicated to an account-linking service from a second application account. The first application context and second application context preferably characterizes involvement of two different applications. Here, the terms first and second are used as labels for two applications. Any suitable number of applications may be involved and they may be installed or used by a user in any suitable order. In the description of the method here, the first application context refers to interactions with one application where an account link is initially established using credential-based authentication with the account service, and the second application context refers to interactions with another application where a condition exists where an existing account link is associated with a user and may be used depending on eligibility.

Establishing an association is preferably initiated in response to a request of the second application or otherwise performed in response to a trigger by the second application. Accordingly, establishing an association may initially include receiving a request to establish an account linkage of a user account for the second application. This may be performed in a substantially similar manner as in block S110. For example in invoking use of an account-linking service to configure an account link to one or more account services, the system may evaluate if an association of a relevant user exists.

Establishing an association can include mapping a signal from the second application context to a property associated with an established account link. The account-linking service preferably stores and maintains user information, device information, and/or other properties that are associated with a particular account link. In one implementation, the account-linking service may maintain an internal user model that models user information and associated account links. Information stored in the user model may be supplied by applications involved in establishing or accessing the account link. Information may additionally or alternatively be extracted from account services using an account link.

When establishing an association, information supplied by the second application context is preferably used for searching and identifying one or more account links with matching information. In particular, establishing the association of a user of the second application context to an account link can include receiving user identifying information of the second application context S212 and searching and identifying a candidate account link using the user identifying information of the second application context S214. An association with an account link may be determined by matching user identifying information like an email address, phone number, a browser-based cookie data, a device identifier or profile, an advertiser identifier, other user profile information, and/or other suitable identifying information.

In block S212, which includes receiving user identifying information of the second application context, functions to obtain user identifying information that is associated with the current user of the second application. In one variation, the various properties usable in establishing an association can be provided in the initiating or a subsequent request by the second application. Alternatively, the application may communicate or relay the appropriate information in any suitable manner. In one preferred implementation, the second application will be operating without knowledge of if credential-less authentication may be used for a user or if a standard authentication process is required such as in the first application context. Accordingly, the second application will generally perform similar steps of initializing authentication but possibly with a different resulting authentication process.

Accordingly, methods may include, within the second application context, receiving an initialization request for serving an authentication module to an application client of the second application context. Depending on the security integration approach of the implementation this may happen in various ways (e.g., when an application server is requesting an access token, when an application client is requesting to initialize an instance of the authentication module). During one of these messages, the method includes receiving user identifying information from within the second application context. When the user identifying information is a cookie, the cookie can be accessed when the authentication module is established in a webview and the cookie (or other persistent web data) can be read.

In some variations, a user identifier of the account-linking service may be used. In the event where other account links may be established, the account-linking service may have a user model with an assigned user identifier where account links established and accessible by the second application may be associated with other account links to which the second application has yet to gain access.

In some cases, multiple properties are evaluated to determine an association. In one variation, supplementary information obtained from a device such as location, photo or media library contents, calendar information, and/or other accessible user data sources may be used to evaluate if users of two applications are the same user.

A device profile can be a collection of device properties that can be used to act as an identifier that is unique or substantially unique (e.g., highly collision-resistant to instances of different devices generating the same device profile). In some instances, multiple signals may be required to establish a potential association of an application user and linked accounts. While a device profile may be used to identify one or more candidate account link, the device profile will more generally be used as a primary or secondary way of verifying if the same client device was used for a first application and a second application. Accordingly, other user identifying information like an email address or phone number may be used in searching and identifying the candidate account link.

Block S124, which includes searching and identifying a candidate account link using the user identifying information of the second application context, functions to map at least one part of the user identifying information from the second application context to an existing account link. For example, the email address and/or phone number may be used to search account links that have been indexed with the email address and/or phone number. In some cases, an exact match is required. However, the information of the user identifying information may be normalized for small variations or matched in any suitable manner. In some situations, multiple properties of the user identifying information may be compared and a matching score generated for a candidate access token. If the matching score is above a threshold or otherwise satisfies a condition, then the identified account link can be used as the candidate account link.

If no candidate account link can be found to match or to likely correspond to the pre-established user identifying information of the account links, then the authentication flows to establishing the account link to the user account using user credentials (similar to the process performed in association with the first application context).

Block S220, which includes verifying eligibility for access to the account link, functions to evaluate eligibility. Eligibility is preferably successfully verified when the identity of the user and an association of the user with an existing account link can be determined to coincide with a high degree of certainty. The degree of certainty and the process or processes used in verifying eligibility may vary depending on different conditions. Verifying eligibility may vary depending on the permissions requested for access to the account link. Verifying eligibility may additionally vary depending on the number of signals indicating the association and the results of some verification processes.

Verification process may include performing one-time passcode verification, verifying carrier data for SIM card changes, matching a device profile, verifying through information challenges, leveraging authentication procedures of an account service, and/or other performing other suitable verification procedures.

Performing one-time passcode (OTP) verification functions to verify the user is in possession of some component. A OTP may be used to verify the user possess access to a communication device like a phone, a particular communication channel (e.g., an over-the-top communication channel), a configured authenticator application, a physical key-generating hardware device, and the like.

In one preferred variation, performing OTP verification includes verifying possession of a communication device by communicating a passcode to a communication device associated with the user and retrieving confirmation of the passcode. Communicating the passcode can include sending an OTP over SMS/MMS or other messenger channels, communicating OTP over a voice call, or communicating in any suitable manner.

Figure 10A:
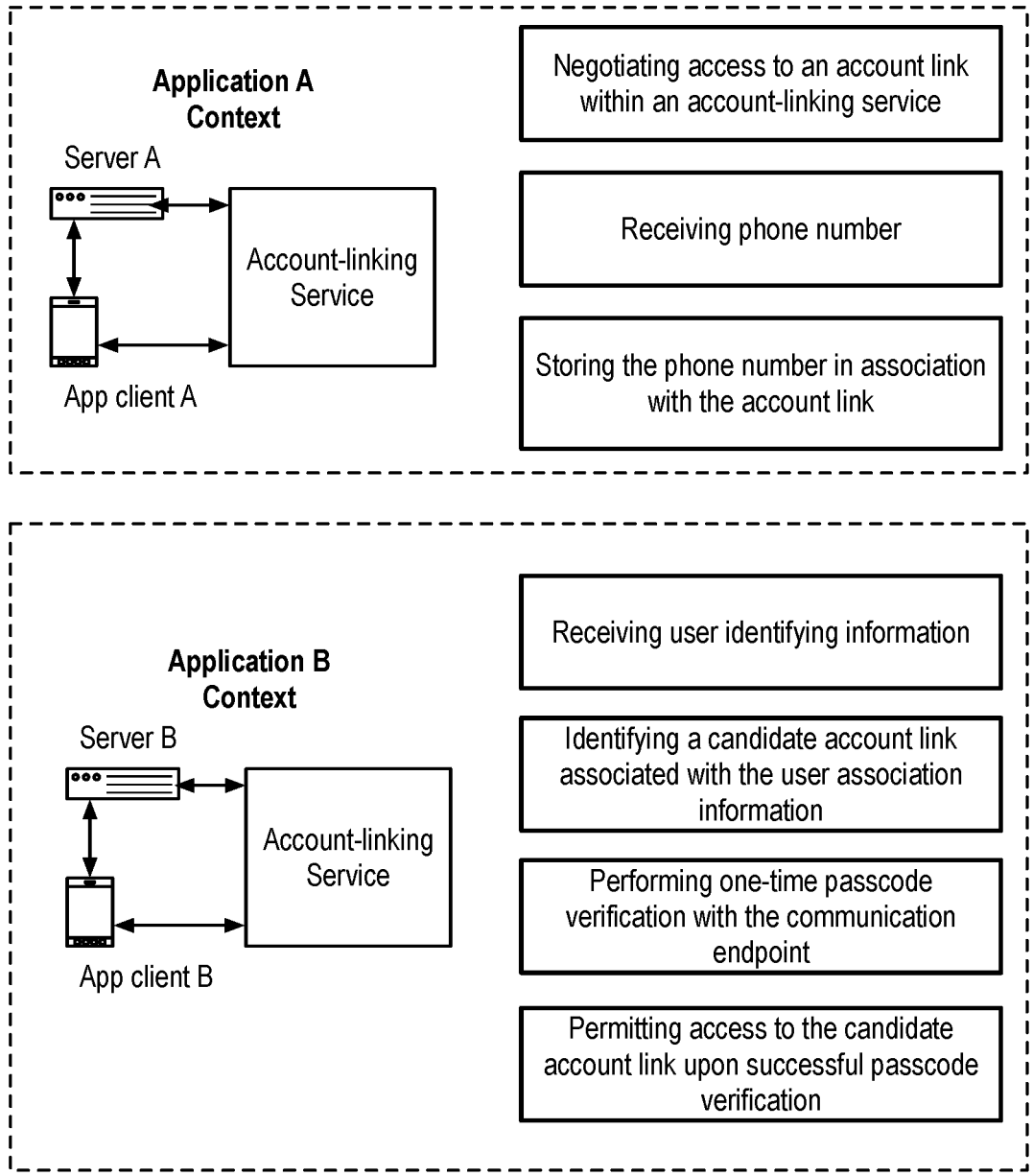
FIGS. 10A and 10B are schematic representations of two variations of the method.
Figure 10B:
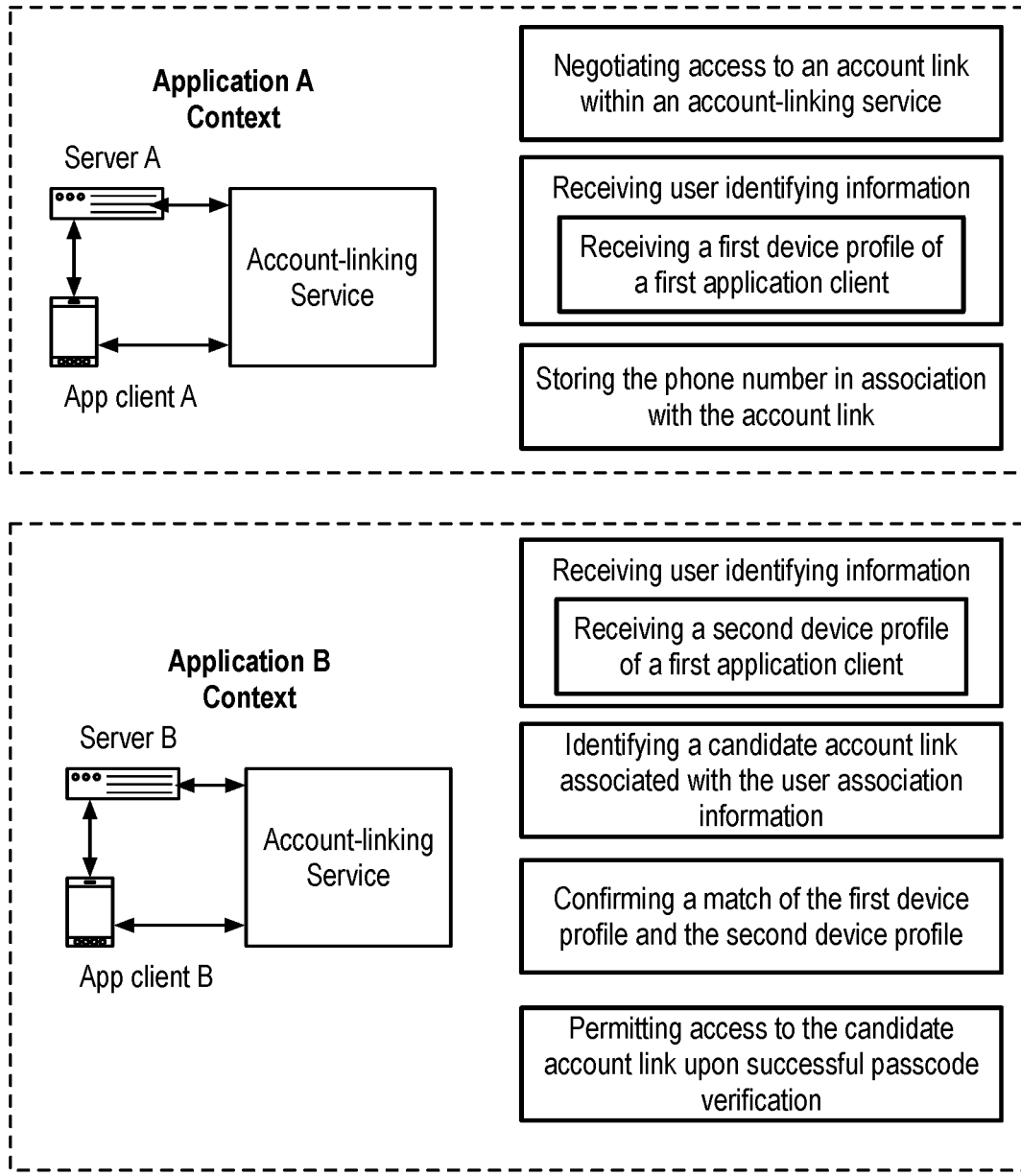

The communication endpoint is preferably indicated and associated with an account link through an application that previously was granted access to the account link (e.g., the first application context). Accordingly, as shown in FIG. 10, the method may include, within the first application context, storing user identifying information with an association to the account link, wherein the user identifying information comprises at least a communication endpoint; and then verifying eligibility for access to the account link by at least performing one-time passcode verification with the communication endpoint. The communication endpoint is preferably a phone number, but may be an email address, an alternative communication endpoint/address. The phone number may also be provided with the user identifying information of the second application context. The use of OTP verification may also depend on if and when the communication endpoint was confirmed. Confirmation of the communication endpoint (e.g., confirmation that the user has previously completed phone verification) may be supplied by the first application, but it may have also been performed earlier by the account-linking service. In some instances, the phone number may have been extracted from information from a user account of an account service.

Using phone communicated OTP, performing OTP verification with a phone number can include transmitting a code to the phone number (e.g., sending as an SMS/MMS message, over-the-top message, voice call, etc.), receiving an entered code, and confirming entered code matches the transmitted code and confirming phone verification if they match. This may be reasonably modified for other communication channels.

In another variation, an authenticator app that generates OTP codes may be used. Preferably, the authenticator app is initially configured for use by the user with the account-linking service at some previous time.

In some variations, verifying eligibility for access to the account link may include verifying multiple eligibility conditions, which can include verifying at least a second eligibility condition. In some cases, the different eligibility conditions may be verified simultaneously, however, they may alternatively be verified at any suitable time.

In the case of communication endpoint access verification, there may be various secondary eligibility conditions that are verified including verifying carrier data for SIM card changes, verifying device profile matches, and the like.

Verifying carrier data for phone number changes can include requesting phone number change information from a phone carrier data API. The carrier data eligibility condition can be indicated as a success if the phone number satisfies a change condition. In general, the change condition is if phone number is indicated to not have changed a defined time window. In particular, this may relate to requesting a signal indicating if a SIM card has been changed on a SIM-enabled device. However, the phone number change information provided by a phone carrier data API may also show changes in phone number account information (e.g., change of name, disabling of a phone number, routing of the phone number, etc.) This may be performed using a carrier data API. Alternatively, status of SIM card changes may be evaluated in any suitable manner. When used as a secondary eligibility condition for phone OTP verification, the phone number carrier may be verified at any suitable time such as when storing the phone number information as use identifying information after interactions with the first application.

In a variation with device profile verification, matching a device profile preferably includes generating a device profile (e.g., a device profiling data model, a device signature/fingerprint, device identifier, etc.) and comparing the device profile to one collected by the first application or when the account link was originally established. This eligibility challenge may be used to restrict the sharing of account links to applications operated on the same device of a user. Various signals can indicate that the device is the same and therefore will presumably be the same user accessing both application clients.

Figure 11:
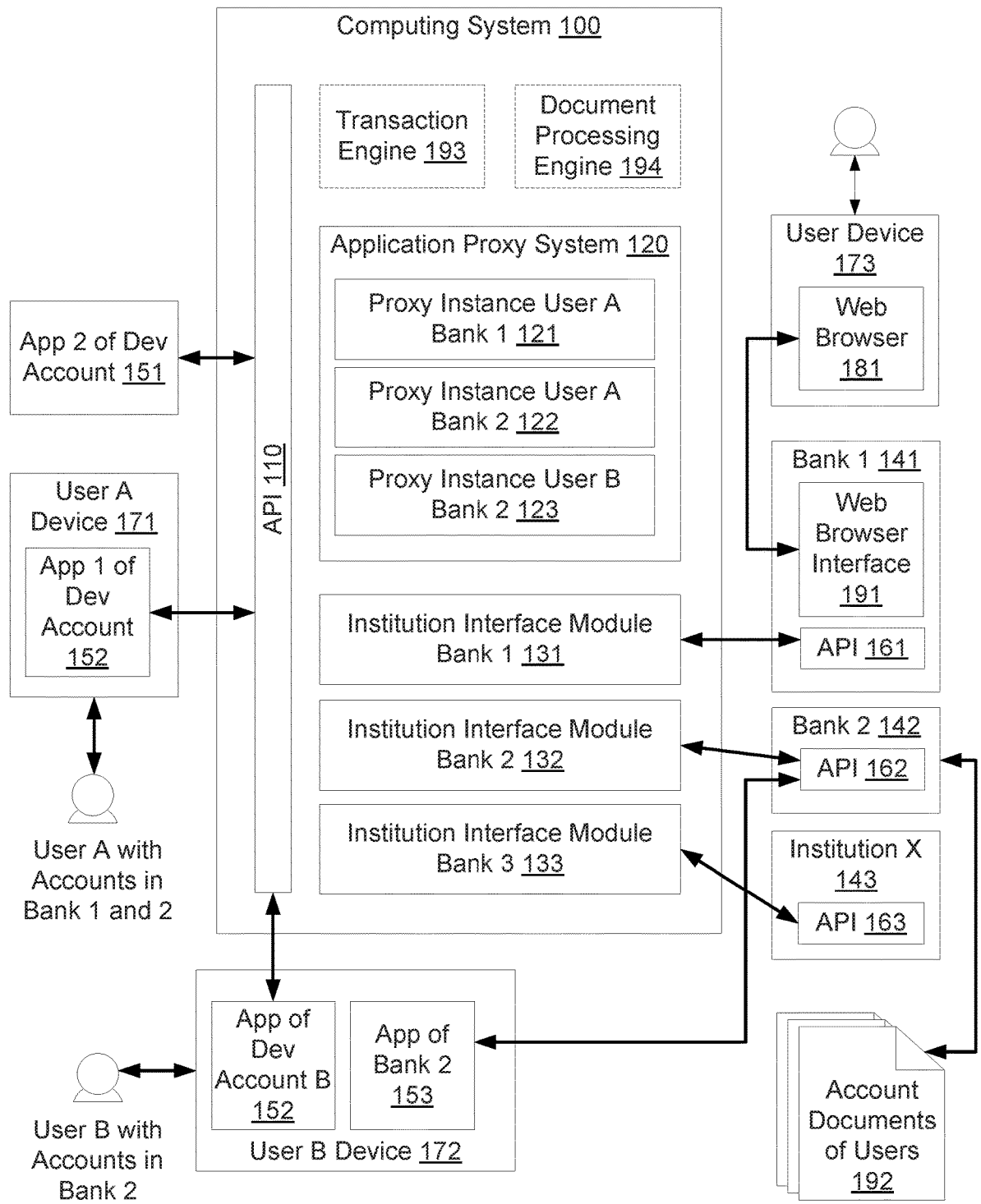
FIG. 11 is a block diagram illustrating various aspects of a computing system and network environment in which the computing system may be implemented, according to an embodiment.

As more specific details on a variation using matching of device profiles for verification: receiving user identifying information of the first the first application context can include receiving a first device profile of a first application client; and where receiving user identifying information in the second application context includes receiving a second device profile of a second application client; and then verifying the second eligibility condition by confirming a match of the first device profile and the second device profile as shown in FIG. 11. A match may not need to be a direct match. The device profile may include various device information such as device type, capabilities, location information, network address information, and/or other information. In many situations a device profile may be used as a supplemental verification condition. For example, the device profile matching verification condition may be implemented as a supplemental verification condition with phone number OTP verification.

In one preferred implementation, verifying eligibility can include performing one-time-passcode verification and if successful verifying carrier data and matching a device fingerprint. The one-time-password preferably verifies the user is in possession of the same device, and the carrier data verification and device fingerprint matching verify that the device that received the communication is still the same device.

A verification condition leveraging authentication procedures of an account service functions to piggyback on part of the authentication processes implemented by an account service. In one variation, if an account service is known to have secondary authentication procedures, the verifying eligibility may include initiating authentication with the account service and supplying the secondary authentication procedures to the user of the second application for completion. This variation may include: within the first application context, receiving confirmation of an account service application client instantiated on a computing device of the user; if there is an available account service application client for the user, initiating user verification through the account service application client, and receiving confirmation of user verification from the account service. For example, a user may have initially installed bank X and set it up for performing authentication. Then, during or after establishing access to the user account of bank X, the bank X system may communicate that the user is setup with the bank X application. Alternatively, the account-linking may detect that bank X application is installed and usable for authentication. Then, when the second application initiates granting access to an account link to bank X, account-linking service may trigger the bank X system into performing a verification procedure using the bank X application. In some instances this may be a push notification sent to the application that needs to be verified through some user interaction. After completion, the account-linking service can detect or be informed of successful (or unsuccessful) completion.

In verifying through cookie information, verifying can use detected cookies or other device marker data to determine a shared device between application contexts. A cookie verification variation can include: when establishing the account link to the user account, serving a first instance of an authentication module to an application client of the first application context and storing a cookie through the authentication module; and within the second application context, serving a second instance of an authentication module; and receiving at least a portion of the user identifying information of the second application context by reading the cookie from the second instance of the authentication module. The presence of the cookie may be deemed sufficient for verifying and granting access to the account link. As with the other variations, other verification conditions may also be used in combination with cookie verification. This variation can be used when the authentication module is implemented within a webview with shared data access scope.

The cookie can be a persistent cookie, a same-site cookie, or any suitable cookie. In some variations, a webview that is not the authentication module may be opened to inspect the possible presence of a cookie. In some cases, if there is no way to check if the second application context matches to an existing account link, then the method may include pushing application state within an application client of the second application to a browser window. For example, a native application may transition to a browser view of the authentication module so that a potential cookie could be checked. After completion, the application state is preferably transitioned back to the application.

In an information verification option, verifying through information challenges can verify user identity based on testing the knowledge of a current user. The information challenges preferably present a challenge that relies on the personally-relevant knowledge of the user. These may include previously set security questions. In some instances, verifying through information challenges can include generating an information challenge. Generating an information challenge in some variations may include retrieving information from a user account of an account service using an established account link. For example, transaction information of a bank account may be used to generate an information challenge related to selecting the correct transaction that was most recently made with a particular credit card.

In a similar variation for financial account services, transaction information verification can be used as a verification condition. A variation with a transaction information verification can include: within the second application context, receiving transaction information from a second application; and as part of verifying eligibility for access to the account link, querying the account service through the account link and confirming the transaction information in the transaction data of the user account. Querying the account service and confirming the transaction information can include retrieving transaction information and finding one or more matching transaction records for the transaction information. As an example of how this may be used, the second application may have visibility into some subset of charges to a user's credit card. For example, they may no because they charge them a fee for different products or service when certain credit card transactions occur and for how much. This can be relayed to the account-linking service. If these provided transaction events can be confirmed in the transaction history then that can signal that the user does correspond to that user account.

Similar to how access permissions can be specified within the first application context, access permissions can be specified when the second application is trying to establish access to an account link. Different eligibility conditions may be evaluated depending on the level of security and risk associated with different access permissions. Enforcing different eligibility conditions based on requested access permissions can include: within the second application context, receiving an account link access request that includes a set of requested access permissions; and as part of verifying eligibility for access to the account link verifying a first set of eligibility conditions for a first set of access permissions and verifying a second set of eligibility conditions for a second set of access permissions.

These verification options function to simplify the authentication process by not requesting user credentials from the user, verifying the user using the secondary authentication procedure, and completing the authentication procedure to access the account service.

In one variation, the method may additionally include an option for an application to independently request if a user has an associated account link and if the user of the application would be potentially eligible for credential-less authentication. This request may be performed transparent to the user. This request may be performed without granting access to the account link. Accordingly, some eligibility conditions may not be evaluated such as verification procedures that rely on user participation (e.g., OTP verification) may not be triggered. The application may use this information to understand if a user can use credential-less authentication prior to establishing access to an account link. This may be used to alter the interaction logic of the application or for any suitable purpose.

Figure 5:
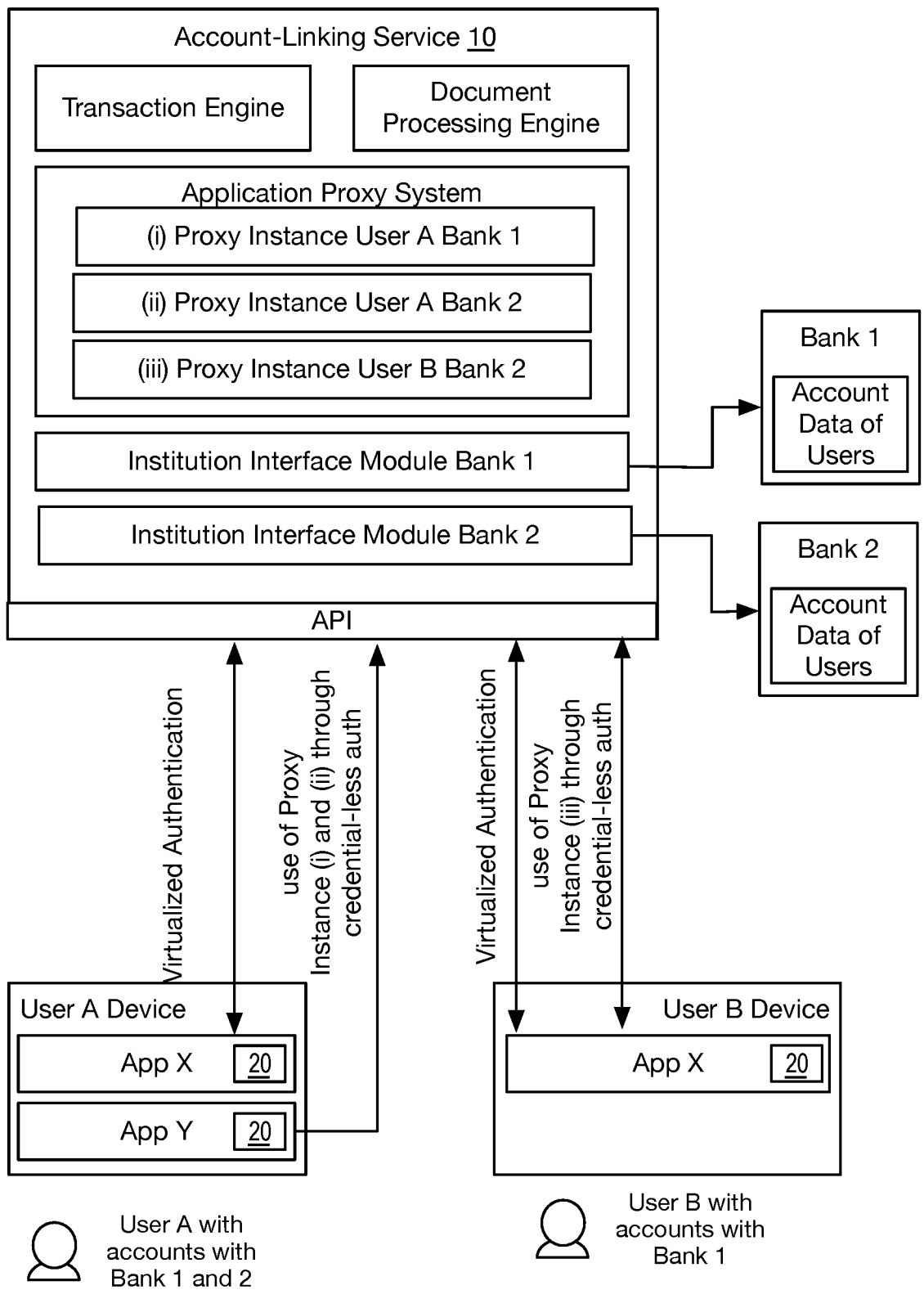
FIG. 5 is a schematic representation of applications integrating with a virtualized authentication system for credential-less authentication.

Block S230, which includes permitting access to the account link, functions to allow access to an account link upon successful verification of eligibility. More specifically, access is granted to the second application context. In this way, the second application can make use of the account link of the account-linking serviced. As discussed below, this may be used to retrieve information or perform actions with the user account of the account service. In a preferred variation, the account link established through virtualized authentication can be used to permit use of the account link for a second application context. As shown in FIG. 5, two or more applications may interface with an account-linking service making use of a virtualized authentication system and process. An account or token of the second application operator is preferably granted permissions or associated with a token or element that can be used in accessing and using the account link. In this way, a user account of a third party account system previously authenticated in the context of an initial application can be accessed by a second application without necessitating the user to supply account credentials to the third party account system a second time.

Figure 6A:
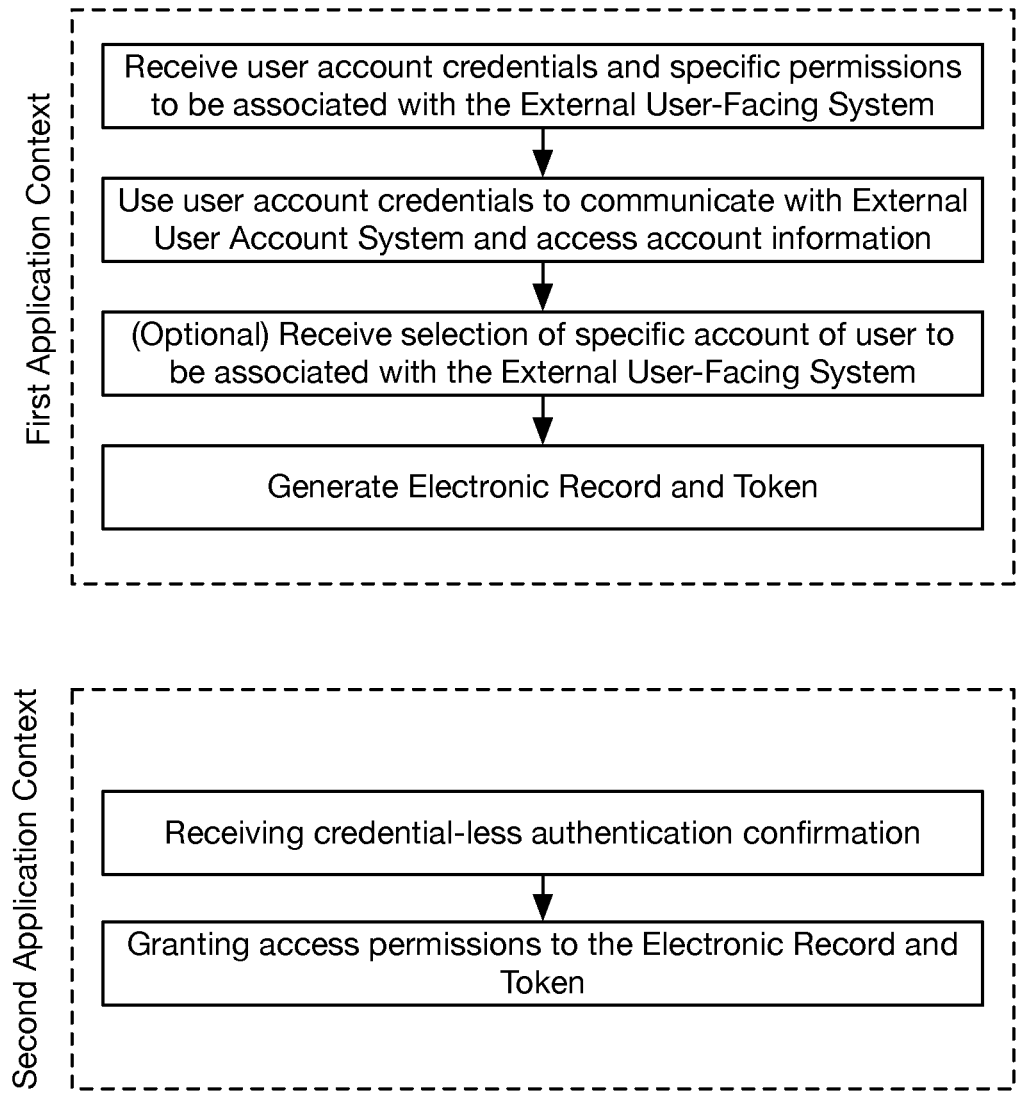
FIGS. 6A and 6B are flowchart representations of virtualized authentication used in combination with credential-less authentication for a second application.

In one preferred implementation using virtualized authentication described below, a permissions management system may make use of an electronic record of user account data and tokens in managing access to a third party account system. Creation and access to the tokens and/or any form of access key may be managed in a variety of ways. In one exemplary implementation shown in FIG. 6A, user account credentials can be used to communicate to an external third-party account system when in a first application context. Account information can be accessed and then an electronic record of related account information (e.g., account information, transaction information) and a token can be generated. The electronic record and token can serve as an account link. When in a second application context, credential-less authentication can be confirmed and access to the electronic record and token can be permitted.

Figure 6B:
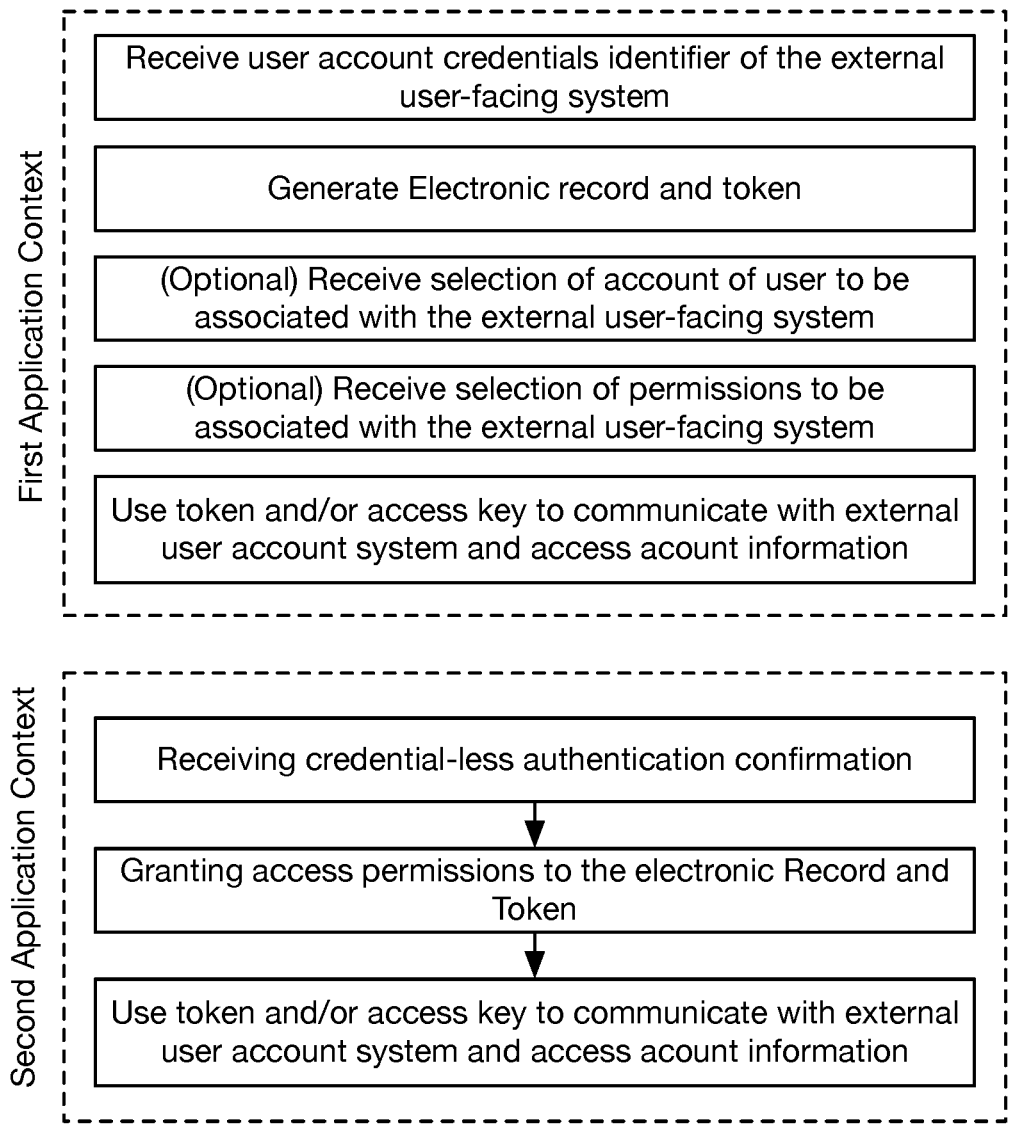

In another exemplary implementation shown in FIG. 6B, user account credentials can be used to communicate to an external third-party account system when in a first application context. An electronic record and token can be generated. The token and/or an access key can then be used to communicate with the external third party account system. When in a second application context, credential-less authentication can be confirmed and access to the electronic record and token can be permitted. The token and/or access key can then be used in connection with the second application to access account information of the third-party account system.

In the security integration variation shown in FIG. 9, an access token is communicated to a backend server of the first application. Similarly, an access token can be uniquely associated with the access link and the second application context (e.g., the second application developer account), and communicated to an application server of the second application. More specifically, this may include on successfully completing use of the authentication module, communicating a public token to a second application client (e.g., as a API response, as a callback, as an asynchronous communication, etc.); receiving a request supplying the public token from a second application server and responding with the access token of the second application context. The second application server preferably securely stores the access token along with any account link identifying information similar to the first application server discussed above. The second application server may then use the access token to signal to the account-linking service permission to access the user account of the account service.

Block S232, which includes establishing the account link to the user account of the account service using user credentials, functions to re-enable credential-based authentication upon failure to successfully verify eligibility. An inability to adequately verify eligibility is not an indicator that the user cannot establish an account link. Accordingly, the method preferably can default to credential-based authentication when appropriate. Block S232 can be substantially similar block S120. In S232, an existing account link may exist. Similarly, information may have been previously acquired for the existing account link. Instead of creating a distinct account link and set of data, the account-linking service may enable access to the existing account link if credential-based authentication is successful. Alternatively, a second account link that is independent of the first account link may be created and used for interactions within the second application context.

Ultimately, if a user is not eligible and is unable to properly authenticate with the account service, then access to the account link is not permitted. Failure to successfully obtain access may be tracked and used in fraud detection and/or in altering eligibility verification.

In one preferred variation, established and granted access to an account may be used for various application-specific purposes. Preferably an account link can be used to request and obtain information of an associated user account of an account service. An account link may alternatively or additionally be used in initiating actions or interactions on behalf of a user account of an account service.

In a similar manner to initially authenticating, accessing information and/or directing actions through an account link may include accessing a user account of the account service through a provided programmatic interface (e.g., a bank account API) or by emulating a user interface to access a user account of the account service.

4. Authentication Process and System

The systems and methods described herein for linking to accounts using credential-less authentication may make use of a system and process for securely and efficiently obtaining user account data via instantiation of virtualized or simulated instances of first-party software applications. Such an authentication system and process may be particularly useful in environments where an account-linking service may have no or limited access to a public API of a third-party account service. The financial space where online banking systems, credit card systems, and/or other financial account services may provide limited or no public API access. The systems and processes for authentication used in some variations can include generation of proxy, virtualized, or simulated instances of software applications that are configured to interface with external systems via public or non-public (e.g., proprietary) application programming interfaces (APIs). The virtualized or simulated instances of the software applications may be authenticated with the external systems as if the virtualized/simulated instances are actually first-party software applications executing on a user computing device. Via the public/non-public APIs user account information may be obtained and processed, such that the data may be normalized and provided to other software systems via a normalized API of the system. Accordingly, the systems of the present disclosure may be significantly more efficient at obtaining user account data from external systems than previous techniques. Further, the user account data may be normalized and requested and/or provided via a normalized API, enabling others to efficiently access such data (originally obtained from multiple external systems) from a single standardized interface in a highly efficient manner.

The virtualized authentication systems and processes can be used in establishing an account link during an initial request of a first application and for permitting access to the account link for another application instance. In other words, a user may first make use of the virtualized authentication systems and processes in first establishing a link with a third-party account service. Subsequent access to the third-party account service that is enabled through credential-less authentication as described above may then make use of the established link that was previously established.

Virtualized authentication systems and processes may also relate to systems (e.g., a permissions management system) and techniques for enabling a user to securely authorize a third-party system to initiate transactions related to an account, without disclosing to the third-party system the account credentials (e.g., an identity of the account). Such transactions may include, for example, initiating an electronic payment, or the like. Further, the systems and techniques of the present disclosure may enable the user to securely de-authorize the third-party system from initiating transactions related to the account. The disclosure includes, in some embodiments, automatic generation of electronic records that securely store account information. In some implementations the electronic records may include one or more permissions related to the account and the third-party (e.g., an application). A token (e.g., a unique identifier associated with the electronic record, also referred to herein as a "unique record identifier") may be shared with the third-party system, but in some implementations neither the electronic record itself, nor the user account credentials, may be shared with the third-party. Accordingly, the third-party (e.g., a merchant system or a software application developed by a developer) may request user account data and/or initiate transactions by providing the token, but does not itself know, e.g., account number, etc. Further, in some implementations the user may set various permissions related to the token/electronic record, and may also revoke permissions associated with the token/electronic record (e.g., de-authorize the third-party), thus providing increased security to the user's account. The disclosure further includes various interactive user interfaces to facilitate the above-described functionality.

In various embodiments, large amounts of data are automatically and dynamically retrieved and processed in response to application programming interface (API) requests and other user inputs, and the retrieved data is efficiently and compactly accessible to a customer or user also via normalized API responses from the system. The data is retrieved in an efficient way via instantiation of virtualized/simulated instances of mobile applications, for example. Thus, in some embodiments, the API interfaces described herein are more efficient as compared to previous interfaces in which data is not normalized and compactly and efficiently provided to the customer user in response to such requests. Advantageously, using the system, the customer or user may access data from multiple disparate data sources (e.g., data stores) and/or systems, each of which may use a proprietary interface, in a standardized way.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein, which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, transaction and account data and may enable a customer user to more quickly and accurately access, navigate, assess, and digest the account data than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various aspects and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as mentioned above, existing account and/or transaction data retrieval technology is limited in various ways (e.g., interfaces differ for each system or source, data is provided in different formats, etc.), and various embodiments of the disclosure provide significant improvements over such technology. Additionally, various embodiments of the present disclosure are inextricably tied to computer technology. In particular, various embodiments rely on receipt of computer-based API requests, accessing of transaction and/or other data via, e.g., virtualized/simulated instances of mobile applications, normalization of retrieved data, and responses to the requests via the API in a standardized way. Such features and others are intimately tied to, and enabled by, computer technology, and would not exist except for computer technology. For example, the API request and responses, and instantiation of virtualized/simulated instances of e.g., mobile applications, described below in reference to various embodiments, cannot reasonably be performed by humans alone, without the computer technology upon which they are implemented. Further, the implementation of the various embodiments of the present disclosure via computer technology enables many of the advantages described herein, including more efficient interaction with, various types of data.

According to an embodiment, a method is disclosed comprising: at a financial platform system constructed to programmatically access financial data: creating an application proxy instance that simulates an application of an external financial service system; receiving a normalized account request for financial data of the external financial service system for a specified account, the normalized account request being provided by an external financial application system by using a financial data API of the financial platform system; responsive to the normalized account request: negotiating communication with the external financial service system by using the application proxy instance to access the requested financial data from the external financial service system by using a proprietary Application Programming Interface (API) of the external financial service system; and providing the financial data to the external financial application system as a response to the normalized account request.

4.1 Overview of Virtualized Authentication

As mentioned above, according to various embodiments systems are disclosed for securely and efficiently obtaining user account data via instantiation of virtualized or simulated instances of first-party software applications. For example, the systems of the present disclosure include generation of proxy, virtualized, or simulated instances of software applications that are configured to interface with external systems via public or non-public (e.g., proprietary) application programming interfaces (APIs). The virtualized or simulated instances of the software applications may be authenticated with the external systems as if the virtualized/simulated instances are actually first-party software applications executing on a user computing device. Via the public/non-public APIs user account information may be obtained and processed, such that the data may be normalized and provided to other software systems via a normalized API of the system. Accordingly, the systems of the present disclosure may be significantly more efficient at obtaining user account data from external systems than previous techniques. Further, the user account data may be normalized and provided via a normalized API, enabling others to efficiently access such data (originally obtained from multiple external systems) from a single standardized interface in a highly efficient manner.

As also mentioned above, embodiments of the present disclosure also relate to systems (e.g., a permissions management system) and techniques for enabling a user to securely authorize a third-party system to initiate transactions related to an account, without disclosing to the third-party system the account credentials (e.g., an identity of the account). Such transactions may include, for example, initiating an electronic payment, or the like. Further, the systems and techniques of the present disclosure may enable the user to securely de-authorize the third-party system from initiating transactions related to the account. The disclosure includes, in some embodiments, automatic generation of electronic records that securely store account information. In some implementations the electronic records may include one or more permissions related to the account and the third-party. A token (e.g., a unique identifier associated with the electronic record, also referred to herein as a "unique record identifier") may be shared with the third-party system, but neither the electronic record itself, nor the user account credentials, may be shared with the third-party. Accordingly, the third-party (e.g., a merchant system or a software application developed by a developer) may request user account data and/or initiate transactions by providing the token, but does not itself know, e.g., account number, etc. Further, in some implementations the user may set various permissions related to the token/electronic record, and may also revoke permissions associated with the token/electronic record (e.g., de-authorize the third-party), thus providing increased security to the user's account. The disclosure further includes various interactive user interfaces to facilitate the above-described functionality.

Various other aspects of the disclosure are described below in detail.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

In order to facilitate an understanding of the systems and methods for virtualized authentication discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

Permissions Management System (also referred to herein as "the system"): A computing system, the functionality of which is described in detail in the present disclosure. Functions of the permissions management system (which are described in further detail below) include, but are not limited to: accessing and/or extracting user account data from external user account systems; initiating execution of, or executing, transactions via external user account systems; generating secure electronic records and tokens (e.g., unique identifiers associated with the electronic records) based on user account data; enabling permissioning of access to, and execution of transactions on, user accounts on the user account systems; enabling revocation of permissions for, or de-authorization of, access to user accounts on the user account systems; and/or enabling revocation of permissions for, or de-authorization of, rights to execute transactions via user accounts on the user account systems. One or more of these functionalities may be implemented via the permissions management system, as described below, and may be accessible to customers via a standardized application programming interface (API). Accordingly, a customer may access any of the functionality of the permissions management system (including, e.g., accessing user account data, permissioning access to user account data, etc.), via the standardized application programming interface (API).

External User Account System: A computing system or service of an external institution. For ease of description, general references herein to external institutions (or more simply "institutions") may be understood to refer to the external user account systems of those institutions. Accordingly, external user account systems may also be referred to herein as "external institution system," "external bank systems," "bank systems," "banks," "institutions," "external services," and/or the like. As described below, external user account systems may provide public and/or non-public (e.g., proprietary) application programming interfaces (APIs) by which user account data may be accessed by first-party software applications (e.g., mobile device software applications) of the external institutions. However, as further described below, the system of the present disclosure may enable access to user account data via such public/non-public APIs of the external user account systems by, e.g., instantiating virtual and/or proxy instances of the first-party software applications of the external institutions. External user accounts may also be referred to herein as "user accounts."

External Institution: An entity that maintains a user account. Examples of external institutions (also referred to herein as "institutions") include, but are not limited to, banks, credit card providers, investment services, loan providers, and/or other suitable financial institutions or user account holding institutions.

Application Programming Interface (API): A set of routines, protocols, and/or tools for building a software application. Generally an API defines a standardized set of operations, inputs, outputs, and underlying types, such that functionality is accessible via the API in an efficient way. The system provides an API by which a customer may access any of the functionality of the system, as described herein. Accordingly, the system advantageously abstracts away (from a customer's perspective), much of the complexity that may be involved in the functionality of the system, and enables the customer to quickly and efficiently leverage the functionality of the system to build other systems and services.

Customer: One who makes use of the API of the system to access functionality of the system in a software application of the customer, as described herein. Customers of the system may include, but are not limited to, software developers (who may be developing, e.g., a software application such as a store, or mobile app), third-party processors (e.g., third-party payment processors), external institutions, merchants, and/or the like.

External User-Facing System/Application: A software application and/or computing system of a customer (e.g., developed by a customer) that interacts with the system via the API of the system. Examples of external user-facing systems/applications include, but are not limited to, desktop software applications, mobile device software applications, server software applications, and/or the like. In general, external user-facing systems/applications provide goods or services to a user. In some instances, for ease of description, such software applications may be referred to herein as "apps." Additionally, external user-facing systems/applications may also be referred to herein as "developer systems," "developer computing devices," and/or the like. Examples of external user-facing systems/applications include apps for payment processing, account data review/analysis, budgeting, account monitoring, providing recommendations for savings, etc.

Third-Party Processor: An entity that processes transactions, e.g., financial transactions for a merchant. When provided with account information (e.g., credit/debit card information, bank account information, etc.) and payment information (e.g., how much to pay, to whom, and when, etc.), executes and processes a transaction. In some implementations, the system may interact with one or more third-party processor systems to execute and/or process payments. Alternatively, the system may include functionality to process transactions, and thus may effectively act as its own "third-party" processor (thus, "third-party" is somewhat of a misnomer in this context, but the term "third-party" is used in the present disclosure for clarity purposes). Third-party processors may be referred to herein as "trusted" third-party processors, because in some implementations the third-party processor is entrusted with user account data that, for example, an external user-facing system/application is not. Third-party processors may be referred to herein as "third-party transaction processors." As used herein, the term "transactions" may include any of various types of activities related to accounts, including but not limited to: financial transactions (e.g., ACH transfers, credit card transactions, debit card transactions, other types of payments or money transfers, etc.), updating account information, setting up alerts, etc. The system may additionally enable various other types of activities (e.g., updating account information, requesting services, etc.) that in some instances may be referred to herein as executing transactions, and/or the like.

User: A holder of a user account at an external institution. In general, a user maintains account credentials for accessing their user account, and provides authorizations and/or de-authorizations for an external user-facing system/application of a customer (e.g., an "app" of a developer) to limitedly and securely access the user account (e.g., to initiate payments for goods or services). Such authorizations and/or de-authorizations (among other functionality) are enabled by the system and via the API of the system, as described herein. Advantageously, according to some embodiments, the user's account credentials are never accessible to the external user-facing system/application. Rather, the system may securely enable the user to indicate authorizations and/or de-authorizations, without revealing the account credentials outside of the system (and/or trusted entities of the system, such as a trusted third-party processor).

User Input (also referred to as "input."): A person's (e.g., a user or customer) interactions with a computing system, such as any type of input provided by a user/customer that is intended to be received and/or stored by the system, to cause an update to data that is displayed and/or stored by the system, to cause an update to the way that data is displayed and/or stored by the system, and/or the like. Non-limiting examples of such user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

4.2. Example Systems and Methods for Programmatically Accessing User Account Data FIG. 11 illustrates certain aspects of a computing system 100 (e.g., the system) that may access user account data from one or more external user account systems. The system 100 may include an application programming interface (API) service 110, an application proxy system 120, and at least one institution interface module (e.g., modules 131, 132, and 133). The system functions to provide programmatic access to one or more external user account systems (e.g., external user account systems 141, 142, and 143) that lack exposed programmatic access. The external user account systems may comprise proprietary and external financial services (e.g., financial institution services, among others, as described above). Such institutions may have first party software applications (e.g., mobile applications) that enable users to access user account data/information from a mobile or desktop device. Such first party applications commonly use proprietary or customized application programming interfaces (API) (e.g., APIs 161, 162, and 163). These APIs are commonly not public and not exposed. For example, a developer is commonly prevented from registering an account and using an open API authentication approach to arbitrarily access the API resources of such external user account systems. Additionally, the APIs (e.g., APIs 161, 162, and 163) of the external user account systems are a non-trivial customized interface protocols that may not be shared with other institutions; e.g., each external user account system conforms to its own interface.

The system 100 functions to provide a normalized interface (e.g., API service 110) to the one or more external user account systems (e.g., external user account systems 141, 142, and 143). The system 100 enables access to a user account within an external user account system by leveraging the application proxy system 120. A virtualized "image" or digital simulation of an application instance is maintained in the application proxy system 120 and used to access the unexposed API (e.g., APIs 161, 162, and 163) of the external user account system. While the system may be applied to financial institutions, the system may additionally or alternatively be applied to providing API access to other external systems with closed or limited API access.

The API 110 of the system functions to provide a normalized customer facing interface. The API 110 may be normalized in the sense that the underlying non-public (or public) API to the external user account system (e.g., external user account systems 141, 142, and 143) that acts as the source of the user account data is abstracted away, and the API 110 to various different external user account systems is substantially standardized. In some variations, various aspects of the API 110 may be limited when interfacing with external user account systems. For example, one institution may not support a feature such as digital check deposit, while a second institution does. In this case, the API 110 may define the API such that the API feature for check deposit is prevented for the first institution. The system 100, and more specifically the API 110, may be used to provide an accessible API service to customers, e.g., outside developers. As such, the system 100 is may be a multi-tenant system that allows numerous accounts to share use of the system 100. The system 100 and more particularly the API 110 may alternatively be a single tenant system. For example, the system may be used as an internal system to a website providing an online financial management product.

The API service 110 may be a RESTful API, but may alternatively be any suitable API such as SOAP or custom protocol. The RESTful API works according to an HTTP request and response model. HTTP requests (or any suitable request communication) to the system 100 may observe the principles of a RESTful design. RESTful is understood in this document to describe a Representational State Transfer architecture as is known in the art. The RESTful HTTP requests may be stateless, thus each message communicated contains all necessary information for processing the request and generating a response. The API service 110 can include various resources that act as endpoints that act as a mechanism for specifying requested information or requesting particular actions. The resources can be expressed as URI's or resource paths. The RESTful API resources can additionally be responsive to different types of HTTP methods such as GET, PUT, POST and/or DELETE.

The API service 110 can provide an interface into a variety of information and action resources, as provided by the system 100. Information/data relating to a user account may be accessible through querying particular API resources via the API 110. For example, a list of transactions and information about each individual transaction may be accessible through different API calls of the API 110. Information can additionally relate to account summary information, account details such as address and contact information, information about other parties such as the entities involved in a transaction, and/or any suitable information. The API 110 may additionally be used to trigger or facilitate performing some action. For example, an API call may be used in transferring money, updating account information, setting up alerts, or performing any suitable action. Those skilled in the art will appreciate that such example API features that any suitable API feature possibilities and semantic architecture may be used.

In one example implementation, an API call via the API 110 can support adding a user, completing authentication, accessing transaction information, and other actions. For example, an application may POST to a "/connect" REST API resource of the API 110 to authenticate a user; if an institution includes multi-factor authentication, then a "/connect/step" resource can be submitted to complete multi-factor authentication credentials; and then performing a GET on the "/connect" resource can access transactional data related to the user/user's account. The API 110 may additionally include informational resources to access information about entities involved in transactions. For example, the API 110 may allow a particular business resource to be accessed to obtain contextual information about the business such as name, location, and classification.

The application proxy system 120 functions to manage a simulation of a first-party software application access to an institution. The application proxy system 120 operates in cooperation with one or more institution interface modules (e.g., institution interface modules 131, 132, and 133) to establish a data model and/or a data image that acts as a virtualized or simulated application instance (also referred to herein as an "application proxy instance," "proxy instance," "virtualized instance," "simulated instance," and/or the like) (e.g., proxy instances 121, 122, and 123). From the perspective of the institution, the proxy instance (e.g., proxy instances 121, 122, and 123) appears as a first-party application (e.g., Bank 2 application 153) installed on a physical user device (e.g., user devices 171 and 172) that is being used by a user. In other words, the requests received from the proxy instance are treated like requests from a first-party mobile app, desktop app, or web-based application of the user. The application proxy system 120 may store and maintain a plurality of application proxy instances (e.g., proxy instances 121, 122, and 123). The proxy instances may include configuration settings and properties that, when used according to a defined institution interface (e.g., an institution interface of an institution interface module 131, 132, and/or 133), will appear as requests from first-party applications (e.g., application 153) of the institution (e.g., institution 141, 142, and/or 143). A different proxy instance may be created and maintained for each user account-institution pair. A given user may have multiple user accounts with different institutions. A proxy instance may include a set of properties that can be used to authenticate the proxy instance with the institution system (e.g., institution 141, 142, and/or 143). The application proxy system 120 provides a method to programmatically create a proxy instance for a user. The user may provide some account credentials that can be used in an initial registration of the proxy instance with the non-public or public API of the institution. The proxy instance may be characterized as a set of properties that can be stored and maintained. Some of those properties may be automatically generated, may be provided from the institution during negotiating registration, may be properties of the application that is being simulated, and/or may include any suitable identifying and authenticating information. The properties may include a unique user identifier code, an authentication token, a MAC address (e.g., a MAC address of a user device 171 or 172), or any suitable information. When a request is made to a bank on behalf of a user, the properties of the proxy instance may be invoked to gain access to the institution on behalf of the associated user.

FIG. 12 depicts example proxy instances 121, 122, and 123 of FIG. 11. As shown in FIG. 12, User A has accounts in Bank 1 and Bank 2, and User B has accounts in Bank 2. As shown in FIG. 12, each proxy instance includes account credentials and properties.

An institution interface module (e.g., one of institution interface modules 131, 132, or 133) functions to model the internal interface (e.g., interaction with one of APIs 161, 162, or 163) of at least one application (e.g., the application 153) with an external institution (e.g., one of institutions 141, 142, or 143). An institution interface module may be established for each institution with which the system 100 can interface. For example, an institution interface module may exist for each bank and/or credit card company that is available in the system. The institution interface module may include a set of rules and processes of a particular institution. The institution interface module may include a proxy sub-module that defines how the institution recognizes and/or authenticates a particular application. Some banks may depend on the MAC address of a device (e.g., a MAC address of user devices 171 and/or 172), some may depend on asymmetric cryptography tokens, and others may generate encrypted tokens. The proxy sub-module is used in establishing the proxy instance information. The institution interface module can additionally include institution protocol sub-module, which defines a mapping between provided API 110 functionality and the form and mode of communication with the external institution (e.g., institutions 141, 142, or 143). The institution protocol sub-module can define the headers, body, and other properties of messages sent to the associated institution. The protocol sub-module may additionally define how data should be processed to form that message. In some cases, the data may be encrypted in a standard or proprietary format, which the protocol sub-module can define. Additionally, the protocol sub-module can define the communication flow to fulfill a request. In some cases, multiple requests may need to be made to complete a request objective. Other aspects of interacting with an interface (e.g., APIs 161, 162, and/or 163) of an external institution (e.g., institutions 141, 142, and/or 143) may additionally be built into the institution interface module such as multi-factor authentication rules.

An institution interface module may be constructed based on use of an actual first-party application (e.g., the application 153). For example, communication of, and/or source code of, the first-party application can be parsed and analyzed to establish some or all of an institution interface module. In some implementations, source code of a first-party application (e.g., the application 153) of an external institution is parsed and analyzed to establish some or all of an institution interface module for the external institution. In some implementations, communication between an external institution and a first-party application (e.g. the application 153) of the external institution is parsed and analyzed to establish some or all of an institution interface module for the external institution.

Figure 13:
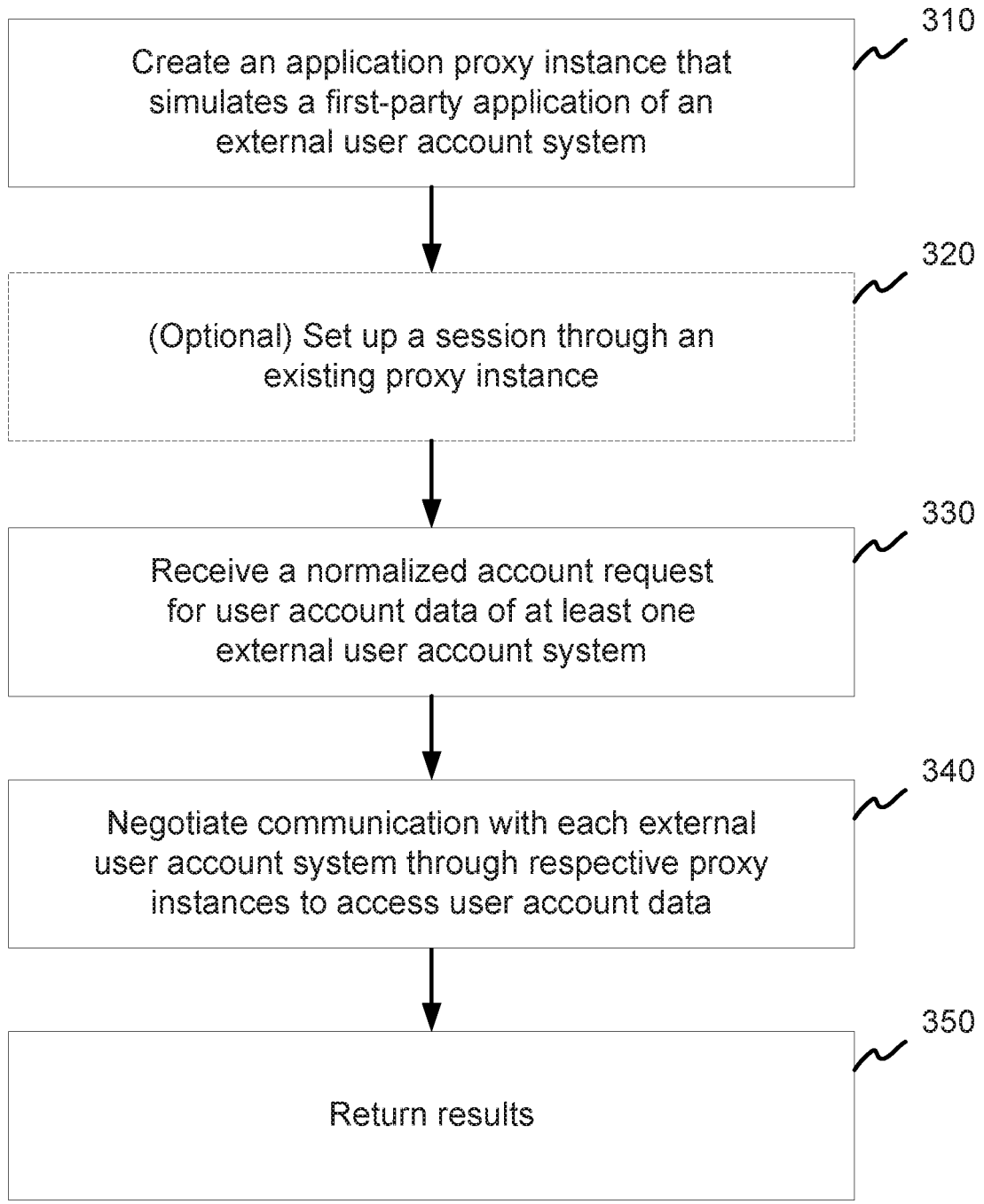
FIG. 13 is a flowchart illustrating an example method of accessing user account data, according to an embodiment.

FIG. 13 is a flowchart illustrating an example method of accessing user account data, according to an embodiment. As shown in FIG. 13, the method can include creating an application proxy instance (block 310), optionally setting up a communication session through the proxy instance (block 320), receiving a normalized account request (block 330), negotiating communication with an external interface through a proxy instance (block 340), and returning results (block 350). The method functions to provide programmatic access to one or more external services (e.g., external user account systems of external institutions) that lack exposed programmatic access. The external services may be non-public (e.g., proprietary) or public. The external services can be provided by external institutions, as described above. Such institutions may have first-party applications that enable users to access user account information via a mobile or desktop application. Such first-party applications may use a proprietary or customized API (e.g., API 161, 162, and/or 163) of the external institution. Such APIs are commonly not public and not exposed. For example, a developer is commonly prevented from registering an account and using an open API authentication approach to arbitrarily access the API resources of external institutions. Additionally, such APIs are non-trivial customized interface protocols that are not shared with other institutions, e.g., each institution conforms to its own interface. The method can additionally provide a normalized interface to a plurality of external services (e.g., external institutions 141, 142, and/or 143). The method enables a programmatic interface into an account within an institution by leveraging an application proxy approach. A virtualized "image" or digital simulation of an application instance is maintained in the application proxy system 120 and used to access the unexposed API (e.g., API 161, 162, and/or 163) of the institution. While the system 100 may be applied to financial institutions, the system 100 may additionally or alternatively be applied to providing API access to any other external entities with closed or limited API access. The method may be implemented through the system 100 as described above, but may alternatively be implemented by any suitable system.

At block 310, which includes creating an application proxy instance (e.g., an application proxy instance 121, 122, and/or 123), the system 100 functions to establish a digital image of a first-party application instance (e.g., the application instance 153) for a selected institution (e.g., the Bank 2 142). Creating an application proxy instances may be initiated in response to receiving an initial request. The initial request may be initiated by a user (or entity) (e.g., User A or User B) interacting with an external user-facing system/application (e.g., application instances 151 and/or 152, executing on either of user devices 171 or 172 and/or another suitable device, and/or further executing on another system of the application instances 151, 152) of a customer (e.g., a developer). The external user-facing system/application may then send the initial request to the system 100. The user (e.g., User A and/or User B) may have a user account with the external institution (e.g., an online bank account). An application proxy instance (e.g., one of proxy instances 121, 122, and/or 123) can be created during the initial registration or at a later time, which will provide access to account information of the external institution. Once created, the application proxy instance of that user can be persisted and used at a later time for that given user-institution combination (e.g., "User A-Bank 1", "User A-Bank 2", "User B-Bank 2"). However, a new proxy instance may be created when the proxy instance becomes invalid (e.g., as a result of institution API changes, password/login changes made within the institution, and/or other changes to invalidate a proxy instance). The initial request may be received through a normalized API (e.g., API 110) as a connection request. The connection request may be accompanied by parameters that specify a selected institution (if there are multiple institution options) and user credentials for the institution. The user credentials may include a username, password, pin code, and/or any suitable credentials. The API request may additionally include authentication credentials such as a client identifier and secret token that is associated with the account in the system.

Creating a proxy instance may include negotiating registration of the proxy instance with the institution, which functions to establish the proxy instance with the selected external institution. An institution interface module (e.g., one of the modules 131, 132, or 133) may facilitate navigating the communication handshaking during the initial login. Different institutions may have different processes to register or enroll a new application (which in the method is a proxy instance) such as multi-factor authentication. During the negotiation, various elements may be extracted and stored as part of the proxy instance. Similarly, some properties may be generated based on communication with the institution. For example, a MAC address or a unique device identifier may be used in connecting to the services of the external institution. Such properties may be stored as part of the proxy instance.

As mentioned above, multifactor authentication (MFA) may be part of negotiating with an external institution. For example, an external institution may respond with indication of a MFA credential requirement. Such MFA requirements may be fulfilled by relaying the MFA challenge/task up to a user. In one implementation, the system 100 receives a message indicating that a security question should be asked to complete the negotiation. The security question is passed back to the associated application (e.g., applications 151 and/or 152, which may be operated by a customer/developer account of the system 100). Then, the associated application may present the security question in some manner to obtain the user response. The MFA can include security questions, additional pin codes (such as those supplied by a one-time password generator or a code transmitted to a secondary device), or any suitable form of MFA.

At block 330, the system receives a normalized account request via the API 110 of the system 100. As mentioned above, the syntax and mode of communicating an API request is normalized such that the format is independent of the institution. The requests can include a variety of types of requests which may include: obtaining a list of transactions; requesting details on a particular transaction; performing some financial transfer (moving money from savings to checking, setting up transfer to another account, making scheduled payments, digital deposit of a check, and/or the like), updating account information (e.g., updating contact information, changing password, manage alerts, and/or the like), requesting services (e.g., new cards, reporting fraud, and/or the like), and/or the like. A normalized account request may be mapped to an institution interface module (e.g., one of the institution interface modules 131, 132, or 133) or other suitable component that defines communication to fulfill the API request.

At block 340, which includes negotiating communication with an external interface (e.g., one of APIs 161, 162, and/or 163) through a proxy instance (e.g., one of the proxy instances 121, 122, and/or 123), the system 100 functions to execute and manage communication between the system and an external institution system (e.g., one of systems 141, 142, and/or 143) when fulfilling an account request. The proxy instance (e.g., one of the proxy instances 121, 122, and/or 123) provides a mechanism through which access may be granted. The communication is executed while an authenticated session is active. Communication sessions may be expired by the system 100 or the external institution for various reasons, such as remaining inactive for a set amount of time. A communication session may be active subsequent to enrolling a proxy instance or may require setting up a session through the proxy instance as described below.

Negotiating communication may include creating requests that conform to expected messages of the external institution. This can include setting headers, body contents, and other message properties. An institution may expect particular headers. For example, the headers may include a host or path, a data, content type, cookies, MAC address, a user identifier, authorization properties, and/or other suitable headers. Creating requests can additionally include transforming request properties into an expected form, which may include applying a set encryption pattern to a request. In one variation, transforming the request involves encrypting content according to a public key, wherein the public key may be stored as part of the proxy instance. The institutions may take varying approaches to how information is communicated. In an alternative institution, the contents of a message may be unencrypted, in which case, the contents may be submitted in a plaintext, unencrypted form. In addition to creating requests that conform to expected messages of the external institution, the method can include following a request-response pattern. That pattern can involve a single request and response, but may alternatively include a sequence of different request and responses to obtain desired information.

In some variations, information or actions may not be available through the first proxy instance and so the method may include automatically switching to a second proxy instance with supported functionality. For example, full bank statements may not be available in a mobile application, and the institution API (e.g., one of APIs 161, 162, and/or 163) may not include such functionality. Accordingly, when that functionality is required to fulfill an API request of the API 110, then a second proxy interface may be used. In some variations, an API request via the API 110 may require multiple institutions to be queried. Such an API request may be particularly useful for summarizing financial statements across multiple accounts. The method can include negotiating communication for multiple institutions and combining results into a combined form.

At block 350, which includes returning results, the system 100 functions to deliver the results as a response to the request. Returning the results includes transforming the data obtained from the external institution into a normalized form. The information is formatted into a standardized format that is substantially similar in representation between different institutions served by the system 100. Transforming the data can additionally include processing, supplementing, and/or otherwise enhancing information. Some information provided by an institution may be poorly formed. For example, store information for a particular transaction may be poorly labeled and may be represented different from other institutions. Such contextual information about external entities can be cleaned and/or supplemented with additional information. For example, an entity may be supplemented with categorical labels, tags, geolocation information, and/or other suitable information. The returned results can be represented data format such as JSON, XML, or any suitable format.

The method can additionally optionally include block 320, which includes setting up a session through a proxy instance that was previously created, and functions to facilitate accessing information after negotiating a proxy instance for an account and institution. The proxy instance may store and maintain information required for subsequent access. The external institutions may restrict access to set sessions, which may expire after some amount of time or may require reconfirming user credentials. Thus, when an API request for an account occurs after a communication session has expired, then the method may automatically set up a new session using the previous user credentials and proxy instance credentials. In some variations, MFA challenges, such as security questions, may be automatically completed.

The method can additionally include re-capturing updated credentials, which functions to update user credentials for an institution. Updated credentials may be updated when a user changes them within the institution or when the proxy instance is otherwise locked out of the account. An error may occur indicating that a communication session was not successful, and then an API request can be submitted to update a proxy instance with new credentials.

Referring again to FIG. 11, in some implementations external user account system of the external institutions may include public web browser interfaces. For example, as shown in FIG. 11, the bank 1 system 141 may include a web browser interface 191 for accessing the bank 1 system 141 via a web browser (or any suitable web client) (e.g., web browser 181 of the user device 173). As described herein and further below in reference to FIGS. 16 and 17, the system 100 provides access to the user account data via private, proprietary APIs (e.g., API 161) of external institutions, as opposed to access via a public web browser interface 191. In some implementations, the web browser interface 191 is a web server that hosts a web site for access of the external institution system via a web browser over the Internet.

Figure 14A:
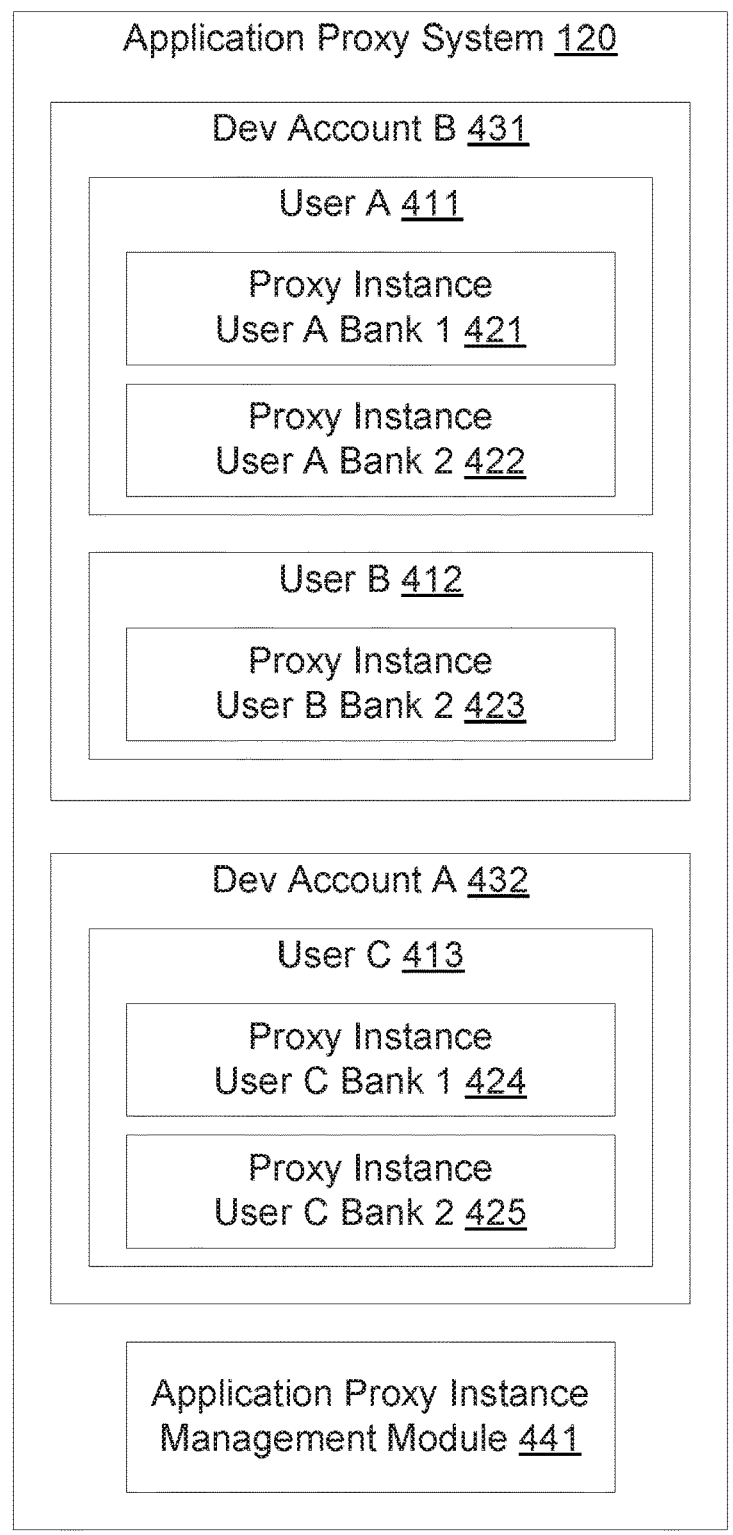
FIG. 14A illustrates aspects of an application proxy system, according to an embodiment.

FIG. 14A illustrates aspects of the application proxy system 120, according to an embodiment. As shown in FIG. 14A, the application proxy system 120 includes application proxy instances (e.g., proxy instances 421, 422, 423, 424, and 425) for user accounts (e.g., user accounts 411, 412 and 413) of developer accounts (e.g., Dev Account B 431 and Dev Account A 432) at the system 100. The application proxy system 120 includes an application proxy instance management module 441 that is constructed to generate application proxy instances, configure application proxy instances, remove application proxy instances, and/or the like.

In some implementations, each application proxy instance (e.g., proxy instances 421, 422, 423, 424, and/or 425), specifies a developer account, a user account of the developer account, an associated external user account system (e.g., an external institution), and credentials of the user account for the external institution, as shown in FIG. 14B. In some implementations, each application proxy instance specifies properties of the application proxy instance. In some implementations, properties include one or more of a unique user identifier code, an authentication token, a MAC address (e.g., a MAC address of a user device 171 and/or 172), or any suitable information.

In some implementations, the application proxy instance management module 441 creates the application proxy instance responsive to a request to create an application proxy instance. In some implementations, the request to create an application proxy instance specifies information identifying an external user account system, and a user account of an external user-facing system/application (e.g., a user account of the external user-facing system/application 152 of FIG. 11). In some implementations, the request to create an application proxy instance specifies user credentials for the external user account system. In some implementations, the request to create an application proxy instance specifies information identifying an account of the system 100 associated with the external user-facing systems/ application. In some implementations, the request to create an application proxy instance specifies properties for the application proxy instance. In some implementations, properties for the application proxy instance include at least one of a unique user identifier code, an authentication token, a MAC address, user accounts of the corresponding external user account system, and/or any other suitable information.

In some implementations, the application proxy instance management module 441 stores the created application proxy instance in association with a user account (e.g., "User A" 411 of FIGS. 14A and 14B) of an external user-facing system/application (e.g., a user account of the external user-facing system/application 152 of FIG. 11). In some implementations, the application proxy instance management module 441 stores the created application proxy instance in association with an account (e.g., "Dev Account B" 431 of FIGS. 14A and 14B) of the system 100 associated with an external user-facing system/application (e.g., a user account of the external user-facing system/application 152 of FIG. 11). In some implementations, the application proxy instance management module 441 stores the created application proxy instance (e.g., "Proxy Instance User A Bank 1" 421 of FIGS. 14A and 14B) in association with an account (e.g., "Dev Account B" 431) of the system 100 associated with an external user-facing systems/application, and a user account (e.g., "User A" 411) of the external user-facing systems/application. In some implementations, the application proxy instance management module 441 stores the created application proxy instance in association with an account of the system 100 associated with an external user-facing systems/application, a user account of the external user-facing systems/application, and information identifying the external user account system (e.g., "Bank 1 141" of FIG. 14B) of the application proxy instance. In some implementations, the application proxy instance management module 441 stores the created application proxy instance in association with an account of the system 100 associated with an external user-facing systems/application, a user account of the external user-facing systems/application, information identifying the external user account system of the application proxy instance, and information identifying user accounts of the application proxy instance.

In some implementations, creating the application proxy instance includes controlling the application proxy instance management module 441 to construct the application proxy instance to simulate communication, register, negotiate registration, and/or the like, of an application (e.g., application 153 of FIG. 11) (of the external user account system of the application proxy instance) with the external user account system on behalf of the user account (e.g., "User A", "User B") of the application system.

Additional examples and details of accessing user account data via proxy instances of the system may be found in U.S. patent application Ser. No. 14/790,840, filed Jul. 2, 2015, and titled "SYSTEM AND METHOD FOR PROGRAMMATICALLY ACCESSING FINANCIAL DATA" (referred to herein as "the '840 application"). The entire disclosure of this application is hereby made part of this specification as if set forth fully herein and incorporated by reference for all purposes, for all that it contains.

As mentioned above, the system 100 may also be used, via the API 110, to access various types of user account data, including documents (such as statements). The system 100 may also be used, via the API 110, to initiate transactions (such as a transfer of funds between accounts, schedule payments, etc.). The system 100 may also be used, via the API 110, to update account information or request services. Additional examples and details of such functionality of the system is provided below, and may also be found in the '840 application.

4.3. Example Systems and Methods for Programmatically Verifying Transactions

Figure 15:
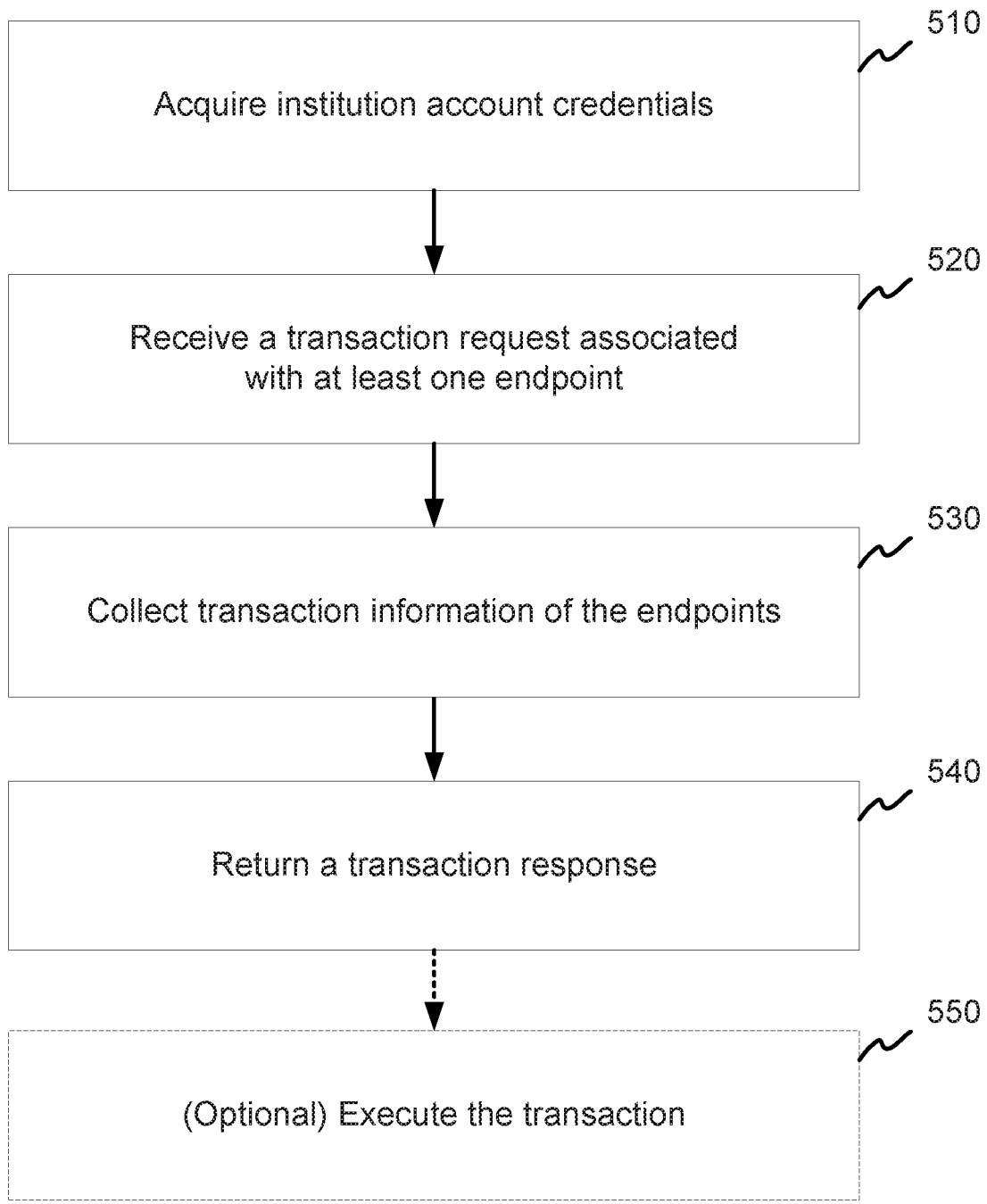
FIG. 15 is a flowchart illustrating an example method of processing transactions, according to an embodiment.

FIG. 15 is a flowchart illustrating an example method of processing transactions, according to an embodiment. As shown in FIG. 15, the method can include acquiring user account (also referred to herein as "institution account") credentials (block 510), receiving a transaction request associated with at least one endpoint (block 520), collecting transaction information of the endpoint (block 530), and returning a transaction response (block 540). In some embodiments, the method can optionally include executing the transaction (block 550), which functions to process the transaction between two endpoints. In some embodiments, the method does not perform execution of the transaction, receiving the transaction request functions to initiate the retrieval of transaction addressing information of the at least one endpoint, collecting transaction information of the endpoint includes collecting transaction addressing information of the endpoint, and returning a transaction response functions to transmit the collected transaction addressing information of the endpoint. The method functions to leverage account access during the transaction process. Variations of the method can be used to add functionality such as verifying account information used in financial transfers, programmatically transferring funds, setting programmatic events, catching errors and fraud, performing conditional processing of a transaction, and/or other suitable operations. The method may be performed by the system 100. In some implementations, the transactions are automated clearing house (ACH) transactions, but any suitable type of transaction may be used. In a first implementation, the method enables a customer/developer, via the API 110, to obtain verified ACH endpoint information. For example, an account number and a routing number may be obtained, as well as verification of ownership of the account. In this variation, the system 100 provides the information to execute the transaction. In another embodiment, the method additionally executes the transaction having obtaining the required information and verification. The method of FIG. 15 may be implemented by the system 100, but the method may alternatively be implemented by any suitable system.

Figure 16:
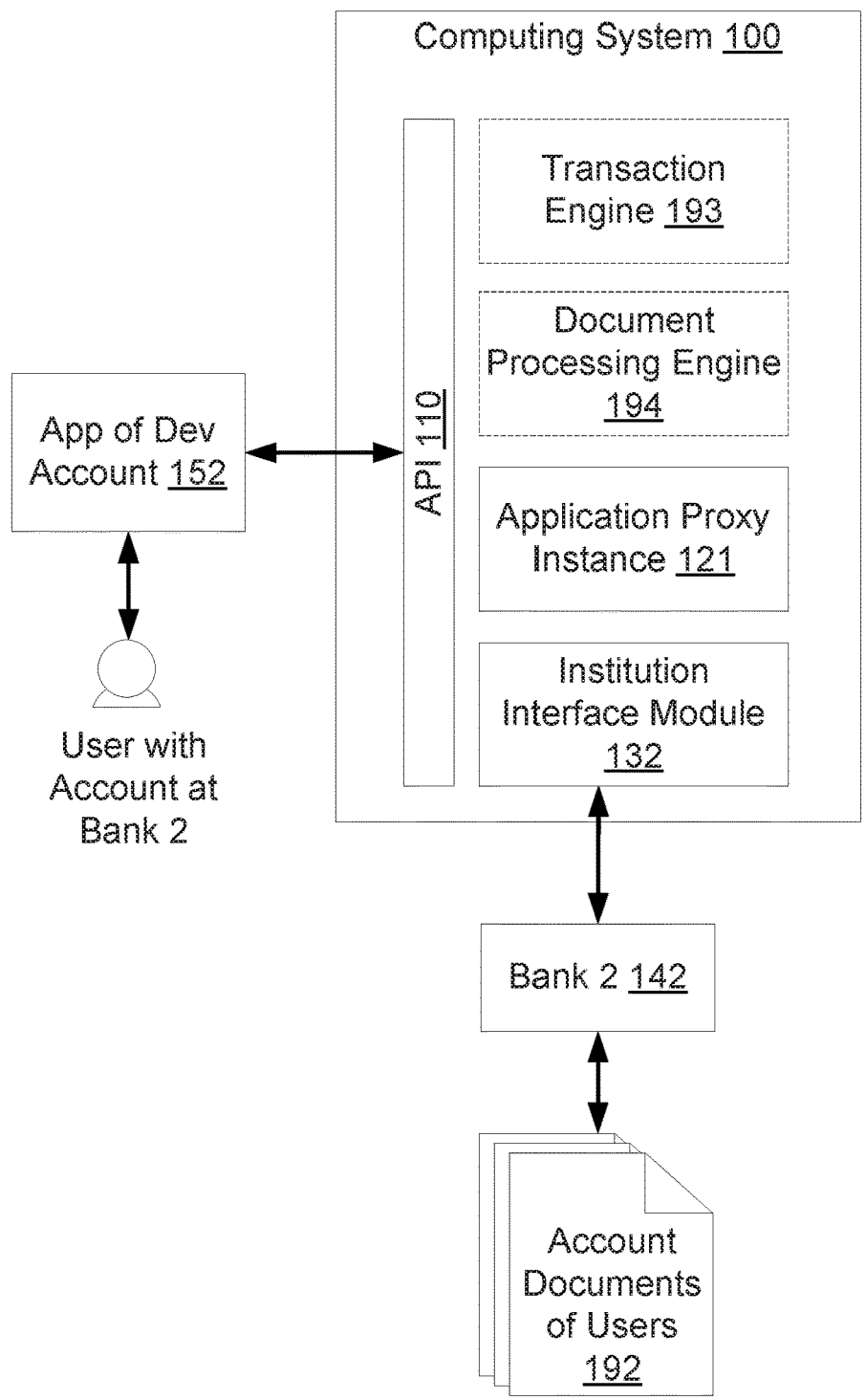
FIG. 16 is a simplified block diagram of the computing system and network environment of FIG. 11, according to an embodiment.

FIG. 16 is a simplified block diagram of the computing system and network environment of FIG. 11, according to an embodiment. The method of FIG. 15 is described below in reference to certain aspects of FIG. 16 (or, alternatively, FIG. 11)

At block 510, which includes acquiring institution account credentials, the system 100 functions to obtain login information for an institution (e.g., the institution 142). The institution account credentials may include a username and password. The account may be an account of an external institution. Additionally, an institution may include additionally authentication challenges such as a pin code, security questions, single-use passwords, secondary device code verification, biometric identification, and/or any suitable form of multi-factor authentication (MFA), as described above. Such additional authentication challenges may be collected at the same time of the account credentials, but the MFA authentication process may alternatively be defined in the API protocol. For example, if the primary account credentials are not sufficient, the MFA challenge may returned in a response, this additional credential request can be repeated as required before access to the account is obtained. The institution account credentials can additionally be stored, and automatically used to complete subsequent access or login attempts.

The account credentials may be provided through an API request of a customer/developer or application of the customer/developer to the API 110. The API 110 may be used in establishing, setting up, or enrolling a new user account. One user may have at least one associated user account at an external institution, but may be linked or associated with multiple user accounts at multiple external institutions. Account credentials may be obtained for each user account.

At block 520, which includes receiving a transaction request associated with at least one endpoint, the system 100 functions to initiate the retrieval of transaction addressing information of an endpoint. The endpoint may be a transaction endpoint, which may be any suitable endpoint from which funds may be withdrawn or deposited. In a common transaction, there is a single withdrawal account and a single deposit account. The method can be used in obtaining information for one or more endpoints. In some variations, there may be a plurality of withdrawal and/or deposit accounts. In one variation, the transaction request is identical to an enroll user request used to obtain the user credentials of block 510. The account credentials may alternatively be previously obtained or obtained in response to the transaction request.

In one variation, in which the transaction request is for information about an account, the API request may specify an institution and account credentials. Additional credentials may additionally be required such as a pin code, state in which an account was created, or MFA challenge answers. A second request with similar parameters may be submitted to obtain the account credentials for other involved transaction endpoints.

In another variation, the transaction request may explicitly define the transaction details. The transaction request may include at least one withdrawal account endpoint and deposit account endpoint. Account credentials may be specified for each endpoint. In one variation, a single API request may include account credentials for both endpoints. In another variation, a transaction resource is used, such that withdrawal endpoint information, deposit account information, and transaction details can be specified asynchronous. For example, a transaction resource is created through an API request via API 110. Later, an API request hits the new transaction resource (by specifying a transaction identifier) to specify withdrawal information, then deposit information, and then the amount to be transferred. Once all the information is populated, the transaction may be executed either automatically, in response to an executed command, or scheduled for a later time. Bulk, aggregate, or group transactions may additionally be specified in a request. If multiple entities are withdrawal endpoints, then the division of funds may be specified (e.g., a percentage breakdown or amount breakdown). Similarly, funds for multiple deposit endpoints may be specified.

At block 520, which includes collecting transaction information of the endpoint, the system 100 functions to access and determine properties of a transaction endpoint. Collecting transaction information of the endpoint may involve using the account credentials to gain account access in an institution. The account access may be facilitated by using a proxy application, as described above. The account access can be used to request and obtain account documents that include endpoint information. The account documents may include bank statements or other suitable documents. If the documents are in PDF or other alternative formats, the content may be scraped to identify transaction information.

At block 530, the system 100 collects transaction information and/or transaction addressing information of the endpoint. The account addressing information may be the account number and the routing number of an account. Billing address, wire routing number, and/or other account information can additionally be pulled. In one variation, the account number and routing number are available in banking statements. An extraction script may be used to pull the document and then isolate the information from the document. Accessing the account number and the routing number in an automated fashion may avoid chances of error. As a first benefit, access to the account provides evidence that the owner of the account participated in providing the transaction endpoint information. As another benefit, the information is automatically pulled, which avoids human error.

Collecting transaction information of the endpoint, at block 530, may additionally include collecting transaction status information of the endpoint, which can include indication of fund requirements, account fraud checks, and other status information. Various stages can be built into providing the transaction information, which provide different safeguards and/or features into financial transactions.

In a first optional stage, the transaction status information can determine a sufficient funds status. The sufficient funds status may be applied to a withdrawal account to ensure that the account has funds to complete the transaction. Transaction history and/or current fund value may be accessed through the account access. In one variation, the fund amount is returned in the response such that the customer/developer/application can respond appropriately. In another variation, the transaction amount is compared to available funds. If sufficient funds are not found, then an error or warning may be raised.

In another optional stage, the account may be processed for fraud patterns. For example, the age of the account may be accessed. Newly created accounts may be less trustworthy than established accounts with significant history. Similarly transaction history may be assessed for fraudulent behavior. If the account is used for a diverse range of transactions indicative of normal behavior then the account may be identified as normal. If the account only participates in repeated high value transactions or other fraud patterns, then the account may be flagged as fraudulent. Additionally, the entities involved in the transaction may be indicative of fraud.

The method may additionally include verifying transaction conditions during one or more stages. Transaction conditions may be used to take any suitable action. The available actions can include permitting a transaction or preventing a transaction. Additionally, the action can include sending a notification. The notification can include an email, text message, a platform message, a phone call, or any suitable notification. The action may additionally include triggering a programmatic event. In one variation the programmatic event is a callback event, wherein an HTTP message is sent to a destination. Conditions may be customized or selected from a set of provided conditions. Example conditions can include a condition that triggers a notification for transactions over a particular amount; a condition based on available funds after the transaction to alert a user to funds below a threshold; and a condition based on the frequency of transactions or the entities involved in the transaction account. Conditions can be scoped for a developer account, a particular institution account, or for any suitable scope of entities.

At block 540, the system 100 returns a transaction response so as to transmit the results of the transaction request. The transaction response is may be made in a synchronous API message from the API 110 that is sent in response to an initial request. Alternatively, a status API resource may be used such that an application/service can periodically check the status API resource to determine the processing status and/or the results. Alternatively, any suitable approach may be used to provide the results to the initial request.

In an implementation, the response provides the addressing information used for an endpoint. If there are no errors or warnings with respect to the account, then account information may be NACHA compliant as the endpoint information was accessed and obtained in a manner that validates the ownership of the account (e.g., by providing credentials and optionally multi-factor authentication responses). The transaction response can include the account number, the routing number, and/or any additional information for the endpoint that is used in executing the transaction. The transaction response may additionally include the available funds, such that the requesting entity can check for sufficient funds. The response may additionally indicate if sufficient funds are available if the transaction amount was provided, which functions to hide the available funds from the requesting entity while preventing overdraft transaction. The transaction response can additionally include other fields such as a status field, where the account may be labeled according to any categorization of the account. For example, the status may indicate that the account is normal or fraudulent.

Additionally or alternatively, the method can include optional block 550. At block 550 the system 100 executes the transaction, which functions to process the transaction between two endpoints. In this variation a request to execute a transaction between at least two endpoints is received. Additionally, returning a transaction response may include returning results of the transaction in the response. In another implementation, the method includes executing the transaction. The transaction response can include information about the status of the transaction when the transaction is submitted, being processed, and/or completed. Transactions may not be instantaneous, and as such the initial transaction response may indicate if the transaction was successfully initiated. Successfully initiated means that the transaction endpoint information was successfully retrieved, that any conditional stages (such as a sufficient funds stage, a fraud-check stage, and custom conditions) are satisfied. A subsequent response or status resource may be updated that reflects the status of the transaction. A transaction resource may be updated with a pending process, when the transaction is initiated and proceeding normally. The transaction resource can be updated with a completed status possibly indicating the time of completion. If an error or issue is encountered, the status of the transaction resource may be updated to reflect the error or issue. The method may additionally include monitoring status of transaction and triggering programmatic event according to the status.

In one variation, executing the transaction can include establishing proxy accounts in at least two institutions, and expediting transactions between the two institutions through an internal deposit to a first proxy account in a first institution and a second internal deposit from a second proxy account in the second institution. In some cases, transactions between institutions are slower than transactions made within an institution. By establishing a cross institution account network, transactions can be facilitated between two accounts in different institutions with similar speeds of internal transactions. The proxy accounts may include a funds reserve, which may be periodically balanced between proxy accounts to maintain an operational reserve of funds.

Additionally, the method may be applied to create an abstraction between a user and the underlying account. A transaction endpoint can be abstracted to a user entity, which may be associated with multiple optional transactional endpoints (e.g., different bank accounts). Accordingly, the method may include selecting an institution, which functions to dynamically select a connected account to participate in a transaction. Various conditions may be set to respond to events when receiving a transaction request, collecting information for the transaction, and/or executing a transaction. In one variation, one institution is set as a primary account and another account managed by the same entity is set as a secondary account. If the primary account is not able to complete a transaction, the method may detect an error condition and automatically fails over to the secondary account. In another variation, a set of accounts may be preconfigured to be used depending on properties of the request. In combination with the proxy transfer endpoint, the identifying information for the proxy endpoint can be used, but the underlying service automatically will use an automatically selected account to use for the funds. For example, a set of entities and/or category of entities/transactions may be set to use particular accounts. Similarly, transactions to one proxy account may be automatically split into transactions with multiple associated accounts. For example, an account holder may set a proxy account to automatically split deposits between two accounts in a 30/70 balance.

Referring now to FIG. 16, the system 100 functions to provide an interface (e.g., via the API 110) for applications and services that can facilitate the process of transferring funds. The system 100 can function to provide verified account information used in ACH transfers, to execute transfer of funds, to enable programmatic events during transfer process, to mitigate risk and errors, and/or provide alternative transaction functionality. As described above in reference to FIG. 11, the system 100 is part of a larger API platform, which provides an API to access account data and execute transactions, among other items. In some variations, the system 100 is part of a multi-tenant API platform that enables a plurality of developers to create accounts and build applications and/or services that leverage the API of the API platform. In alternative variations, the system 100 is part of a single-tenant API platform and may provide an internal API for a dedicated set of products or services. For example, a product may be built on top of the API platform that enables end users to create accounts to manage accounts with one or more institutions (e.g., banks, credit card companies, investment managers, etc.).

The API 110 functions to provide an interface for accessing institution transaction endpoint information. The API 110 can additionally provide a normalized customer facing interface. In one implementation, the API 110 leverages an application proxy instance 121, which simulates a proprietary first-party application accessing a closed API of an institution (e.g., the institution 142). The system 100 can include additional components or services that particularly facilitate the access of information relating to a transaction endpoint. For example, a service, script, or module can be configured to access statements or other suitable documents that can contain endpoint information such as account number and routing number information. The statements or information may be contained in pdf or other suitable document formats. The system 100 can include document readers that can access and extract the requested information from the statements.

In one variation, the API 110 allows an API request to specify an account, and a response output provides the information related to executing a transaction with the endpoint. In one implementation, the API 110 can include at least one API resource for interacting with the transaction endpoint. As shown in FIG. 17, an endpoint information request can include institution credentials of an account. The credentials can include username and password. The API protocol can additionally provide a mechanism for completing multi-factor authentication challenges such as security questions, or code-based multi-factor authentication. The API request may additionally include other properties such as developer account identifiers, API authentication tokens, institution type identifiers, and other suitable parameters. The response is a data object that includes at least automatically obtained information such as tracking number, routing number, and/or wire routing number. Additional response information can include funds amount (or alternatively a Boolean indicator if the funds are sufficient), an account status (e.g., is the account fraudulent, trusted, etc.), billing address of the account, name of the institution, type of account (e.g., saving, depository, etc.), and other suitable properties. Other API properties or features can include a mechanism to specify if endpoint information is requested or if the transaction should be executed.

The institution interface module 132 functions to model the internal interface of at least one first-party application with an external institution (e.g., institution 142). The account credentials of a user account (and optionally multi-factor authentication credentials) can be used for an application proxy to gain access to an institution through the institution interface module. The system 100 may additionally include a transaction engine 193, which can facilitate the transfer of funds between two accounts. The transaction engine 193 can be integrated with the API 110, such that an API request can direct the execution of a transaction. The transaction engine 193 can execute ACH transactions, but may alternatively or additionally use other financial tools to withdrawal funds and/or deposit funds. With a transaction engine, transactions can be executed between two accounts that have been configured with account credentials. The API response may include the status of the transaction, transaction errors, a status URI or any suitable response to facilitate executing a transaction as shown in FIG. 18. In one variation, proxy accounts can be used in different institutions. With sufficient reserves, transfers between institutions can be expedited by transferring funds to and from the proxy accounts, and then asynchronously updating the proxy accounts.

The system 100 can also include, in some implementations, a token generation engine 195 (which can manage token generation, as described herein), and/or a record vault 1302 (which may store electronic records associated with the tokens, as described herein).

The system 100 can additionally include other aspects such as a messaging/notification system, which can manage alerts and/or triggering programmatic events (e.g., callbacks), an engine for generating user interfaces and/or user interface data, and/or the like. The system 100 may additionally or alternatively include any other suitable components to implement the functionality of described in the present disclosure.

In some implementations, the system 100 includes a document processing engine 194. In some implementations, the document processing engine 194 is constructed to process account documents (e.g., account documents 192) of an external user account system (e.g., bank system 142) of an external institution. The account documents may be processed to identify and/or obtain transaction information. In some implementations, in a case where the documents are in a PDF format, the document processing engine 194 is constructed to scrape content of the PDF documents to identify the transaction information. In some implementations, the document processing engine 194 is an extraction script that is constructed to pull the document and then isolate the transaction information from the document (e.g., as described above in reference to FIG. 15). In some implementations, the system 100 accesses the document, stores the accessed document (e.g., in a memory or other storage medium of the system 100), and then controls the document processing engine to process the stored document to identify the transaction information.

Figure 19:
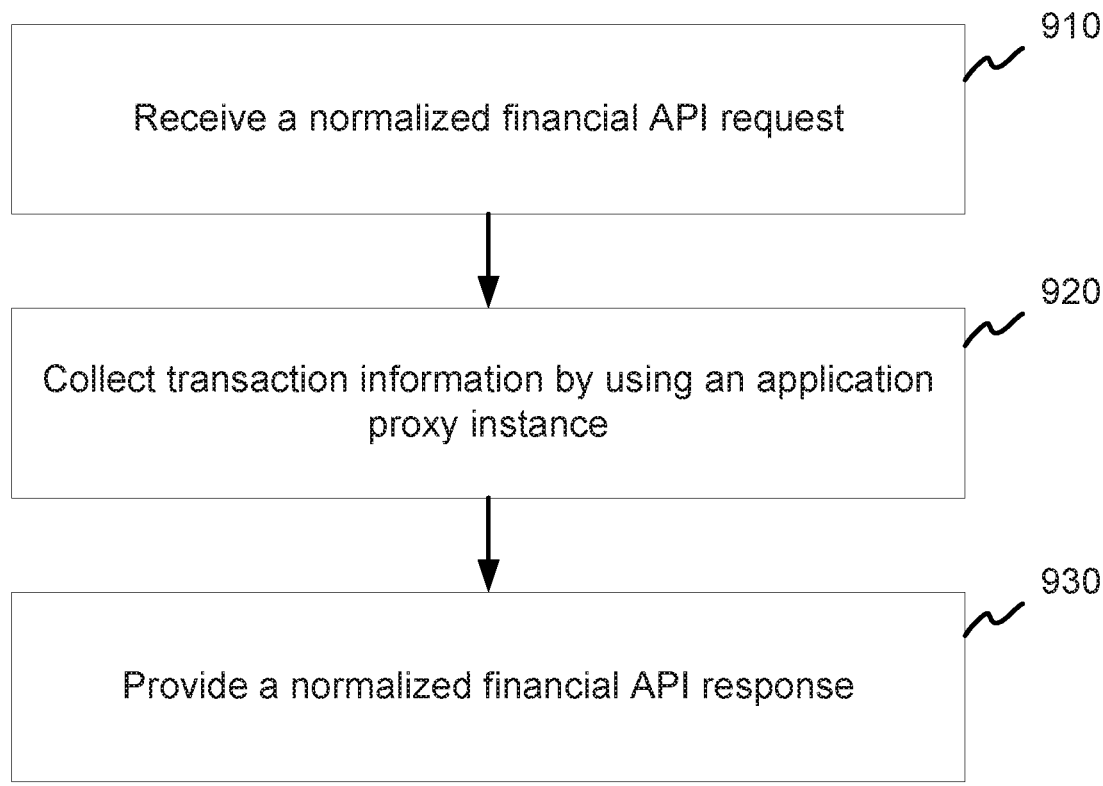
FIG. 19-20 are flowcharts illustrating example methods of processing transactions, according to various embodiments.
Figure 20:
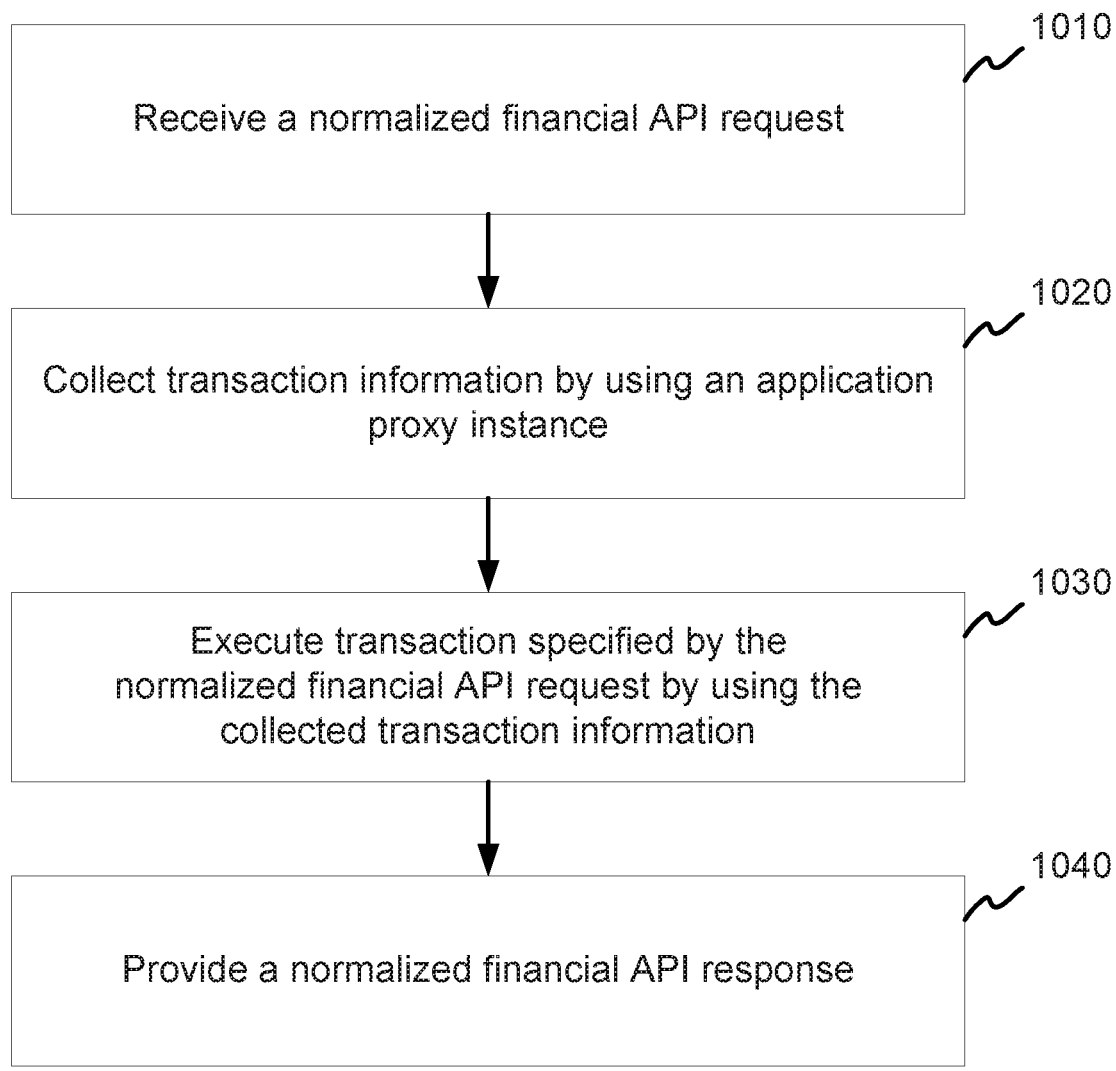

FIGS. 19 and 20 are flowcharts illustrating example methods of processing transactions, according to various embodiments. The methods of FIGS. 15 and 16 are described below in reference to certain aspects of FIG. 11 (or, alternatively, FIG. 16).

Referring to FIG. 19, a method for processing a normalized API request at the system 100 includes: receiving a normalized API request associated with at least one account endpoint, the normalized API request being provided by an external user-facing system/application (e.g., system/application 152 of FIG. 11) by using API 110 of the system 100, the normalized API request specifying account credentials of each account endpoint of the normalized API request (block 910).

Responsive to the normalized API request: transaction information of each account endpoint of the normalized API request is collected by using an application proxy instance (e.g., one of proxy instances 121, 122, and/or 123 of FIG. 1) associated with the account endpoint to collect the transaction information from a corresponding institution system (e.g., an external user account system 141, 142, and/or 143 of FIG. 1) by using the associated account credentials specified by the normalized API request and a proprietary API) (e.g., one of APIs 161, 162, and/or 163 of FIG. 11) of the system 100 (block 920).

Further, a normalized API response is provided to the external user-facing system/application (block 930). The normalized API response provides the transaction information of each account endpoint of the normalized API request. Each application proxy instance is constructed to simulate an application of the corresponding external institution system.

In some implementations, the collected transaction information for each account endpoint includes at least an account number and a corresponding routing number for use in automated clearing house (ACH) transactions. In some implementations, the transaction information is collected by processing at least one statement accessed from the corresponding external institution system.

Additional examples and details of obtaining transaction and account information via proxy instances of the system may be found in U.S. patent application Ser. No. 14/790, 897, filed Jul. 2, 2015, and titled "SYSTEM AND METHOD FOR FACILITATING PROGRAMMATIC VERIFICATION OF TRANSACTIONS" (referred to herein as "the '897 application"). The entire disclosure of this application is hereby made part of this specification as if set forth fully herein and incorporated by reference for all purposes, for all that it contains.

Referring to FIG. 20, a method for processing a normalized API request at the system 100 includes: receiving a normalized API request associated with at least one account endpoint (block 1010). The normalized API request is provided by an external application system by using a platform API of the platform system. The normalized API request specifies a transaction and at least one of an account token and account credentials of each account endpoint of the normalized API request.

Responsive to the normalized API request, transaction information of each account endpoint of the normalized API request is collected (block 1020). The transaction information is collected by using an application proxy instance associated with the account endpoint to collect the transaction information from a corresponding institution system by using at least one of an associated account token and associated account credentials specified by the normalized API request and by using a proprietary API of the institution system.

The transaction specified by the normalized API request is executed by using the collected transaction information (block 1030). A normalized API response is provided to the external system (block 1040). The normalized API response provides results of the transaction. Each application proxy instance is constructed to simulate an application of the corresponding external institution system.

In some implementations, the collected transaction information for each account endpoint includes at least an account number and a corresponding routing number for use in automated clearing house (ACH) transactions.

In some implementations, the transaction information is collected by processing at least one statement accessed from the corresponding external institution system.

In some implementations, the transaction information (and/or any other account-related information) is collected via one or more of: an application proxy instance, screen scraping (e.g., of a webpage of the institution), an API request to an API of the institution (e.g., that the system is authorized to access), or any combination of these methods.

Additional examples and details of such functionality of the system may be found in the '897 application.

In some implementations, the user information of the normalized API request includes a user account identifier for each user account of the external user-facing system/application (e.g., the external user-facing system/application 152) corresponding to the normalized API request.

In some implementations, the normalized API request includes parameters that include a platform account ID, a user account identifier, and an institution ID. The platform account ID value can specify an account of an external user-facing system/application (e.g., "Dev Account A", "Dev Account B" of FIG. 11, FIG. 14A, and FIG. 14B). The User Account Identifier value can specify an identifier that identifies a user account of the application system identified by the Platform Account ID parameter. The Institution ID value can specify an identifier that identifies an external institution system (e.g., institutions 141, 142, and/or 143).

In some implementations, the <User Account Identifier> is used to select at least one corresponding application proxy instance, and each selected application proxy instance includes user credentials (e.g., as depicted in FIG. 14B) to access the associated institution system.

In some implementations, the system 100 determines an application proxy instance associated with the normalized API request based on the <Platform Account ID> parameter, the <User Account Identifier> parameter, and the <Institution ID> parameter. In some implementations, the system 100 identifies an application proxy instance of the application proxy system 120 that is managed in association with the <Platform Account ID> parameter, the <User Account Identifier> parameter, and the <Institution ID> parameter, and uses the identified application proxy instance to collect the transaction information.

In some implementations, each proprietary API request includes parameters that include a user credential parameter, wherein the user credential parameter value specified the user credentials corresponding the normalized API request. The user credentials can be specified by the application proxy instance (e.g., 421-425 as shown in FIG. 14B) used to provide the proprietary API request.

In various other implementations, the normalized API requests and/or the proprietary API requests may include other sets of parameters, depending on the specifics of the APIs and the types of requests involved. For example, other requests may include identifier tokens, multiple account identifiers (e.g., when requesting transfer of funds), etc.

Additional examples and details of such other types of requests and functionality of the system may be found in the '897 application.

In some implementations, the system may send various types of alerts and/or other indications to a user computing device (e.g., user computing devices 171, 172, and/or 173). These various types of alerts and/or other indications may activate one or more applications (e.g., an SMS (simple message service) and/or MMS (multimedia messaging service) process and/or application, an email process and/or application, a process and/or application related to the system, a first-party and/or third-party process and/or application (e.g., of an institution and/or a user-facing application/service), and/or the like) on the user computing device. For example, as described herein, alerts may be communicated with the user computing device for the purpose of completing a multi-factor authentication process. In such an example, an SMS message with a secret/authentication code may be communicated to the user computing device, activating an SMS process and/or application (and/or another process and/or application) on the user computing device. Such an alert may be sent by the system and/or an institution system. In another example, the system may send alerts to the user computing device regarding access to a user account of the user, a transaction, and/or the like. Such alerts may notify the user that a new transaction has posted to their account that a transaction has posted for a particular amount, a transaction has been denied, and/or the like. Such alerts may comprise SMS messages, email messages, and/or other types of messages that may activate various processes and/or applications, as described above. In yet another example, the system may send an alert to the user computing device including an account document, which may cause a process and/or application suitable for reading the account document to be activated on the user computing device.

4.4. System Architecture for Virtualized Authentication

Figure 21:
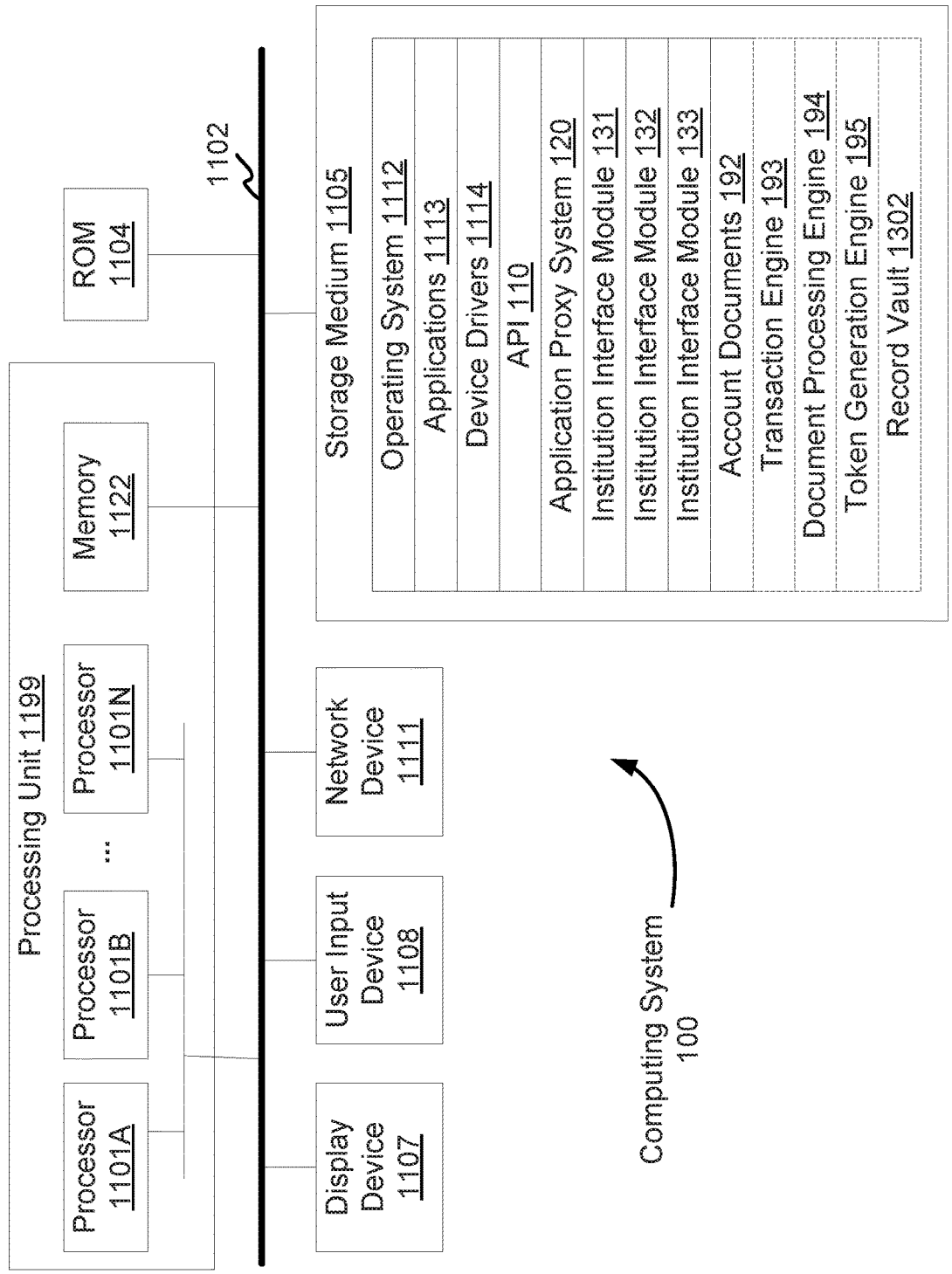
FIG. 21 is a block diagram of an example architecture of the system, according to an embodiment.

FIG. 21 is an architecture diagram of the system 100 according to an implementation in which the system is implemented by a server device. Alternatively, the system may be implemented by a plurality of devices, in a hosted computing environment (e.g., in a cloud server), and/or in any other suitable environment.

The bus 1102 interfaces with the processors 1101A-1101N, the main memory (e.g., a random access memory (RAM)) 1122, a read only memory (ROM) 1104, a computer readable storage medium 1105 (e.g., a non-transitory computer readable storage medium), a display device 1107, a user input device 1108, and a network device 1111.

The processors 1101A-1101N may take many forms, such as ARM processors, X86 processors, and/or the like.

In some implementations, the system includes at least one of a central processing unit (processor) and a multi-processor unit (MPU).

The processors 1101A-1101N and the main memory 1122 form a processing unit 1199. In some embodiments, the processing unit includes one or more processors communicatively coupled to one or more of a RAM, ROM, and computer readable storage medium; the one or more processors of the processing unit receive instructions stored by the one or more of a RAM, ROM, and computer readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of an API, an application proxy system, one or more instance interface modules, account documents, a transaction engine, a document processing engine, and/or any other functionality or aspects of the system as described herein.

The network adapter device 1111 provides one or more wired or wireless interfaces for exchanging data and commands between the system and other devices, such as external user account systems (e.g., institutions 141, 142, and/or 143), external user-facing systems/applications (e.g., applications 151 and/or 152), user devices (e.g., user devices 171 and/or 172), and/or the like. Such wired and wireless interfaces include, for example, a universal serial bus (USB) interface, Bluetooth interface, Wi-Fi interface, Ethernet interface, near field communication (NFC) interface, and/or the like. In some embodiments, the system communicates with other devices via the Internet.

Machine-executable instructions (e.g., computer readable program instructions) in software programs (such as an operating system, application programs, and device drivers) are loaded into the memory 1122 (of the processing unit 1199) from the processor-readable storage medium 1105, the ROM 1104 or any other storage location. During execution of these software programs, the respective machine-executable instructions are accessed by at least one of processors 1101A-1101N (of the processing unit 1199) via the bus 1102, and then executed by at least one of processors 1101A-1101N. Data used by the software programs are also stored in the memory 1122, and such data is accessed by at least one of processors 1101A-1101N during execution of the machine-executable instructions of the software programs. The processor-readable storage medium 1105 includes an operating system 1112, software programs/applications 1113, device drivers 1114, the API no, the application proxy system 120, the institution interface modules 131, 132, and 133, and account documents 192. In some implementations, the processor-readable storage medium 1105 includes the transaction engine 193, the document processing engine 194, the token generation engine 195, and/or the record vault 1302 (which may comprise an encrypted or otherwise secured database or data store, as described below).

Further details regarding the system architecture are described below.

Figure 22:
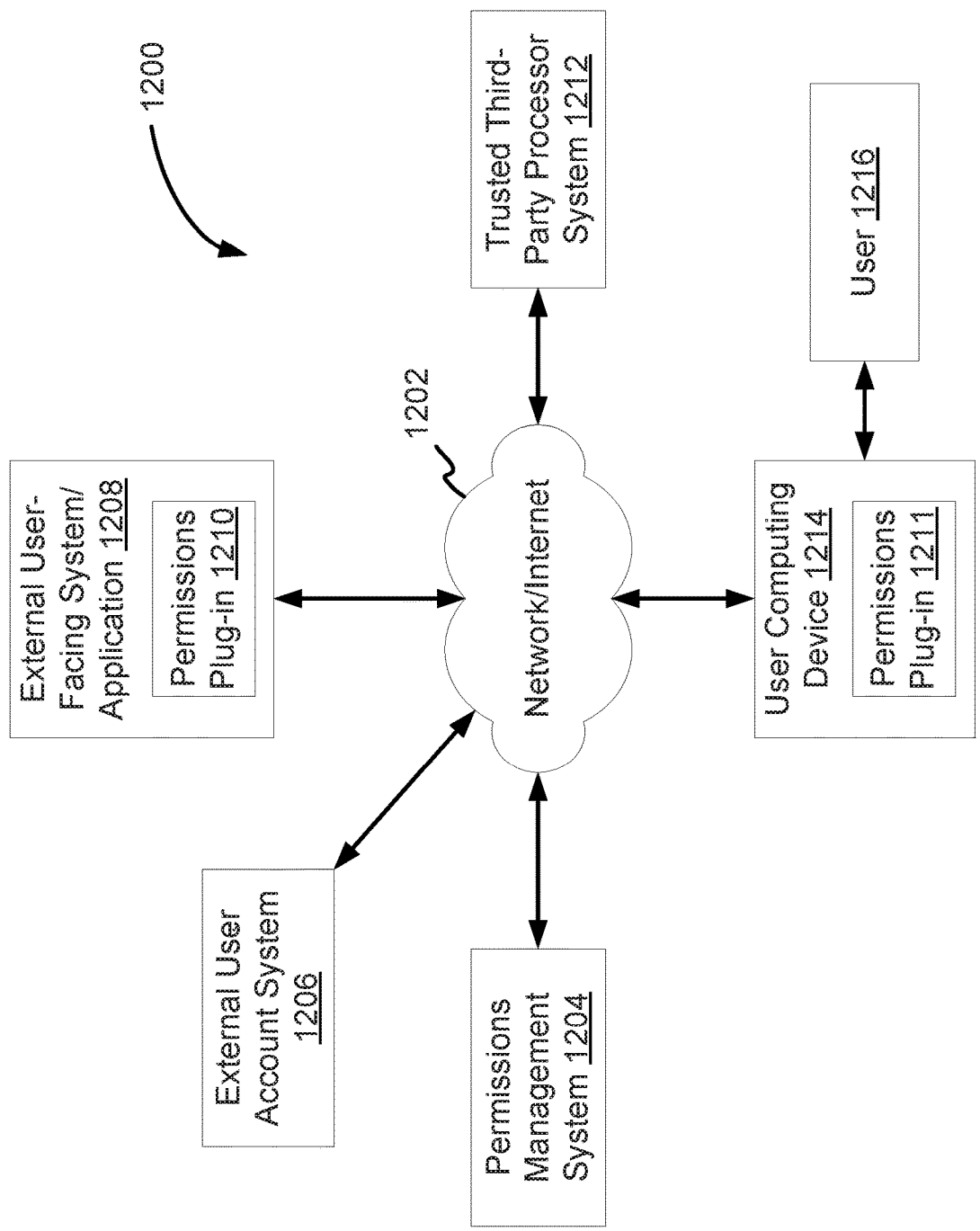
FIG. 22 illustrates an example network environment in which a permissions management system may operate, according to an embodiment.

4.5. Example Network Environment of the System when Implementing Permissions Management FIG. 22 illustrates an example network environment 1200 in which a permissions management system 1204 may operate, according to an embodiment. As shown, the network environment includes the permissions management system 1204, an external user account system 1206, an external user-facing system/application 1208, a permissions plug-in 1210, a permissions plug-in 1211, a trusted third-party processor system 1212, a user computing device 1214, and a user 1216. The various aspects of the network environment 1200 may communicate via a network/Internet 1202. The network/Internet 1202 may comprise a wired and/or wireless network, and/or in certain embodiments may comprise one or more wired and/or wireless network. The various components of the network environment 1200 may communicate via the network/Internet 1202, and/or alternatively may communicate directly with one another via one or more other wired or wireless connections. In some embodiments, the permissions management system 1204 may include the functionality of the system 100 described above, and/or the functionality of the system 100 described above may be implemented in one or more other computing systems in the network environment 1200. For clarity of description, however, the following description assumes that the permissions management system 1204 includes the functionality of the system 100 described above.

Additionally, the external user account system 1206 may comprise a system of an institution (e.g., one of institution systems 141, 142, and/or 143), and while more than one the external user account system 1206 may be involved in communication with the permissions management system 1204, one external user account system 1206 is shown in FIG. 22 for purposes of clarity.

Further, external user-facing system/application 1208 may comprise the system and/or application, merchant, and/or the like, with which the user may interact. For example, the user 1216 may interact with the external user-facing system/application 1208 via the user computing device 1214. In one example, the external user-facing system/application 1208 may comprise an app, and/or web-based application, running on and/or rendered by the user computing device 1214 (e.g., a mobile device, and/or the like), as described above (e.g., in reference to app 151 and/or 152).

In an embodiment, the external user-facing system/application 1208 may include the permissions plug-in 1210. The permissions plug-in 1210 may comprise a software/code module, snippet, and/or the like, which may be integrated into the external user-facing system/application 1208. The permissions plug-in 1210 may be provided by the permissions management system 1204 and/or the external user account system 1206 such that the external user-facing system/application 1208 may include functionality provided by the permissions management system 1204 (either directly or indirectly via the external user account system 1206). In one implementation, the permissions plug-in 1210 comprises JavaScript code (or code written in any other programming language) integrated into the external user-facing system/application 1208. The JavaScript code, when executed, may communicate with the permissions management system 1204 and/or the external user account system 1206 to provide certain functionality as described herein. Advantageously, in some implementations, the permissions plug-in 1210 may generate interactive user interfaces that may be presented to the user 1216. Information may be obtained from the user 1216 via the interactive user interfaces of the permissions plug-in 1210 (e.g., account credentials, and/or the like). The permissions plug-in 1210 may obtain such information, and communicate the information to the permissions management system 1204 and/or the external user account system 1206 in a secure manner such that the external user-facing system/application 1208 does not have access to the information provided by the user 1216.

Further, the permissions plug-in 1210 may advantageously handle establishing secure communications with the permissions management system 1204 and/or the external user account system 1206, and/or other functionality as described herein, such that a developer of the external user-facing system/application 1208 need not be concerned with these aspects (thus speeding development of the external user-facing system/application 1208).

In an embodiment, the user computer device 1214 may include the permissions plug-in 1211 that functions similarly to the permission plug-in 1210 described above. Similar to the permissions plug-in 1210, the permissions plug-in 1211 may comprise a software/code module, snippet, and/or the like. The permissions plug-in 1211 may be integrated into another software application executed by the user computing device 1214 (e.g., a software application dedicated to enabling communications with, e.g., the external user account system 1206) or may otherwise be executable by the user computing device 1214 (e.g., by a web browser of the user computing device 1214). The permissions plug-in 1211 may be provided by the permissions management system 1204 and/or the external user account system 1206 such that the user computing device 1214 may include functionality provided by the permissions management system 1204 (either directly or indirectly via the external user account system 1206). In one implementation, the permissions plug-in 1211 comprises JavaScript code or code written in any other programming language. The JavaScript code, when executed, may communicate with the permissions management system 1204 and/or the external user account system 1206 to provide certain functionality as described herein. Advantageously, in some implementations, the permissions plug-in 1211 may generate interactive user interfaces that may be presented to the user 1216. Information may be obtained from the user 1216 via the interactive user interfaces of the permissions plug-in 1211 (e.g., account credentials, and/or the like). The permissions plug-in 1211 may obtain such information, and communicate the information to the permissions management system 1204 and/or the external user account system 1206 in a secure manner such that the external user-facing system/application 1208 does not have access to the information provided by the user 1216. Further, the permissions plug-in 1211 may advantageously handle establishing secure communications with the permissions management system 1204 and/or the external user account system 1206, and/or other functionality as described herein, such that a developer of the external user-facing system/application 1208 need not be concerned with these aspects (thus speeding development of the external user-facing system/application 1208).

In addition to the detailed description of the functionality provided below, additional examples and details may be found in U.S. Provisional Patent Application No. 62/215,603, filed Sep. 8, 2015, and titled "Link," previously incorporated by reference herein.

4.6 Example Action Diagrams for Authorization

Figure 23A:
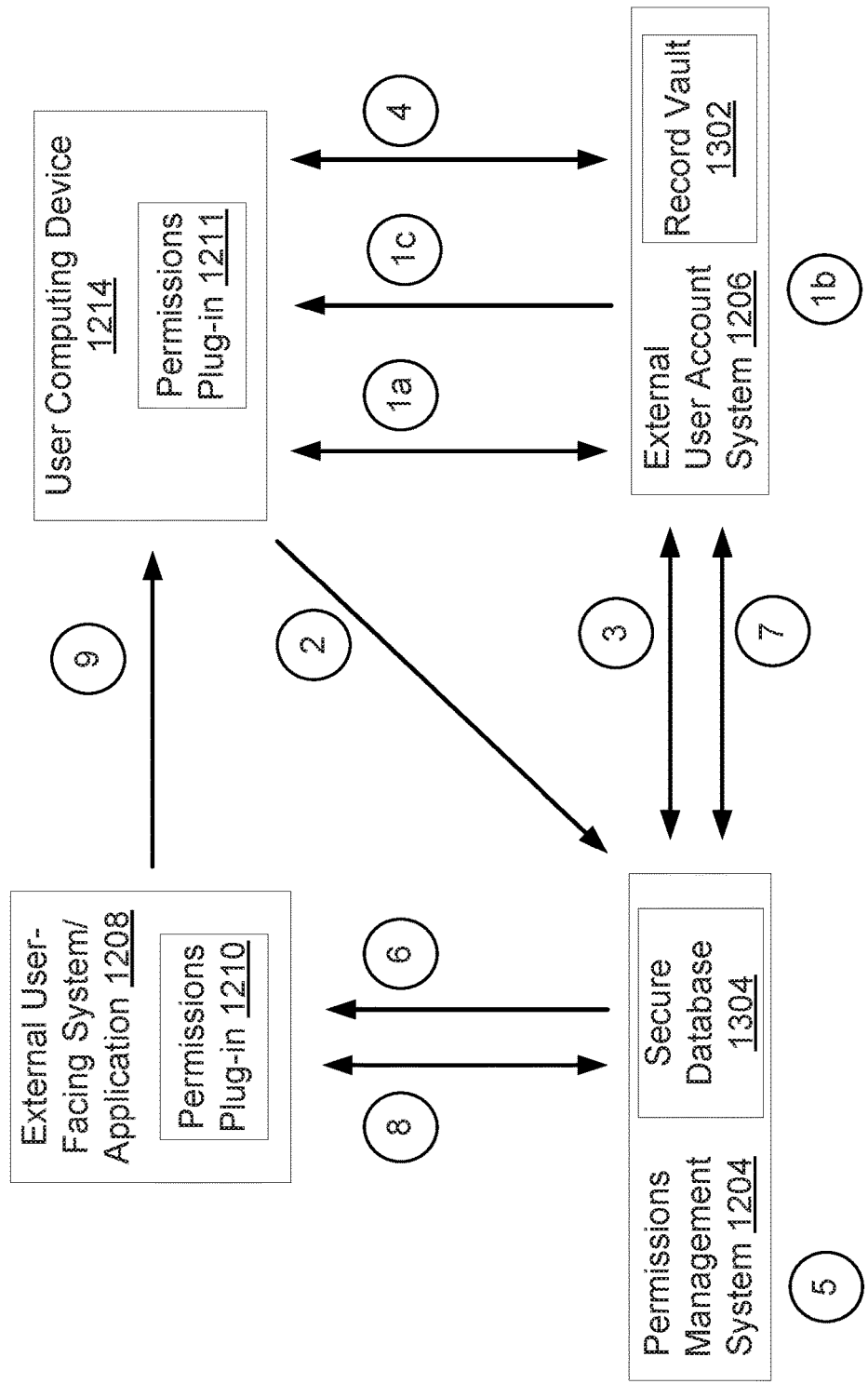
FIGS. 23A-23B, 24, and 25 are action diagrams illustrating example interactions among the aspects of the network environment, according to various embodiments.
Figure 23B:
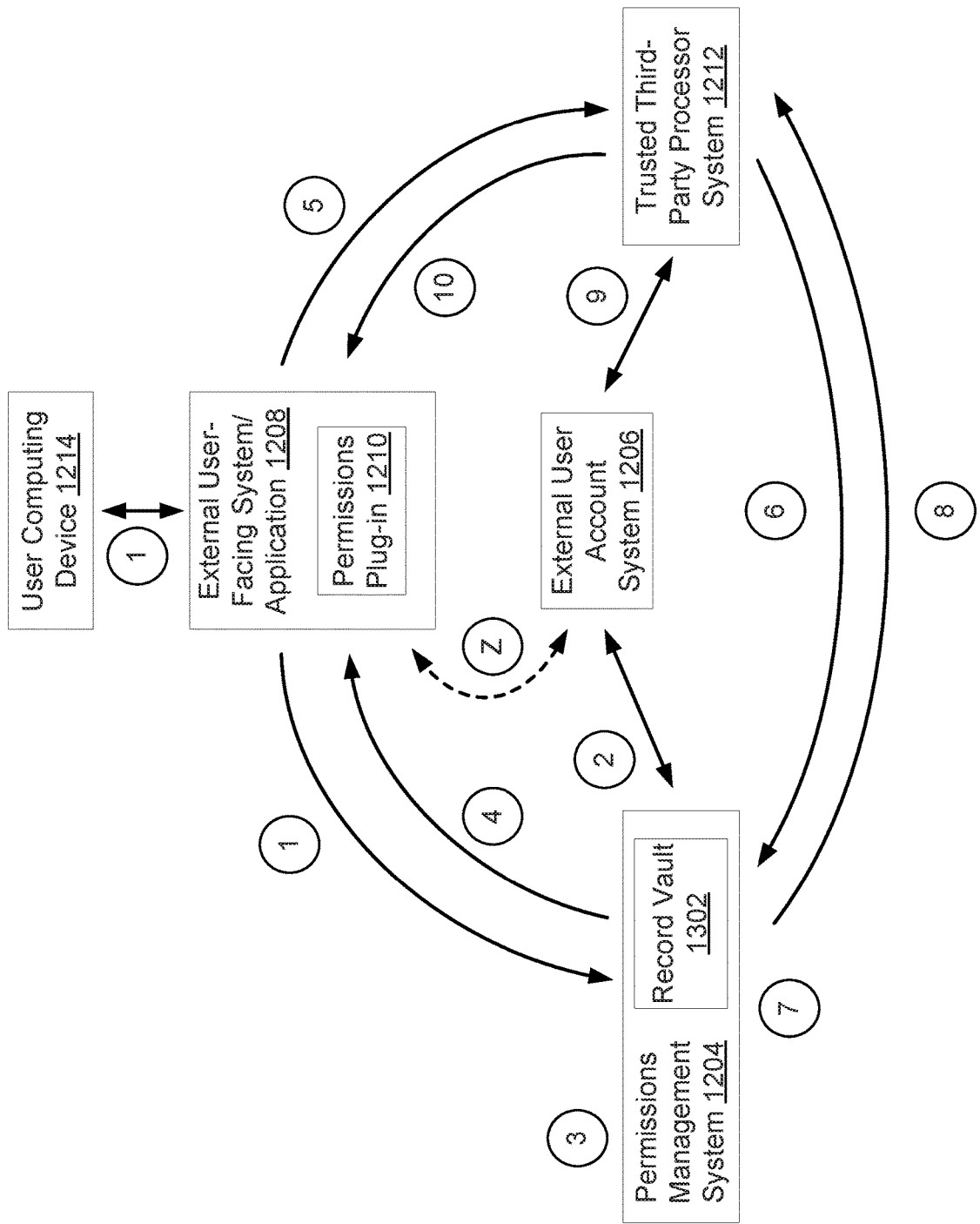

FIGS. 23A-23B are action diagrams illustrating example interactions among the aspects of the network environment 1200, according to an embodiment. As described below, interactions among the various aspects of the network environment 1200 may enable permissioning of access to, and execution of transactions on, user accounts on the external user account system 1206 (or multiple external user account systems 1206). Further, interactions among the various aspects of the network environment 1200 may enable a user to grant authorization and/or revoke authorization to access their accounts.

In the action diagrams of FIGS. 23A-23B, and other action diagrams described herein, in various implementations the actions shown and described may be performed in orders different from those shown. For example, certain actions may take place before or after other actions, according to various implementations.

Interaction among the aspects of the network environment 1200 may be accomplished via various API calls (e.g., through API 110), as generally described above. Thus, for example, account credentials, user information, token identifiers, transaction requests, and/or any other information transmitted during the interactions described below may be communicated via normalized API requests. As described above, the API of the permissions management system 1204 may advantageously be clearly defined such that software applications and/or systems may be efficiently developed to interact with the permissions management system 1204 in an efficient manner. Additionally, each communication among aspects of the network environment 1200 may include multiple requests and/or acknowledgments in order to ensure effective communication. Further, communications may be made via secure connections.

FIG. 23A is an action diagram illustrating example interactions among the aspects of the network environment 1200, according to an embodiment. In the action diagram of FIG. 23A, the system enables a user to authorize access to a user account, according to an embodiment.

In action 1*a*, the user computing device 1214 interacts with the external user account system 1206. Such an interaction may arise, for example, when a user of the user computing device 1214 provides an input indicating an intent to provide authorization to a user account. For example, the user may be interacting, via the user computing device 1214, with the external user-facing system/application 1208 (e.g., the user may access an app and/or website of a merchant on their mobile device or desktop computer). The user may desire, or may be prompted to, provide the external user-facing system/application 1208 authorization to access user account data of a user account of the user (e.g., a user account held by the institution associated with the external user account system 1206). Accordingly, in an embodiment, the permissions plug-in 1211 may be executed by the user computing device 1214, which may present an interactive user interface to the user (as described in further detail below in reference to FIG. 28). Examples of interactive user interfaces enabled by the permissions plug-in 1211 are described below in reference to FIGS. 29A-29J and 30A-30C.

In various implementations, the interactive user interface may be generated by the permissions plug-in 1210, the permissions plug-in 1211, another software application, and/or any combination of these. Through the interactive user interface, the user may provide account credentials and/or other authorization for access to an account of the user. As described below, the authorization may include various limitations on access to the account (herein referred to as "permissions" and/or the like). Access to the account may include, for example, the ability to execute transactions, the ability to obtain information related to the user, the ability to obtain transaction information, and/or the like. As mentioned above, the authorization, account credentials, and/or the like, may be provided via the permissions plug-in 1211 to the external user account system 1206 in a secure manner such that the information provided is not accessible to the external user-facing system/application 1208 or the permissions management system 1204. Thus, advantageously, according to various embodiments of the present disclosure, the user may securely provide sensitive information to the external user account system 1206 without revealing such information to the external user-facing system/application 1208 (e.g., a merchant, developer, etc.) or the permissions management system 1204.

Communication between the permissions plug-in 1211 and the external user account system 1206 may include transmission of certain information. For example, the permissions plug-in 1211 may transmit a client ID (e.g., a unique identifier associated with the external user-facing system/application 1208, which may be obtained from the external user-facing system/application 1208), a user identifier (e.g., a unique identifier associated with the user), account credentials, a secret key, and/or the like to the external user account system 1206, which may be processed and verified by the external user account system 1206.

In action 1*b*, based on the information received from the user computing device 1214, the external user account system 1206 generates an electronic record. The electronic record is generated by the external user account system 1206 as described in further detail below, however, the electronic record may include one or more of: a unique record name, account credentials, an identifier associated with the user, an identifier associated with the external user-facing system/application 1208 (e.g., the client ID), user account information, or one or more permissions.

As shown, the external user account system 1206 may include a record vault 1302, which, as described herein, comprises one or more databases securely storing generated electronic records. Accordingly, in action 1*a*, the electronic record that is generated by the external user account system 1206 is stored in the record vault 1302. Each generated electronic record may be associated with, and identified by, a token (e.g., a unique identifier associated with that electronic record, also referred to herein as a "unique record identifier"). In an embodiment, the token (e.g., the unique record identifier) is generated based on an encrypted hash of one or more elements of the electronic record. Alternatively, the token may be randomly generated.

In an implementation, the electronic record and/or the token may be generated without verification that the account credentials are valid or correct.

In action 1*c*, the token is transmitted to the user computing device 1214, and in action 2, the token is transmitted to the permissions management system 1204. Alternatively, the token may be transmitted to the permissions management system 1204 directly.

In action 3, the permissions management system 1204 may interface with the external user account system 1206, using the token, to initiate or enable access to the user account data associated with the user. At this point, the external user account system 1206 may verify that the account credentials are valid, and may return a message to the permissions management system 1204 if so or if not. If so, the external user account system 1206 may generate and store an access key (e.g., a unique identifier) similar to the token that may be used by the permissions management system 1204 to request additional access to the user account data. The access key may therefore be transmitted to the permissions management system 1204. In some implementations, the access key and the token are similar or the same, such that an access key may not be generated, but the token may be used to access the user account data.

Additionally in action 3, the account credentials provided by the user may be used to obtain user account data (e.g., user account information, account numbers, routing numbers, and/or the like). Communication with the external user account system 1206 may be accomplished via an API (public or non-public) or other suitable communications method. In some implementations, communications are accomplished as generally described above in reference to various figures, wherein, for example, virtual instances of an application of the external user account system 1206 may be generated to communicate with the external user account system 1206 via a public/non-public API.

In action 4, if the account credentials are verified as valid, the external user account system 1206 may communicate with the user computing device 1214 to prompt the user to accept terms and conditions of other forms required by the external user account system 1206. In some implementations, such a prompt may be provided before account credentials are verified.

Additionally in action 4, the external user account system 1206 may communicate with the user computing device 1214 to prompt the user to select a specific account from a plurality of accounts (or other information) via an interactive user interface presented to the user, e.g., by the permissions plug-in 1211.

In some implementations, as described below in reference, e.g., to actions 1 and 2 of FIG. 23B, the interactive user interfaces through which the user may provide the account credentials and other information may be provided via the permissions management system 1204, the external user account system 1206, the permissions plug-in 1210, and/or the permissions plug-in 1211. In some implementations, as also described below, rather than the user providing account credentials via the permissions management system 1204, the permissions management system 1204, external user account system 1206, the permissions plug-in 1210, and/or the permissions plug-in 1211 may cause the interactive user interface displayed to the user to be redirected to a page or user interface provided directly by the external user account system 1206.

In action 5, the permissions management system 1204 may store the token and/or the access key in a secure database 1304, which may be similar to the record vault 1302 described herein, and which may be encrypted, for example.

In action 6, the permissions management system 1204 may generate and store an API access key (e.g., a unique identifier) similar to the token that may be used by the external user-facing system/application 1208 to request user account data. The API access key may therefore be transmitted to the external user-facing system/application 1208. In some implementations, the API access key and the token are similar or the same, such that an API access key may not be generated, but the token may be used to access the user account data.

In various embodiments, secure communication between the permissions management system 1204 and the external user-facing system/application 1208 may be established via any suitable method. For example, in an implementation, the permissions management system 1204 may provide a "public token" to the external user-facing system/application 1208. In response, the external user-facing system/application 1208 may provide to the permissions management system 1204 a client ID, the public token, and a secret key/identifier (that was previously securely provided to the external user-facing system/application 1208 from the permissions management system 1204. The permissions management system 1204 may then use this information (e.g., the client ID, the public token, and the secret key/identifier) to authenticate the access and communications to and from the external user-facing system/application 1208. Similar or alternative methods of establishing secure communications between various devices of the system may be used in various embodiments of the disclosure.

In action 7, the permissions management system 1204 may use the token and/or the access key to obtain additional user account data (e.g., transaction data) from the external user account system 1206. As described above, communication with the external user account system 1206 may be accomplished via an API (public or non-public) or other suitable communications method. In some implementations, communications are accomplished as generally described above in reference to various figures, wherein, for example, virtual instances of an application of the external user account system 1206 may be generated to communicate with the external user account system 1206 via a public/non-public API.

In action 8, user account data is requested by and/or provided to the external user-facing system/application 1208. For example, the external user-facing system/application 1208 may request user account data by providing the token and/or API access key to the permissions management system 1204.

In some implementations, action 7 may be performed multiple times automatically. For example, action 7 may be performed periodically or on a schedule. Alternatively, action 7 may be performed in response to requests received, e.g., from the external user-facing system/application 1208. In various embodiments actions 7 and 8 may occur in any order and/or simultaneously.

In action 9, the external user-facing system/application 1208 may provide user account information to the user computing device 1214 (e.g., via a software application on the user computing device 1214).

Accordingly, as described in action diagram of FIG. 23A, via interaction with the external user-facing system/application 1208 and/or the user computing device 1214, the user may provide account credentials and authorize access to user account data by the external user-facing system/application 1208, without sharing user account information with the external user-facing system/application 1208. Advantageously, according to certain embodiments, the external user-facing system/application 1208 need not be trusted with the user account information, which may simplify development of the external user-facing system/application 1208, and give a user piece of mind in its interactions with the external user-facing system/application 1208. Additionally, as is described below, implementations of the system may enable the user to de-authorize, view permissions of, and/or change permissions of, the external user-facing system/application 1208.

FIG. 23B is an action diagram illustrating example interactions among the aspects of the network environment 1200, according to an embodiment. In various embodiments, actions and aspects of the actions described above with reference to FIG. 23A may similarly be applied to the actions of FIG. 23B.

In action 1 of FIG. 23B, a user interacts with the external user-facing system/application 1208 via the user computing device 1214. For example, the user may access an app and/or website of the merchant on their mobile device or desktop computer. While the user is interfacing with the external user-facing system/application 1208, the external user-facing system/application 1208 may execute the permissions plug-in 1210, which may present an interactive user interface to the user (as described in further detail below in reference to FIG. 28). Examples of interactive user interfaces enabled by the permissions plug-in 1210 are described below in reference to FIGS. 29A-29J and 30A-30C.

Through the interactive user interface, the user may provide account credentials and/or other authorization for access to an account of the user. As described below, the authorization may include various limitations on access to the account (herein referred to as "permissions" and/or the like). Access to the account may include, for example, the ability to execute transactions, the ability to obtain information related to the user, the ability to obtain transaction information, and/or the like. As mentioned above, the authorization, account credentials, and/or the like, are provided via the permissions plug-in 1210 to the permissions management system 1204 in a secure manner such that the information provided is not accessible to the external user-facing system/application 1208. Thus, advantageously, according to various embodiments of the present disclosure, the user may securely provide sensitive information to the permissions management system 1204 without revealing such information to the external user-facing system/application 1208 (e.g., a merchant, developer, etc.).

Establishing secure communication between the permissions plug-in 1210 and the permissions management system 1204 may include transmission of certain identifying information. For example the permissions plug-in 1210 and/or the external user-facing system/application 1208 may transmit a client ID (e.g., a unique identifier associated with the external user-facing system/application 1208), a user identifier (e.g., a unique identifier associated with the user), a secret key, and/or the like to the permissions management system 1204, which may be processed and verified by the permissions management system 1204.

In action 2, the permissions management system 1204 may interface with the external user account system 1206, using account credentials provided by the user, to obtain user account data (e.g., user account information, account numbers, routing numbers, transaction data, and/or the like). Communication with the external user account system 1206 may be accomplished as generally described above in reference to various figures, wherein, for example, virtual instances of an application of the external user account system 1206 may be generated to communicate with the external user account system 1206 via a public/non-public API. As also described above, establishing communication with the external user account system 1206 may include multifactor authentication (which may require additional communications to or from the user computing device 1214) and/or the like. Additionally, action 2 may include enabling the user to select a specific account from a plurality of accounts via an interactive user interface presented to the user by the permissions plug-in 1210. In some instances, user account information may be obtained by analysis of documents (e.g., PDFs of account statements), which may be available from the external user account system 1206.

In action 3, based on the user account data obtained from the external user account system 1206, the permissions management system 1204 generates an electronic record. The electronic record is generated by the permissions management system 1204 as described in further detail below, however, the electronic record may include at least a unique record name, an identifier associated with the user, an identifier associated with the external user-facing system/application 1208 (e.g., the client ID), user account information obtained from the external user account system 1206, and one or more permissions.

As shown in FIG. 23B, the permissions management system 1204 may include a record vault 1302, which, as described herein, comprises one or more databases securely storing generated electronic records. Accordingly, in action 3, the electronic record that is generated by the permissions management system 1204 is stored in the record vault 1302. Each generated electronic record may be associated with, and identified by, a token (e.g., a unique identifier associated with that electronic record, also referred to herein as a "unique record identifier"). In an embodiment, the token (e.g., the unique record identifier) is generated based on an encrypted hash of one or more elements of the electronic record. Alternatively, the token may be randomly generated.

In an alternative to one or more of the actions of FIG. 23B, in action Z, rather than the user providing account credentials to the permissions management system 1204, the permissions management system 1204 and/or the permissions plug-in 1210 may cause the interactive user interface displayed to the user to be redirected to a page or user interface provided directly by the external user account system 1206. Accordingly, as described above in reference to actions 1*a*, 1*b*, 1*c*, and 2 of FIG. 23A, the external user account system 1206 may generate a token that may be transmitted to the permissions management system via the user computing device 1214. This token may then be user by the permissions management system 1204 to access user account data from the external user account system 1206.

In action 4, the token is transmitted back to the external user-facing system/application 1208. Advantageously, in various embodiments, the token does not include any account information (and/or any unencrypted account information) of the user, such that the external user-facing system/application 1208 may not use the token to directly access an account of the user. The external user-facing system/application 1208 may store the token in association with the user. Accordingly, as is described in detail below, the external user-facing system/application 1208 may use the token to initiate payments or other transactions with the user.

In action 5, the external user-facing system/application 1208 may request execution of a transaction associated with the user via communication with the trusted third-party processor system 1212 (e.g., a payment processor). For example, if the external user-facing system/application 1208 is a merchant, the external user-facing system/application 1208 may request payments or a service or good via the trusted third-party processor system 1212. In making the request, the external user-facing system/application 1208 transmits transaction details and the token to the trusted third-party processor system 1212. Transaction details may include, for example, an amount of the payment be made, the frequency of payments be made, and/or the like.

In action 6, in order to execute the transaction requested by the external user-facing system/application 1208, the trusted third-party processor system 1212 communicates with the permissions management system 1204 to obtain account details (e.g., account and routing numbers) of the user, and to get authorization to execute the transaction. Accordingly, the trusted third-party processor system 1212 communicates the token and transaction details to the permissions management system 1204.

In action 7, the permissions management system 1204 identifies the electronic record in the record vault 1302 related to the token received from the trusted third-party processor system 1212. The permissions management system 1204 retrieves the identified electronic record, including information related to the electronic record such as various permissions information. The permissions management system 1204 then compares the transaction details to the permissions information associated with the electronic record, and determines whether the external user-facing system/application 1208 is authorized to execute the transaction requested.

In action 8, if the permissions management system 1204 determines that the external user-facing system/application 1208 is not authorized to execute the transaction, such an indication is transmitted back to the trusted third-party processor system 1212. The trusted third-party processor system 1212 may then indicate to the external user-facing system/application 1208 that it is not authorized to execute the transaction. If the permissions management system 1204 determines that the external user-facing system/application 1208 is authorized to execute the transaction, the permissions management system 1204 transmits to the trusted third-party processor system 1212 account details (e.g., account and routing numbers) of the user necessary to execute the transaction, and an indication that the external user-facing system/application 1208 is authorized to execute the transaction.

In action 9, using the account details received from the permissions management system 1204, the trusted third-party processor system 1212 executes the transaction via communication with the external user account system 1206. For example, the account details received from the permissions management system 1204 may include an account number and routing number, a credit card number, and/or the like. The trusted third-party processor system 1212 may utilize such information to execute the funds transfer (e.g., an ACH transfer, as described above), and/or the like, through communication with the external user account system 1206.

In action 10, the trusted third-party processor system 1212 communicates with the external user-facing system/application 1208 an indication the transaction has been executed, or an indication that the transaction was not executed (if, for example, there were insufficient funds, and/or the like). Such communication between the trusted third-party processor system 1212 and the external user-facing system/application 1208 may include multiple back-and-forth communications regarding, for example, a status regarding an attempted execution of transaction, and/or the like.

Accordingly, as described in action diagram of FIG. 23B, via interaction with the external user-facing system/application 1208, the user may provide account credentials to the permissions management system 1204, and authorize execution of a transaction by the external user-facing system/application 1208, without sharing user account information with the external user-facing system/application 1208. Advantageously, according to certain embodiments, the external user-facing system/application 1208 need not be trusted with the user account information, which may simplify development of the external user-facing system/application 1208, and give a user piece of mind in its interactions with the external user-facing system/application 1208. Additionally, as is described below, the implementation of FIG. 23B enables the user to de-authorize, and/or change permissions of, the external user-facing system/application 1208.

In some implementations, the functionality of one or more of the permissions management system 1204, the external user-facing system/application 1208, and/or the trusted third-party processor system 1212 may be combined and/or subdivided into more systems/devices. For example, in an embodiment, the permissions management system 1204 may function as both the permissions management system and the trusted third-party processor, thereby simplifying and combining some of the actions described above.

As mentioned, communications among the various aspects of the network environment 1200 may be via secure channels (e.g., encrypted channels). For example, in order to be "trusted," the trusted third-party processor system 1212 may need to securely identify itself with the permissions management system 1204. For example, the trusted third-party processor system 1212 could prove a mutually agreed upon authorization, encryption, or identification. Other similar communications may take place among other aspects of the network environment 1200, according to certain embodiments.

In various embodiments certain actions may be initiated in response to certain other actions. For example, the token may be generated in response to a request from the external user-facing system/application 1208 for account information and/or execution of a transaction. In various embodiments additional aspects may be involved in executing transactions. For example, two or more processor systems or external user account systems may coordinate and/or make requests of one another to execute transactions.

4.7 Example Action Diagram for De-Authorization

Figure 24:
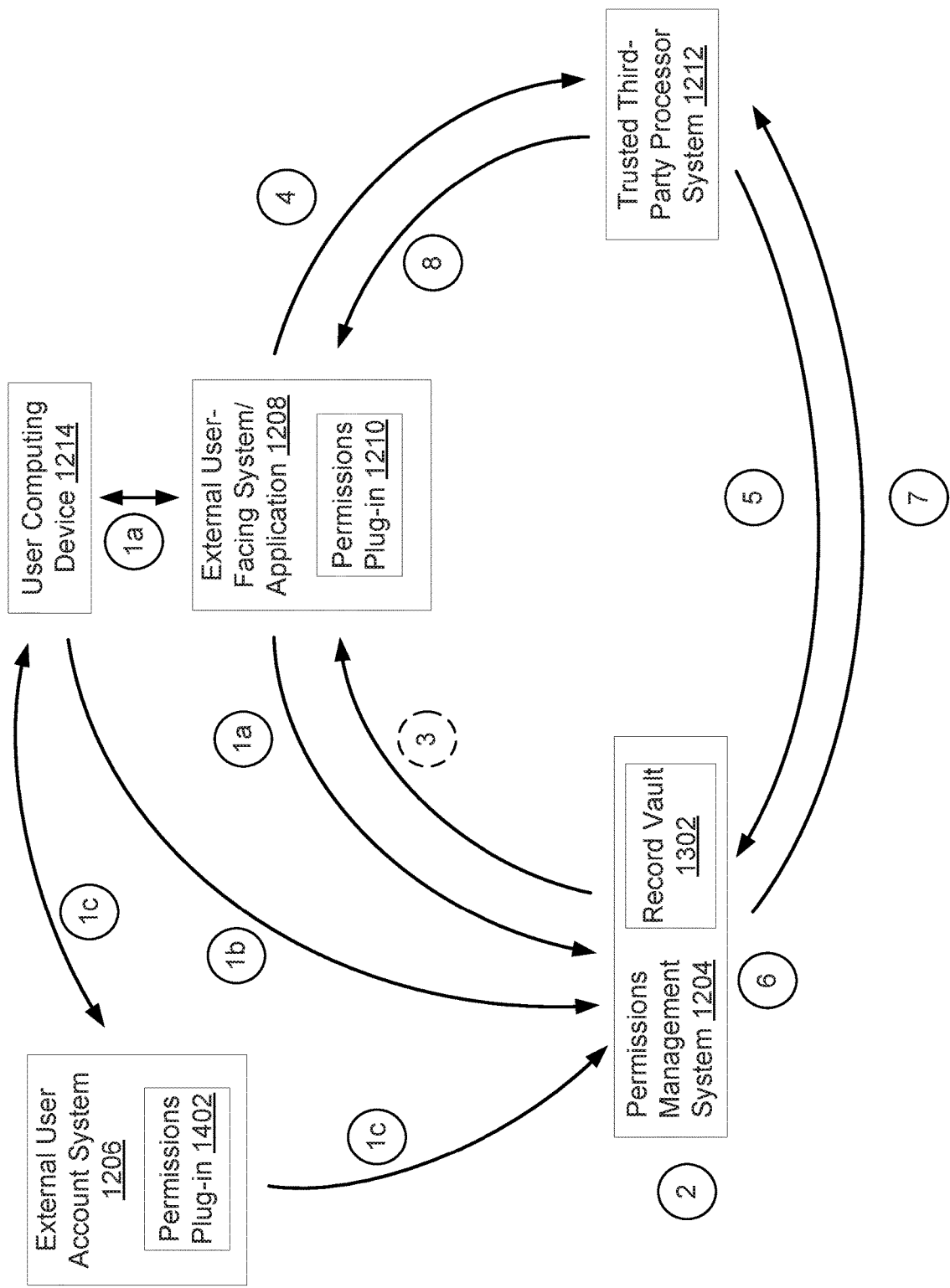

FIG. 24 is an action diagram illustrating example interactions among the aspects of the network environment 1200 by which the user may de-authorize the external user-facing system/application 1208, according to an embodiment. Each of actions 1*a*, 1*b*, and 1*c* illustrate alternative means of de-authorizing the ability of the external user-facing system/application 1208 to execute transactions with respect to the user.

In action 1*a*, the user may request, via the external user-facing system/application 1208 and the permissions plug-in 1210, de-authorization of the external user-facing system/application 1208 to execute transactions and/or access data related to the user. The request is made via communication with the permissions management system 1204 through the permissions plug-in 1210, for example.

Alternatively, in action 1*b*, the user may request, directly to the permissions management system 1204, de-authorization of the external user-facing system/application 1208 to execute transactions and/or access data related to the user (e.g., via an interactive user interface of the permissions management system 1204, via a link in an email from the permissions management system 1204, and/or the like).

In another alternative, in action c, the user may be request, via a permissions plug-in 1402 (similar to the permissions plug-in 1210) as implemented by the external user account system 1206, de-authorization of the external user-facing system/application 1208 to execute transactions and/or access data related to the user. For example, when interfacing with the external user account system 1206 via a web-based portal of the external user account system 1206, the user may have the option of requesting de-authorization of the external user-facing system/application 1208.

In action 2, the permissions management system 1204 receives the request to de-authorize the external user-facing system/application 1208, and processes the request by updating the electronic record (as stored in the record vault 1302). For example, the external user-facing system/application 1208 may delete the electronic record, may add an indication to the electronic record that the external user-facing system/application 1208 has been de-authorized, and/or may change one or more permissions associated with the electronic record.

In optional action 3, the permissions management system 1204 may notify the external user-facing system/application 1208 of the de-authorization.

Actions 4-8 illustrate actions that may take place if the external user-facing system/application 1208 attempts to initiate a transaction related to the user after de-authorization.

In action 4, the external user-facing system/application 1208 requests execution of a transaction via the trusted third-party processor system 1212, as described above, by providing at least the token and transaction details.

In action 5, the trusted third-party processor system 1212 communicates the transaction details and the token to the permissions management system 1204 to request authorization to execute the transaction requested by the external user-facing system/application 1208.

As described above, in action 6, the permissions management system 1204, using the token, accesses the electronic record related to the user and the external user-facing system/application 1208. The permissions management system 1204 then compares the transaction details to the permissions indicated by the accessed electronic record. If the electronic record does not exist, and/or the permissions indicate that the external user-facing system/application 1208 has been de-authorized, in action 7 the permissions management system 1204 communicates an indication to the trusted third-party processor system 1212 that the external user-facing system/application 1208 does not have authorization for the transaction. In action 8, the trusted third-party processor system 1212 indicates to the external user-facing system/application 1208 that it is not authorized to execute the transaction.

In an alternative not depicted in FIG. 24, the user may similarly de-authorize the external user-facing system/application 1208 via interaction with the trusted third-party processor system 1212, wherein, either via a permissions plug-in as implemented by the trusted third-party processor system 1212, or via direct communication, the permissions management system 1204 is notified of the de-authorization.

Accordingly, in various embodiments, via interaction with the permissions management system 1204, the user is enabled to de-authorize the ability of the external user-facing system/application 1208 to execute transactions. This is possible because, advantageously, user account data (e.g., account number, routing number, and/or the like) may not be shared with the external user-facing system/application 1208. Rather, the permissions management system 1204 manages authorization of the external user-facing system/application 1208 to execute transactions, and stores user account data securely.

In certain implementations, rather than completely de-authorizing the external user-facing system/application 1208, the user may alter or update one or more permissions granted to the external user-facing system/application 1208. For example, the user may change a frequency of allowed transactions, change a value of allowed transactions, and/or the like. Additionally, in certain implementations, the user may alternatively, and/or in addition, make other changes to the authorization, including choosing a different account from which funds may be withdrawn, etc.

4.8. An Alternative Example Action Diagram for Authorization

Figure 25:
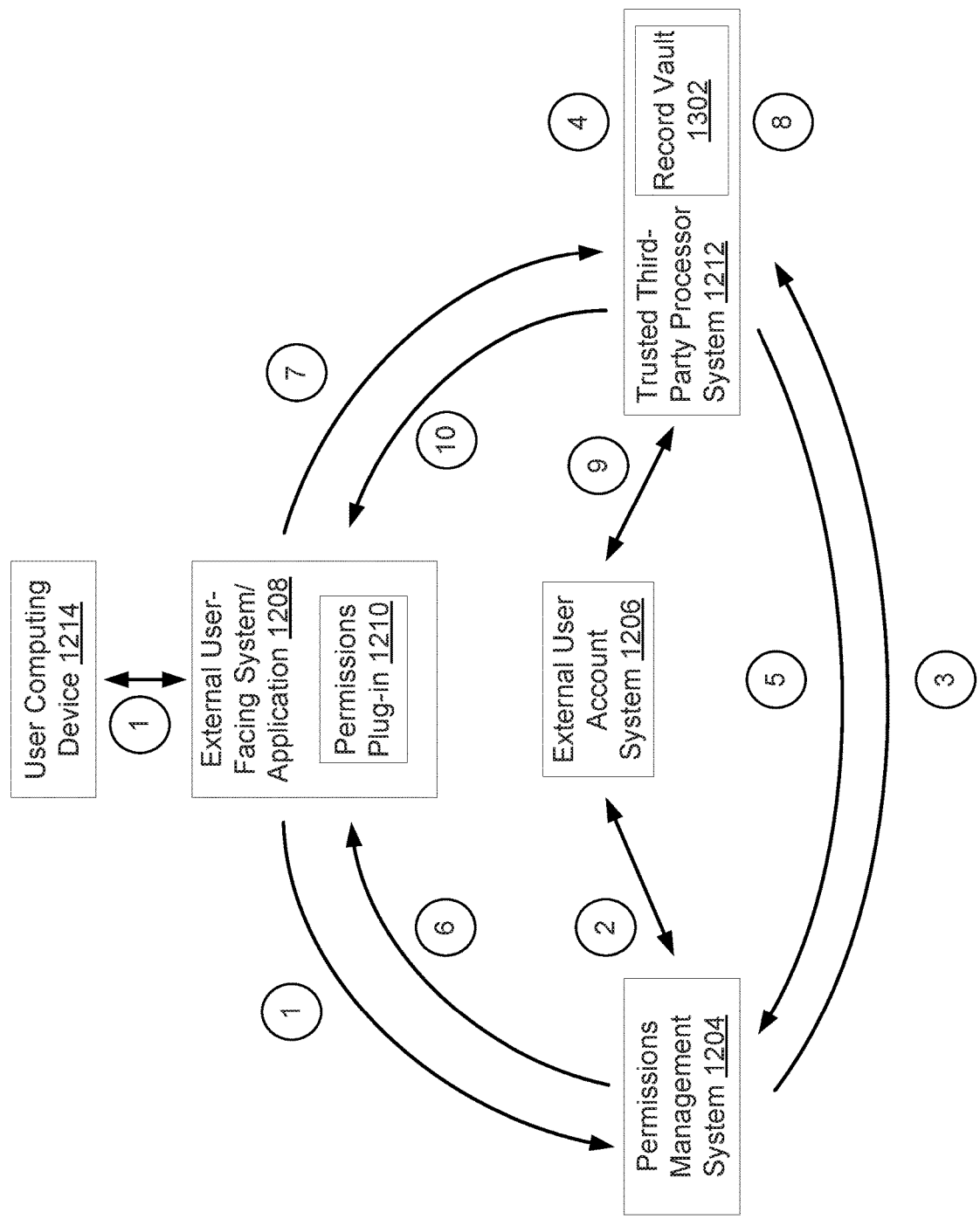

FIG. 25 is an action diagram illustrating example interactions among the aspects of the network environment 1200, according to an embodiment that is an alternative to the embodiments of FIGS. 23A-23B. As with FIGS. 23A-23B, interactions among the various aspects of the network environment 1200 (as represented in FIG. 25) enable permissioning of access to, and execution of transactions on, user accounts on the external user account system 1206 (or multiple external user account systems 1206). Further, interactions among the various aspects of the network environment 1200 enable a user to grant authorization and/or revoke authorization to access their accounts.

In action 1, the user may provide, to the permissions management system 1204, account credentials and/or other authorization for access to an account of the user. This may be accomplished similar to what is described above in reference to action 1 of FIG. 23B and/or one or more of actions 1*a*-1*c* and 2-4 of FIG. 23A.

In action 2, the permissions management system 1204 may access an account/user account data of the user, similar to what is described above in reference to action 2 of FIG. 23B and/or various actions of FIG. 23A.

In action 3, the permissions management system 1204 communicates user account data (including, e.g., account numbers, routing number, and/or the like) and other data relevant to electronic record and token creation (e.g., a client ID, a user identifier, etc.) to the trusted third-party processor system 1212.

Differing from the interactions of FIG. 23B, in the embodiment of FIG. 25 the trusted third-party processor system 1212 includes the record vault 1302. Accordingly, in action 4, the trusted third-party processor system 1212 generates an electronic record and token and stores the electronic record in the record vault 1302, similar to what is described above in reference to action 3 of FIG. 23B.

In action 5, the trusted third-party processor system 1212 communicates the token to the permissions management system 1204, and in action 6 the permissions management system 1204 communicates the token to the external user-facing system/application 1208. Alternatively, the trusted third-party processor system 1212 may communicate the token directly to the external user-facing system/application 1208.

In action 7, the external user-facing system/application 1208 may request execution of a transaction associated with the user via communication with the trusted third-party processor system 1212, similar to what is described above in reference to action 5 of FIG. 23B.

In action 8, similar to what is described above in reference to action 7 of FIG. 23B, the trusted third-party processor system 1212 may identify the electronic record in the record vault 1302 related to the token received from the external user-facing system/application 1208. The trusted third-party processor system 1212 retrieves the identified electronic record, including information related to the electronic record such as various permissions information. The trusted third-party processor system 1212 then compares the transaction details to the permissions information associated with the electronic record, and determines whether the external user-facing system/application 1208 is authorized to execute the transaction requested.

Actions 9 and 10 proceed similar to actions 9 and 10 of FIG. 23B, described above.

Alternatives described above in reference to FIGS. 23A-23B may similarly be applied to the embodiment of FIG. 25. In various embodiments, the user may de-authorize the external user-facing system/application 1208 (and/or change permissions, etc., related to the external user-facing system/application 1208) when the record vault 1302 is stored by the trusted third-party processor system 1212, in ways similar to those described above in reference to the embodiments of FIG. 24 (with the difference that, e.g., the request for de-authorization, change of permissions, account change, etc. is communicated to the trusted third-party processor system 1212, either directly, or via another aspect of the network environment 1200).

As mentioned above, secure communications between the external user-facing system/application 1208 and the permissions management system 1204 and/or the trusted third-party processor system 1212 can be accomplished via public and/or secret key exchange. Further, in various implementations, multiple tokens may be used in the actions described above. For example, the token stored by the trusted third-party processor system 1212 may differ from the token shared with the external user-facing system/application 1208 (e.g., a different unique identifier may be shared with the external user-facing system/application 1208).

In an implementation, interactions among the aspects of the network environment 1200 may proceed as follows: the permissions management system 1204 may generate a token related to account information of the user (as described above in references to various implementations); the permissions management system 1204 may send the token to the external user-facing system/application 1208 (in some implementations, this token and/or information sent to the external user-facing system/application 1208 may include account information such as an account number and a routing number); the external user-facing system/application 1208 may send a request to the trusted third-party processor system 1212 for execution of a transaction (which request may include, e.g., the token and/or other account information); the trusted third-party processor system 1212 may optionally communicate with the permissions management system 1204 to determine that the external user-facing system/application 1208 is authorized to cause the transaction to be executed (e.g., permissions may be checked, an account balance may be checked, etc.); and the trusted third-party processor system 1212 may initiate execution of the transaction (e.g., by sending a request to the external user account system 1206). In this implementation, the permissions management system 1204 may generate the token after accessing account information from the external user account system 1206 (e.g., as described herein) and/or in response to a request received from the external user-facing system/application 1208.

As mentioned above, in some implementations the system may send various types of alerts and/or other indications to a user computing device (e.g., user computing device 1214). These various types of alerts and/or other indications may activate one or more applications (e.g., an SMS (simple message service) and/or MMS (multimedia messaging service) process and/or application, an email process and/or application, a process and/or application related to the system, a first-party and/or third-party process and/or application (e.g., of an institution and/or a user-facing application/service), and/or the like) on the user computing device. In some examples, the system may send alerts to the user computing device regarding authorization and/or de-authorization of an external user-facing system/application, an attempt by an external user-facing system/application to initiate a transaction that it is not authorized to initiate (e.g., a transaction of too much value, a transaction that is too frequent, and/or the like), and/or the like. Such alerts may comprise SMS messages, email messages, and/or other types of messages that may activate various processes and/or applications, as described above. In another example, an alert may activate, e.g., an email application by which the user may select a link to de-authorize an external user-facing system/application (either automatically, or via a user interface that may be presented as a result of selecting the link).

In various embodiments certain actions may be initiated in response to certain other actions. For example, the token may be generated in response to a request from the external user-facing system/application 1208 for account information and/or execution of a transaction. In various embodiments additional aspects may be involved in executing transactions. For example, two of more processor systems or external user account systems may coordinate and/or make requests of one another to execute transactions.

4.9. Example Token Generation Methods

Figure 26A:
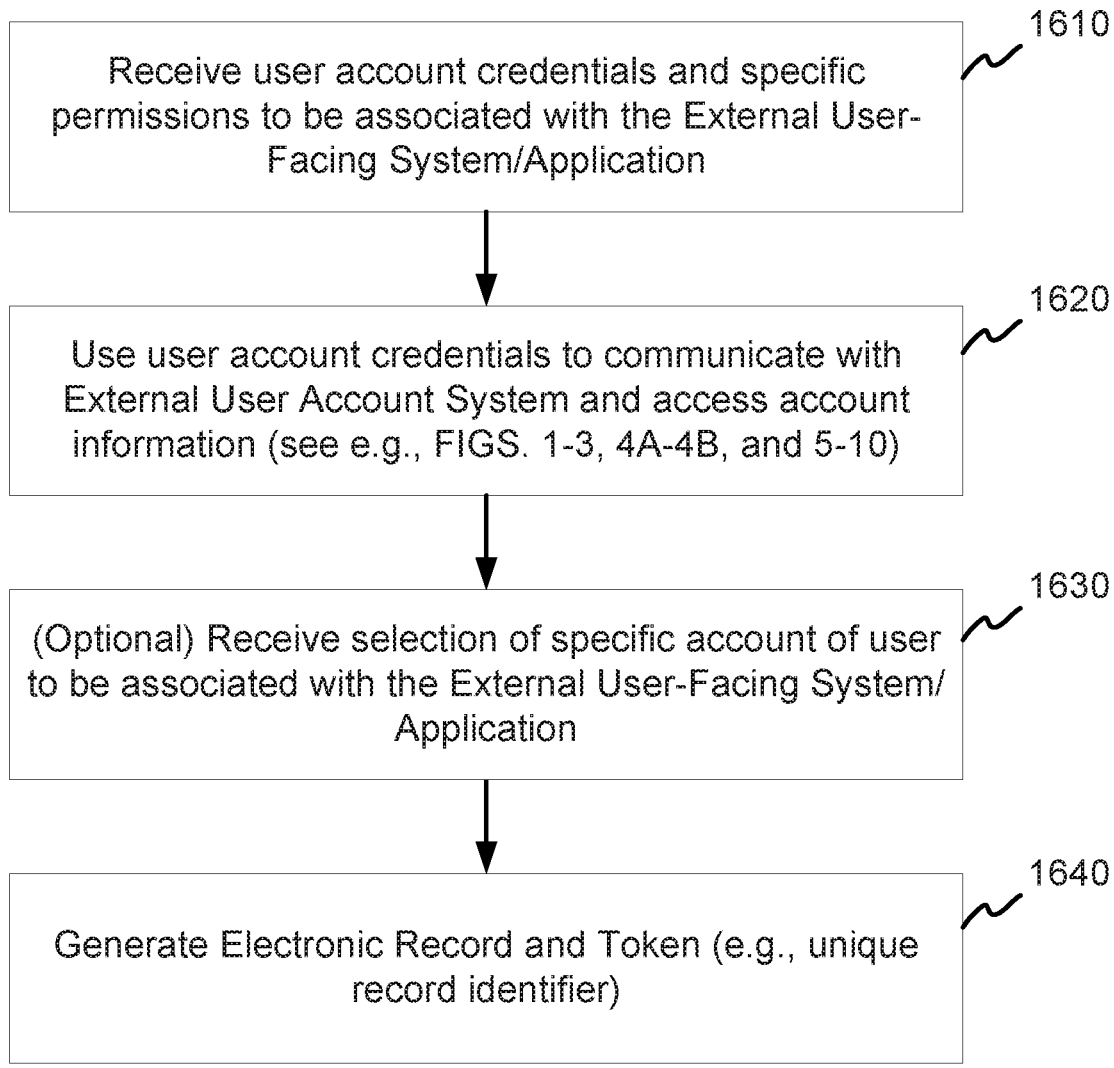
FIGS. 26A-26B are flowcharts of example methods of generating a token, according to various embodiments.

FIG. 26A is a flowchart of an example method of generating a token, according to an embodiment. For example, the method of FIG. 26A may be performed by the permissions management system 1204 in actions 2 and 3 of FIG. 23B, and/or by the permissions management system 1204 and/or the trusted third-party processor system 1212 in actions 2, 3, and 4 of FIG. 25.

At block 1610, the permissions management system 1204 receives account credentials and/or permissions to be associated with the external user-facing system/application 1208. Account credentials may include, for example, a username and password (and/or any other credential information) used by the user for logging into/accessing an account of the user at, e.g., the external user account system 1206 (and/or another institution).

At block 1620, the permissions management system 1204 uses the user account credentials to communicate with the external user account system 1206 to access user account data related to the user. As mentioned, the process of communicating with an institution system (e.g., the external user account system 1206) to obtain user account information is described above in reference to, e.g., FIGS. 11-14, 14A-14B, and 15-20. This block (and/or the 1610) may additionally involve presenting information to, and/or obtaining additional information from, the user for purposes to satisfying multi-factor authentication.

In some instances, the user may have more than one user account with the institution that is accessed. Accordingly, in optional block 1630, the permissions management system 1204 may receive, from the user, a selection of one or more of these accounts that are to be associated with the external user-facing system/application 1208. Such a selection may be obtained from the user via an interactive user interface that may be presented to the user (via, e.g., any combination of the permissions management system 1204, the permissions plug-in 1210, the external user-facing system/application 1208, and/or the user computing device 1214). An example of such a user interface is shown in FIG. 30A (which is further described below).

At block 1640, the electronic record and token that correspond to the combination of the user and the external user-facing system/application 1208 are generated. As mentioned above, in some implementations each electronic record that is generated may correspond to a single combination of a user and an external user-facing system/application. In other implementations, each electronic record may correspond to various combinations to users, developers, external user-facing systems/applications, external institution systems, and/or the like. In an implementation, there may be multiple electronic records associated with a single combination of a user and an external user-facing system/application. For example, the user may have multiple interactions (e.g., multiple accounts) with the external user-facing system/application, and may therefore desire multiple sets of permissions, or multiple user accounts (here referring to, e.g., financial accounts with external institutions) to be associated with the external user-facing system/application for different purposes. Examples of such multiple interactions may include a newsletter subscription (in which there may be multiple ongoing payments) and a one-off purchase of goods (in which there is a single purchase). Thus, two electronic records with varying levels of permission may be desired. In another implementation, multiple sets of permissions and/or multiple accounts may all be stored within a same electronic record, and may be differentiated by various appropriate identifiers.

Figure 26B:
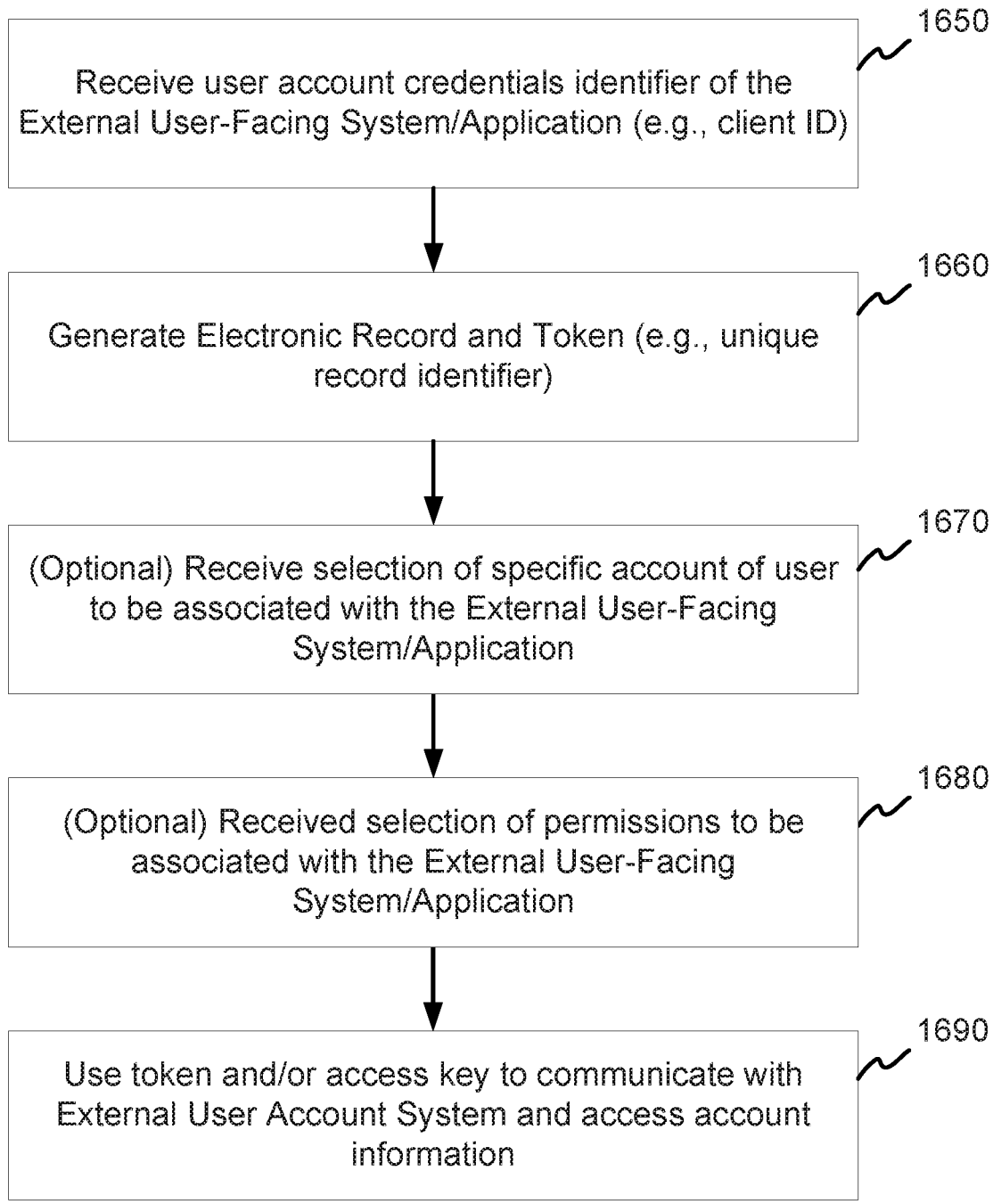

FIG. 26B is a flowchart of another example method of generating a token, according to an embodiment. For example, the method of FIG. 26B may be performed by the external user account system 1206 in actions 1a and 1b of FIG. 23A, and/or by the external user account system 1206 in action Z of FIG. 23B.

At block 1650, the external user account system 1206 receives account credentials and a client ID associated with the external user-facing system/application 1208. Account credentials may include, for example, a username and password (and/or any other credential information) used by the user for logging into/accessing an account of the user at, e.g., the external user account system 1206 (and/or another institution). In some implementations, the external user account system 1206 may also receive permissions to be associated with the external user-facing system/application 1208.

At block 1660, the external user account system 1206 generates an electronic record and token that correspond to the combination of the user and the external user-facing system/application 1208. As mentioned above, in some implementations each electronic record that is generated may correspond to a single combination of a user and an external user-facing system/application. In other implementations, each electronic record may correspond to various combinations to users, developers, external user-facing systems/applications, external institution systems, and/or the like. In an implementation, there may be multiple electronic records associated with a single combination of a user and an external user-facing system/application. For example, the user may have multiple interactions (e.g., multiple accounts) with the external user-facing system/application, and may therefore desire multiple sets of permissions, or multiple user accounts (here referring to, e.g., financial accounts with external institutions) to be associated with the external user-facing system/application for different purposes. In another implementation, multiple sets of permissions and/or multiple accounts may all be stored within a same electronic record, and may be differentiated by various appropriate identifiers.

In some instances, the user may have more than one user account with the institution that is accessed. Accordingly, in optional block 1670, the external user account system 1206 may receive, from the user, a selection of one or more of these accounts that are to be associated with the external user-facing system/application 1208. Such a selection may be obtained from the user via an interactive user interface that may be presented to the user (via, e.g., any combination of the external user account system 1206, the permissions plug-in 1210 and 1211, the external user-facing system/application 1208, and/or the user computing device 1214). An example of such a user interface is shown in FIG. 30A (which is further described below).

Similarly, in some instances the user may specify permissions and/or review documents as part of the authorization process, as described above. Accordingly, in optional block 1680, the external user account system 1206 may receive, from the user, a selection of one or more permissions and/or acceptance of one or more documents. Such selections may be obtained from the user via an interactive user interface that may be presented to the user (via, e.g., any combination of the external user account system 1206, the permissions plug-in 1210 and 1211, the external user-facing system/application 1208, and/or the user computing device 1214). Examples of such user interfaces are shown in FIGS. 29J and 30A (which are further described below).

At block 1690, the permissions management system 1204 uses the token and/or an access key to communicate with the external user account system 1206 to access user account data related to the user. The token and/or an access key provide verification with the permissions management system 1204 has the credentials or authorization to access the user account data from the user account associated with the token. In some implementations, as described above, the token may be used by the permissions management system 1204 in an initial communication with the external user account system 1206 to obtain and access key from the external user account system 1206. Alternatively, the token may be used in communications with the external user account system 1206.

Figure 27:
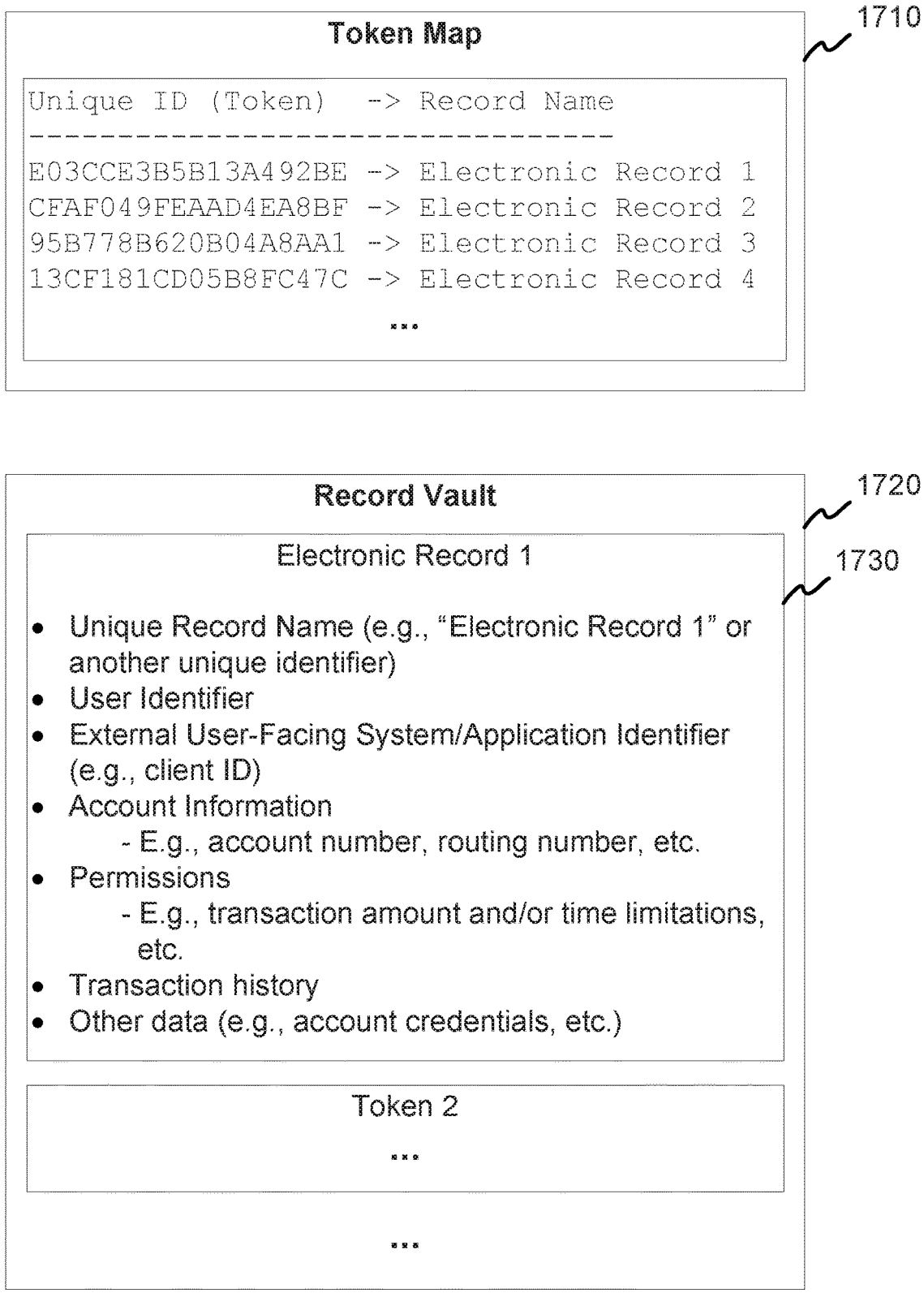
FIG. 27 illustrates examples of a token map and a record vault, according to an embodiment.

FIG. 27 illustrates examples of a token map 1710, a record vault 1720, and an electronic record 1730 that may be generated, e.g., by the permissions management system 1204 according to the method of FIG. 26A, and/or other methods/actions described herein (e.g., as described in reference to FIG. 26B). The record vault 1720 is an example of the record vault 1302 described previously. Each of the token map 1710 and the record vault 1720 may be comprised of a database, in an implementation. In some implementations, each of the token map 1710 and the record vault 1720 may comprise tables in a database, and/or may be combined into a single table/database. Advantageously, the token map 1710 and/or the record vault 1720 may be securely stored (e.g., encrypted, etc.) so as to protect the user-related data.

The record vault 1720 may include a plurality of electronic records, such as the electronic record 1730. As shown in the example of the electronic record 1730, an electronic record may include one or more of the following: a unique record name (which may be used to identify the record among the various records), a user identifier (e.g., any identifier associated with the user that provided the account credentials), a client ID (as described above), account information obtained from an external institution using the account credentials (e.g., an account number, a routing number, etc.), various permissions, and/or a transaction history. In some implementations, the electronic record may include other user account data, other data related to the user and/or the external user-facing system/application, account credentials, and/or the like.

Examples of permissions that may be stored with the electronic record include any permission related to frequency, use, time, amount, type, and/or the like. For example, in the context of financial transactions, the user may specify a limit on the amount of transactions (e.g., no more than $500), the frequency of transactions (e.g., no more than one transaction per month), the amount within a particular time frame (e.g., no more than $1000 per month), and/or any combination of these and/or other permissions.

The token map 1710 may be stored with the record vault 1720, and/or separately from the record vault 1720, and/or may be combined with the record vault 1720. The token map 1710 provides a mapping between the token (e.g., the unique record identifier) associated with each electronic record, and the unique record name. In some implementations, the token and the unique record name may be the same (e.g., such that no token map 1710 is needed). However, it may be advantageous to have a different token (e.g., unique record identifier) because, as is described above, the token is shared with other parties, including the external user-facing system/application. In the event that the token is compromised (e.g., stolen or lost), a new token may be generated, and the token map 1710 may be updated accordingly, such that the corresponding electronic record need not be regenerated. In some implementations, the unique record name and/or the token (e.g., the unique record identifier) comprised an encrypted hash of one or more items of data of the electronic record. In other implementations, the unique record name and/or the token comprised a randomly generated unique string of characters (and/or any other suitable identifier).

In some embodiments the electronic record 1730 may include a history of transactions associated with the external user-facing system/application 1208. For example, transaction details related to each transaction authorized by the system may be stored. Such history information may be used by the system to determine and/or enforce certain permissions. For example, when the permission indication a limit on frequency of transactions, the system may access the history stored with the electronic record to determine whether, for a given transaction, the frequency permission is satisfied or not. Accordingly, in some embodiments, the trusted third-party processor system 1212 may communicate with the permissions management system 1204 to indicate whether transactions are completed successfully.

4.10. Example Method Related to Permissions Plug-In

Figure 28:
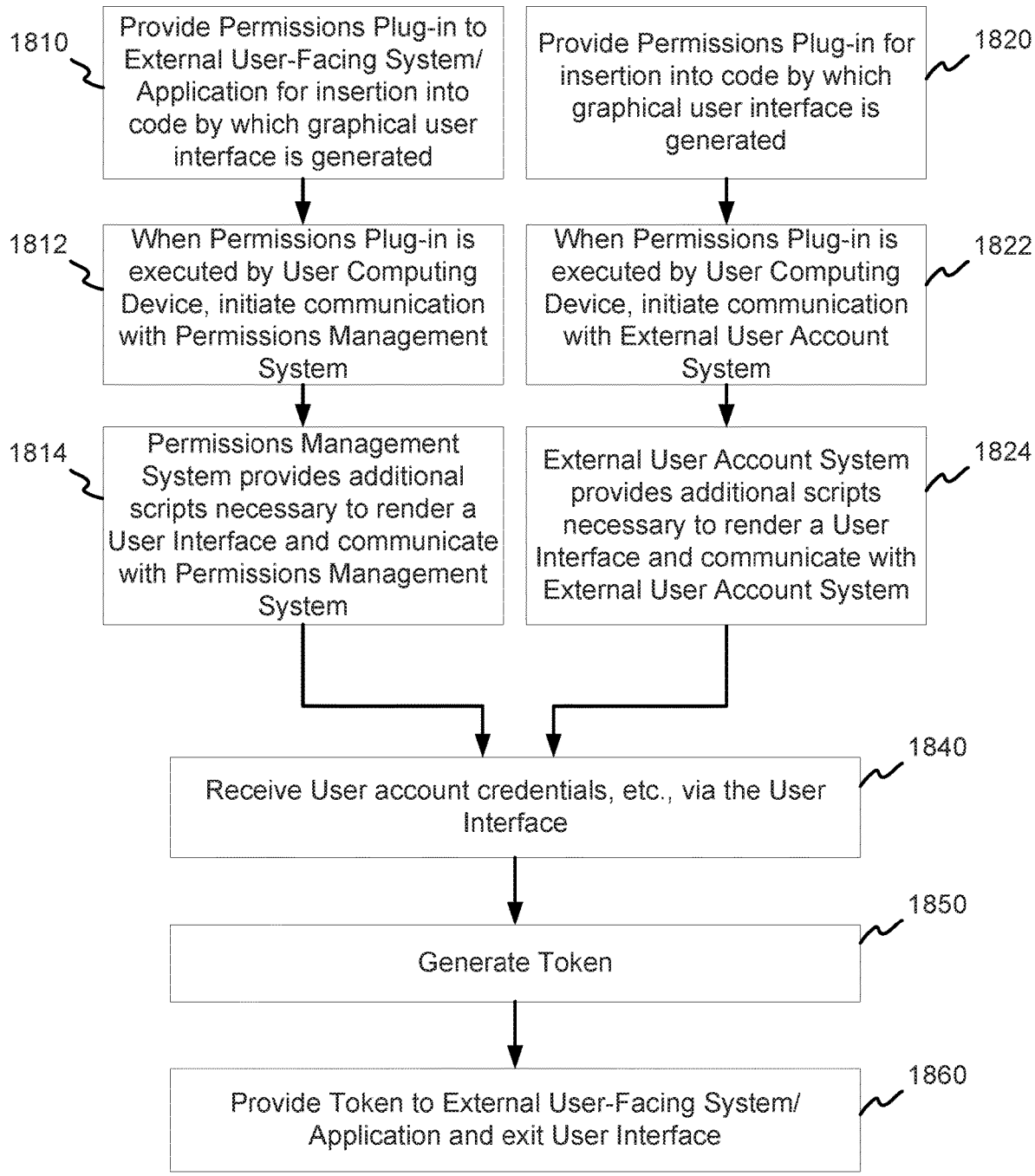
FIG. 28 is a flowchart of an example method of the system, according to an embodiment.

FIG. 28 is a flowchart of an example method of the system, and specifically an example method related to interactive user interfaces, according to an embodiment. For example, the method of FIG. 28 may be performed by the permissions plug-in 1210 and/or the permissions plug-in 1211 in actions 1*a*, 1*b*, 1*c*, 2, 3, 4, 5, and/or 6 of FIG. 23A. In another example, the method of FIG. 28 may be performed by the permissions management system 1204 and/or the permissions plug-in 1210 in actions 1, 2, and/or 3 of FIG. 23B. In yet another example, the method of FIG. 28 may be performed by a the permissions management system 1204, the permissions plug-in 1210, and/or the trusted third-party processor system 1212 in actions 1, 2, 3, and/or 4 of FIG. 25.

At block 1810, the permissions plug-in 1210 is provided to the external user-facing system/application 1208. For example, the permissions plug-in 1210 may comprise a code snippet and/or other software aspects that may be implemented (by, for example, a developer) in the external user-facing system/application 1208. In one implementation the permissions plug-in 1210 comprises one or more lines of JavaScript that, when executed by, e.g., a web browser, executes various software functions.

At block 1812, when the permissions plug-in 1210 is executed by, e.g., the user computing device 1214 (e.g., when executed by a web browser of the user computing device 1214), the permissions plug-in 1210 initiates communication with the permissions management system 1204. Advantageously, communication between the permissions plug-in 1210 and the permissions management system 1204 may be secure (e.g., encrypted) such that the external user-facing system/application 1208 may not intercept or access the communication. This may be enabled by, for example, the permissions plug-in 1210 executing on the user's device, rather than directly on the external user-facing system/application 1208.

Optionally, at block 1814, the permissions plug-in 1210 may request additional scripts or other software aspects from the permissions management system 1204. Alternatively, the permissions plug-in 1210 may include all necessary software aspects without needing to receive additional data from the permissions management system 1204. In response, the permissions management system 1204 may provide the requested data to the permissions plug-in 1210.

In an alternative to blocks 1810, 1812, and 1814, the method may proceed with blocks 1820, 1822, and 1824 (for example, as described in reference to FIG. 23A above).

At block 1820, similar to block 1810, the permissions plug-ins 1210 and/or 1211 are provided to the external user-facing system/application 1208 and/or the user computing device 1214. For example, the permissions plug-ins 1210 and/or 1211 may comprise a code snippet and/or other software aspects that may be implemented (by, for example, a developer) in the external user-facing system/application 1208. In one implementation the permissions plug-in 1210 and/or 1211 comprise one or more lines of JavaScript that, when executed by, e.g., a web browser, executes various software functions.

At block 1822, when the permissions plug-ins 1210 and/or 1211 are executed by, e.g., the user computing device 1214 (e.g., when executed by a web browser of the user computing device 1214), the permissions plug-ins 1210 and/or 1211 initiates communication with the external user account system 1206. Advantageously, communication between the permissions plug-ins and the external user account system 1206 may be secure (e.g., encrypted) such that the external user-facing system/application 1208 and the permissions management system 1204 may not intercept or access the communication. This may be enabled by, for example, the permissions plug-ins 1210 and/or 1211 executing on the user's device, rather than directly on the external user-facing system/application 1208.

In some implementations, at block 1824, when the permissions plug-ins 1210 and/or 1211 are executed, additional scripts or other software aspects may be requested from the external user account system 1206. Alternatively, the permissions plug-ins 1210 and/or 1211 may include all necessary software aspects without needing to receive additional data from the external user account system 1206. In response, the external user account system 1206 may provide the requested data to the permissions plug-ins 1210 and/or 1211.

At block 1840, the permissions plug-in may generate an interactive user interface that may be displayed to the user, and through which information may be presented and received. Examples of such user interfaces are described below in reference to FIGS. 29A-29J and 30A-30C. Account credentials, for example, received from the user, may then be communicated to the permissions management system 1204 (in addition to other items of information, as described herein). In some implementations, when the permissions plug-ins are executed, the user interface may be redirected to a page or interface directly managed by the external user account system 1206 (e.g., providing a direct way to provide account credentials to the external user account system 1206).

At block 1850, the token is generated by using the received account credentials (and other information). Token generation is described in detail herein, including, e.g., in reference to FIGS. 26A-26B.

At block 1860, the token generated by the permissions management system 1204 and/or the external user account system 1206 is communicated to the external user-facing system/application 1208, either directly, via the permissions plug-in 1210, and/or via the permissions management system 1204 (as described above in reference to FIG. 26A). Additionally, the interactive user interface may be exited in this block. In some instances the interactive user interface may be kept open with the user until the completion of the generation of the token, while in other instances it may not, depending on the implementation and the information needed from the user.

The various interactive user interfaces described herein may, in various embodiments, be generated by any of the aspects of the system (e.g., the system 100 and/or the permissions management system 1204 (which is itself an implementation of the system 100), the permissions plug-ins 1210 or 1211, the external user account system 1206, a user device, and/or the like). For example, as mentioned below, in some implementations user interface data may be generated by an aspect (e.g., the permissions management system 1204), and may be transmitted via one or more other aspects to a computing device of the user (e.g., the user computing device 1214, such as a smartphone) where the user interface data may be rendered so as to display a user interface to the user. Alternatively, the interactive user interfaces may be generated by the system (e.g., the permissions management system 1204) and accessed by the user on other suitable ways.

4.11 Example User Interfaces of the System

FIGS. 29A-29J and 30A-30C illustrate example interactive user interfaces of the system, according to various embodiments, each of which may support aspects of the functionality described above.

Figure 29A:
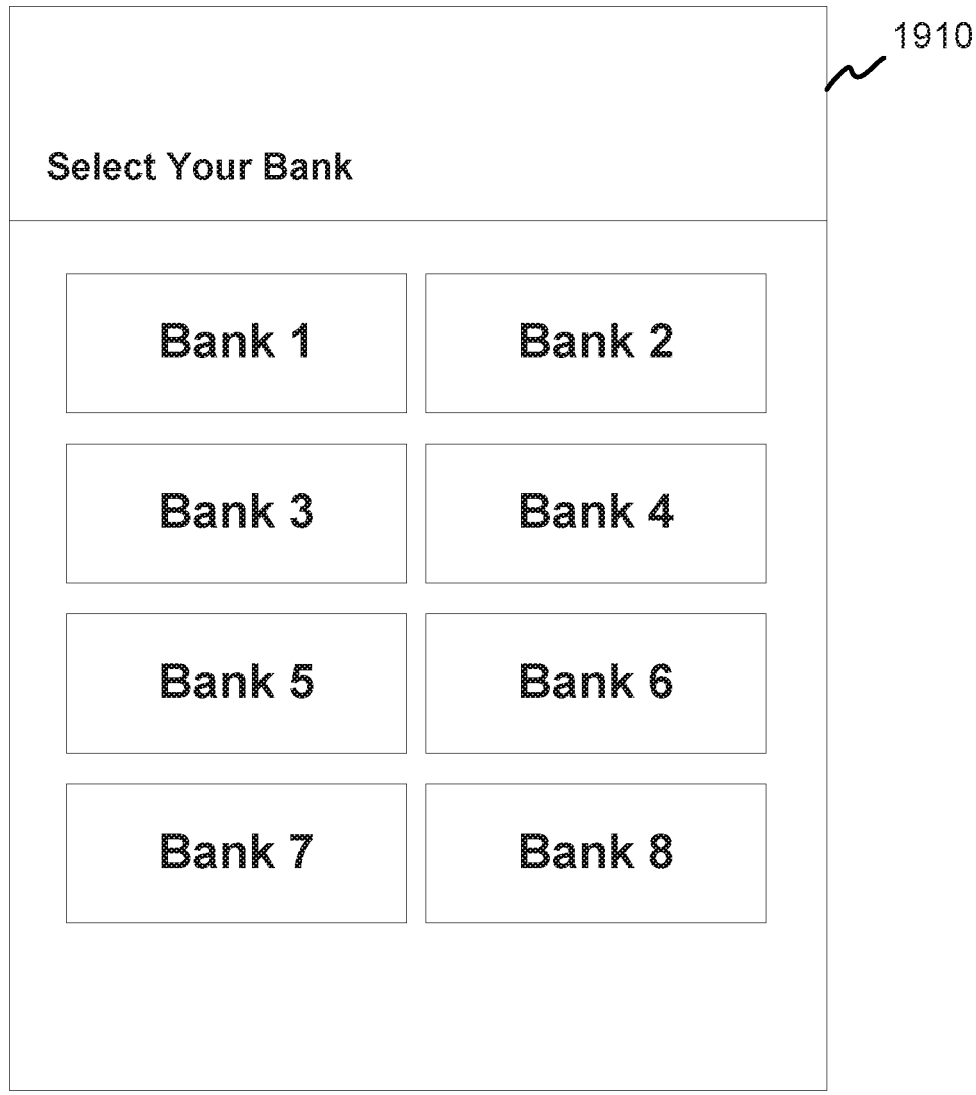

FIG. 29A illustrates an initial user interface 1910 that may be displayed to a user in response to the user indicating that they would like to initiate a transaction and/or authorize an external user-facing system/application to access/execute transactions related to a user account. As shown, the user interface 1910 may include multiple banks (or other institutions) from which the user may select. For example, the user may select an institution at which they have an account that they would like to authorize access to.

Figure 29B:
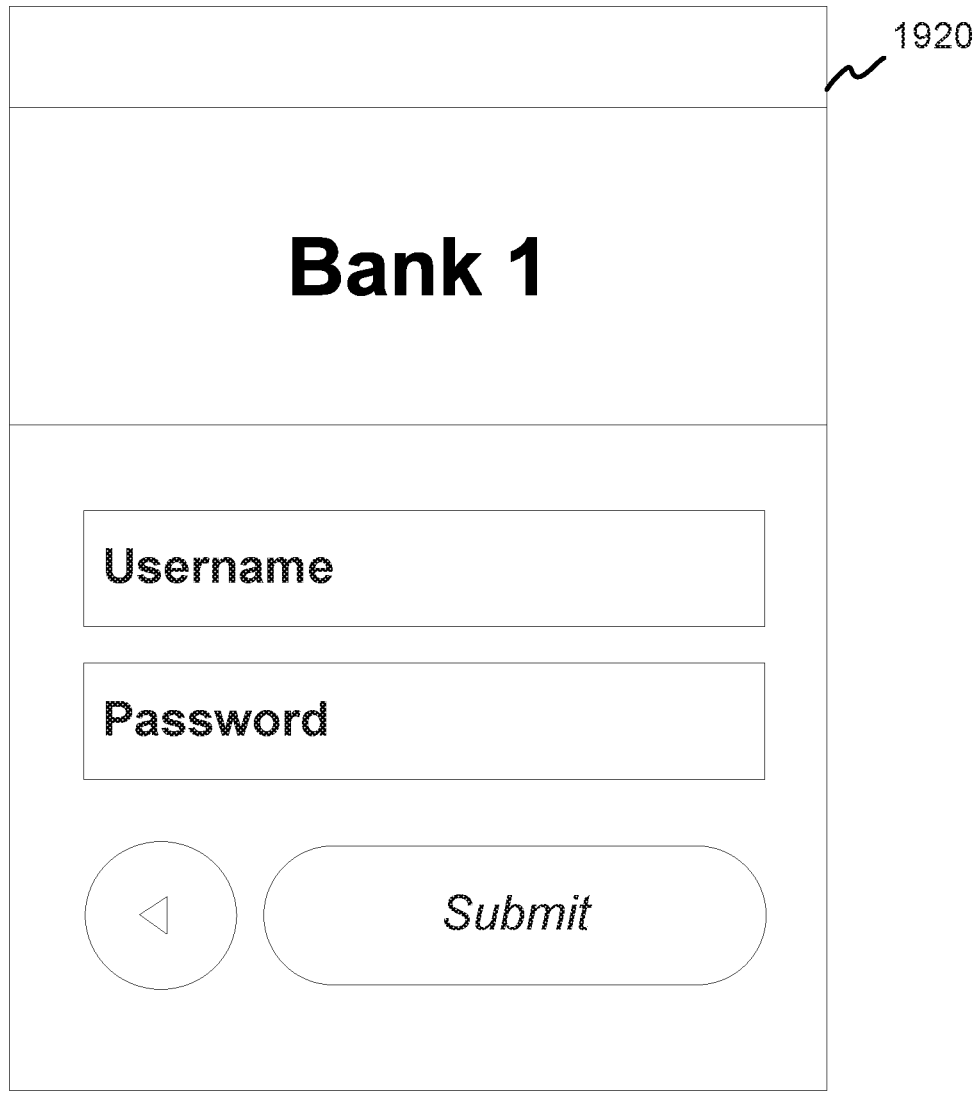

Upon selection of an institution, user interface 1920 of FIG. 29B may be displayed to the user. Via the user interface 1920 the user may enter their account credentials and select a "submit" button to continue.

Figure 29C:
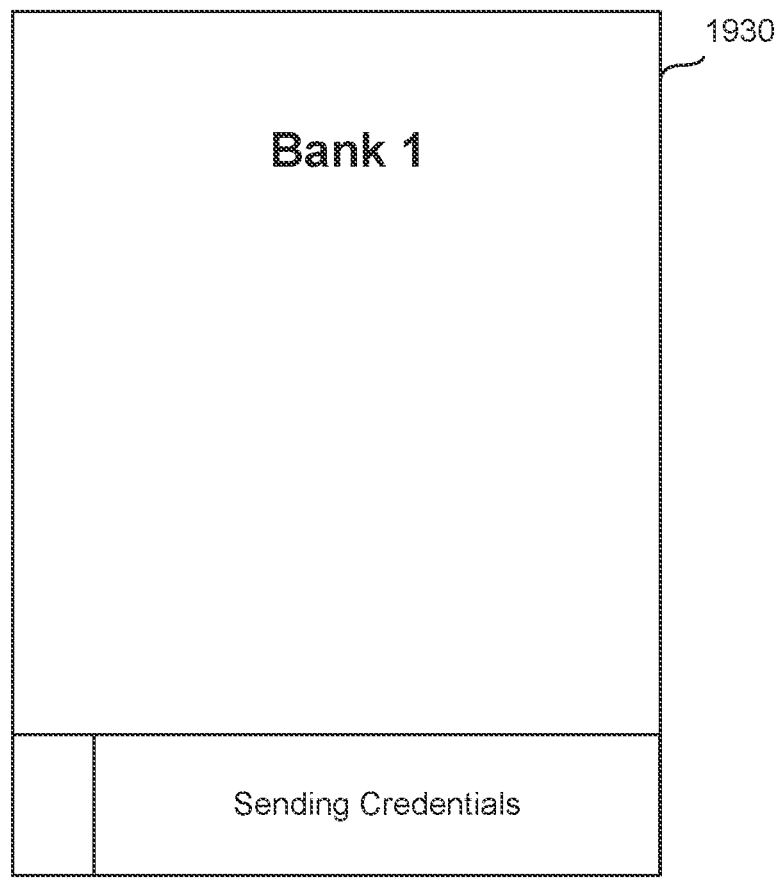
Figure 29D:
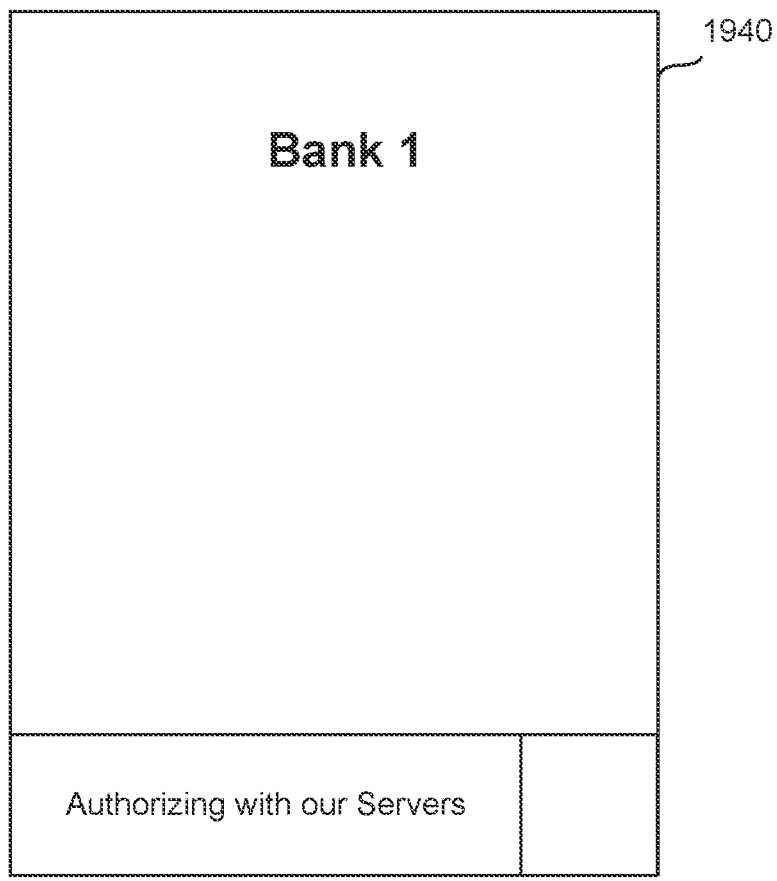

Upon providing such account credentials, user interface 1930 of FIG. 29C may be displayed to the user, indicating that the credentials are being communicated to the permissions management system 1204. Further, as the process progresses, the user interface may be updated in an animated way to indicate such progress. For example, user interface 1940 of FIG. 29D may be displayed while user account information is obtained from the institution.

Figure 29E:
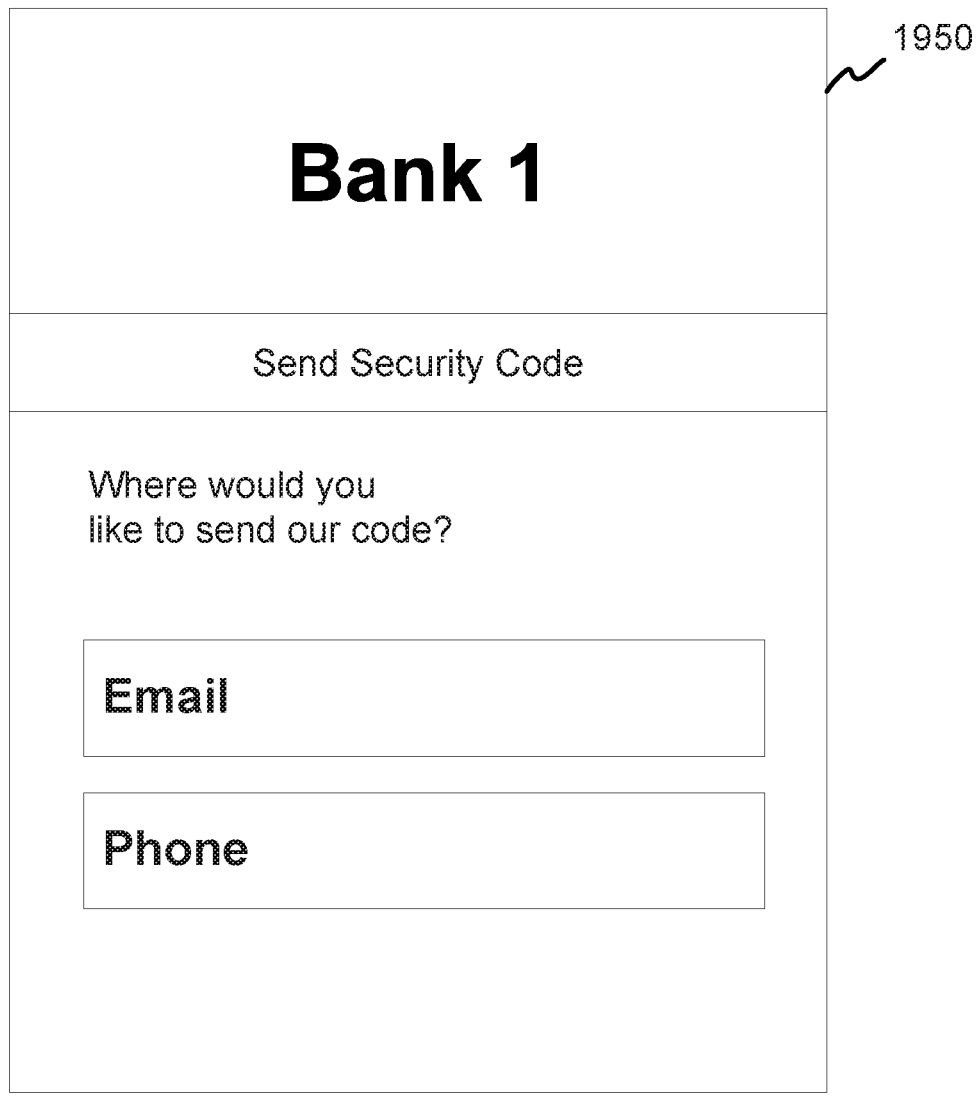
Figure 29F:
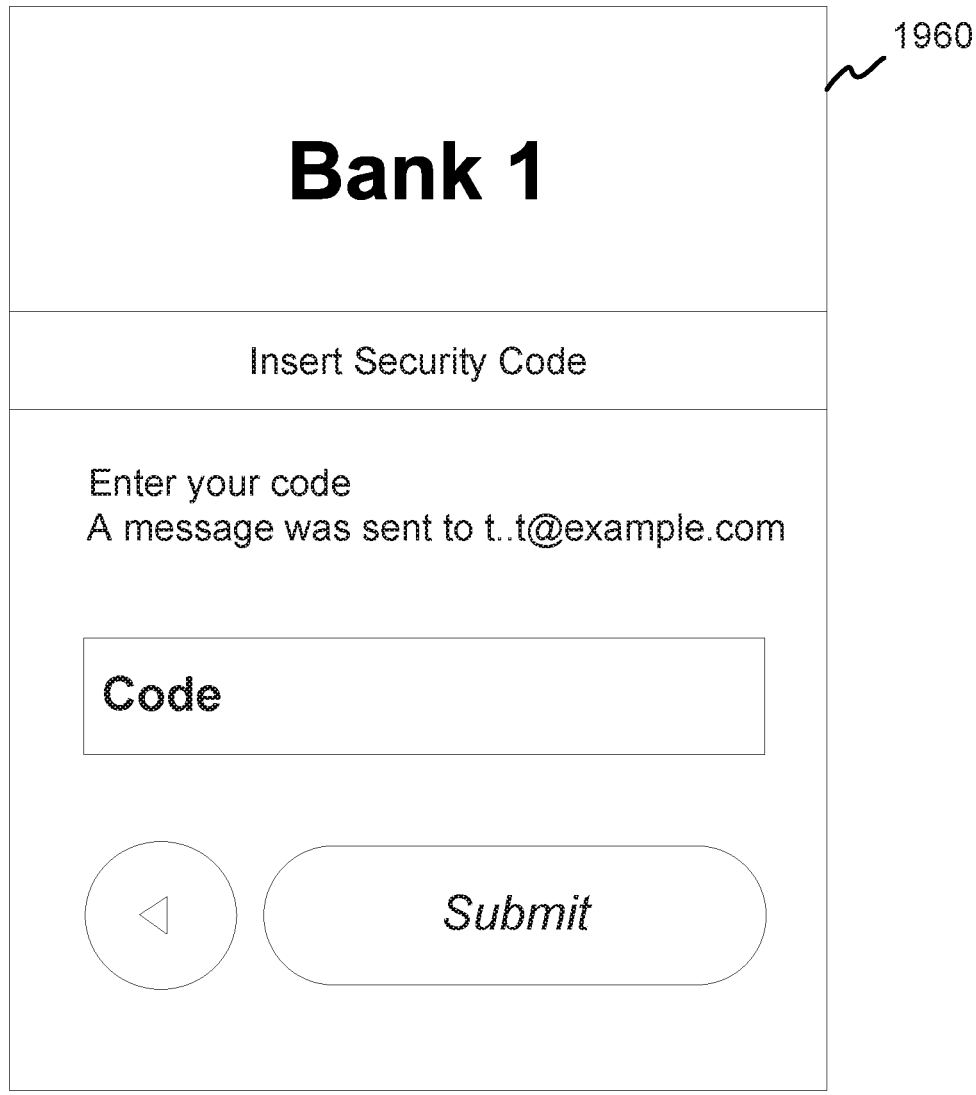
Figure 29G:
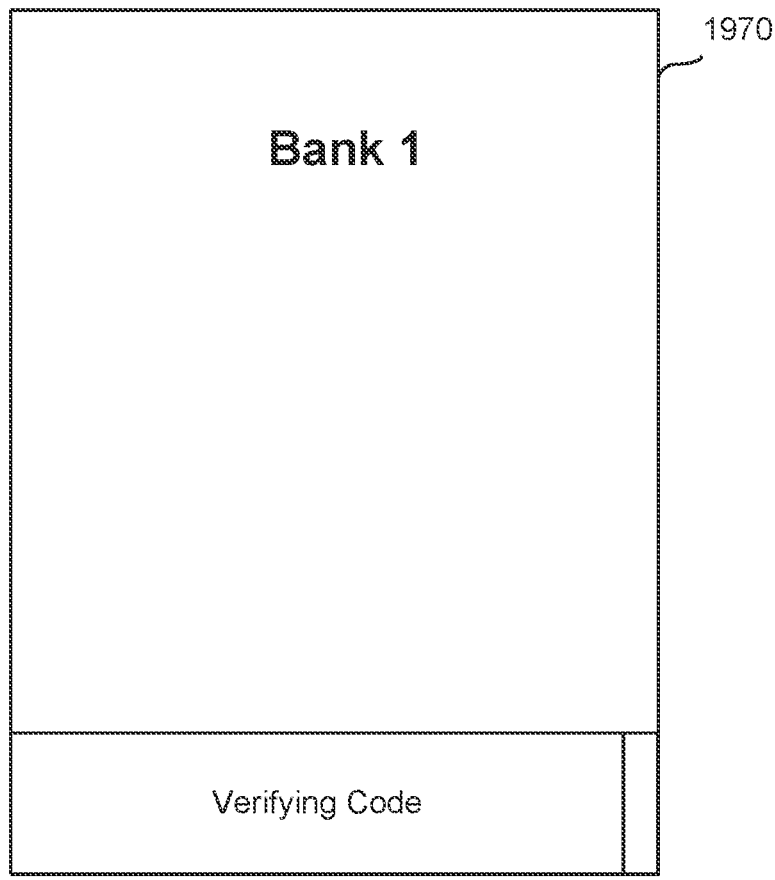

In the event that multi-factor authentication information is needed, other user interfaces such as user interfaces 1950, 1960, and 1970 of FIGS. 29E, 29F, and 25G (or other suitable user interfaces) may be displayed to obtain such information and indicate progression of the process.

Figure 29H:
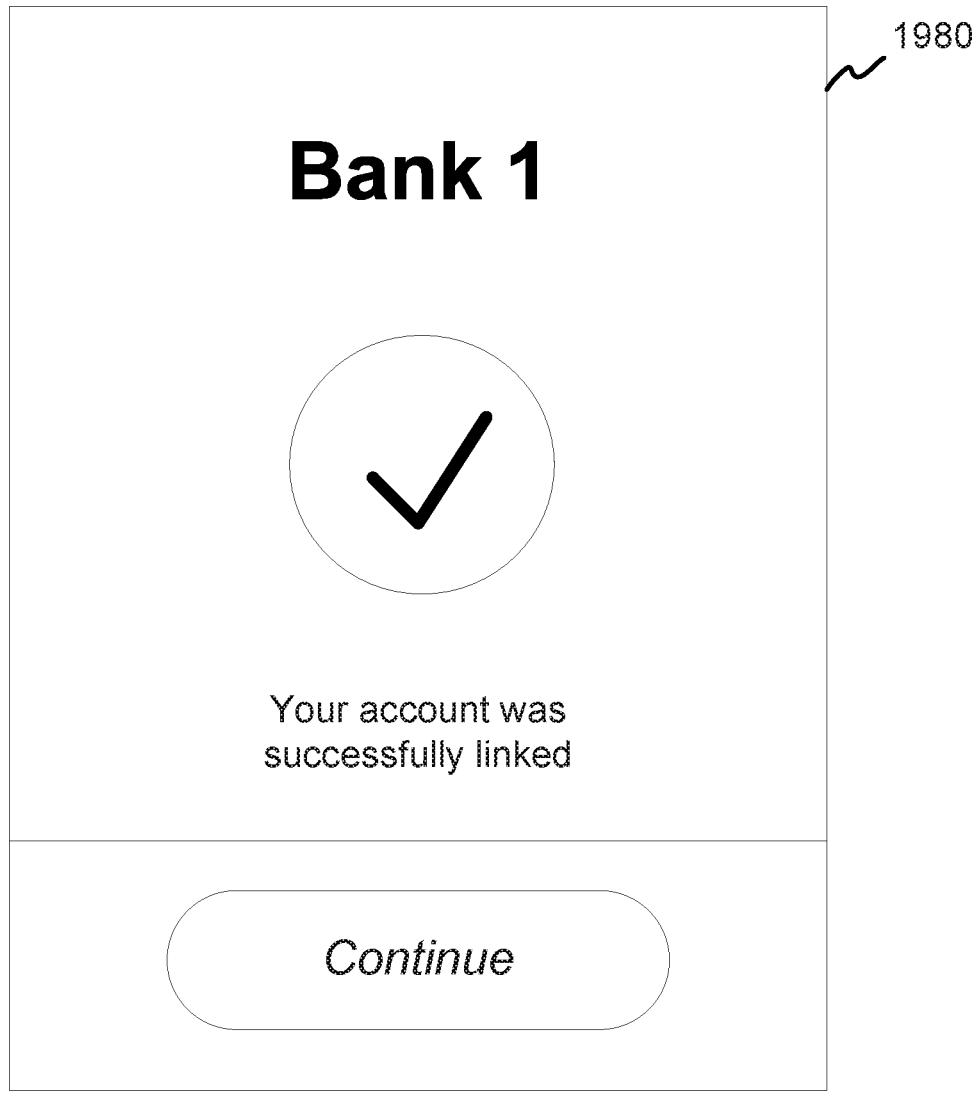

When access has been determined, user interface 1980 of FIG. 29H may be displayed to the user.

At this point, in certain implementations, the token may be automatically generated and the user interface may be closed. However, in other implementations the user may further select a specific account from the institution, review documents provided by the institution, and/or provide permissions information.

Figure 29I:
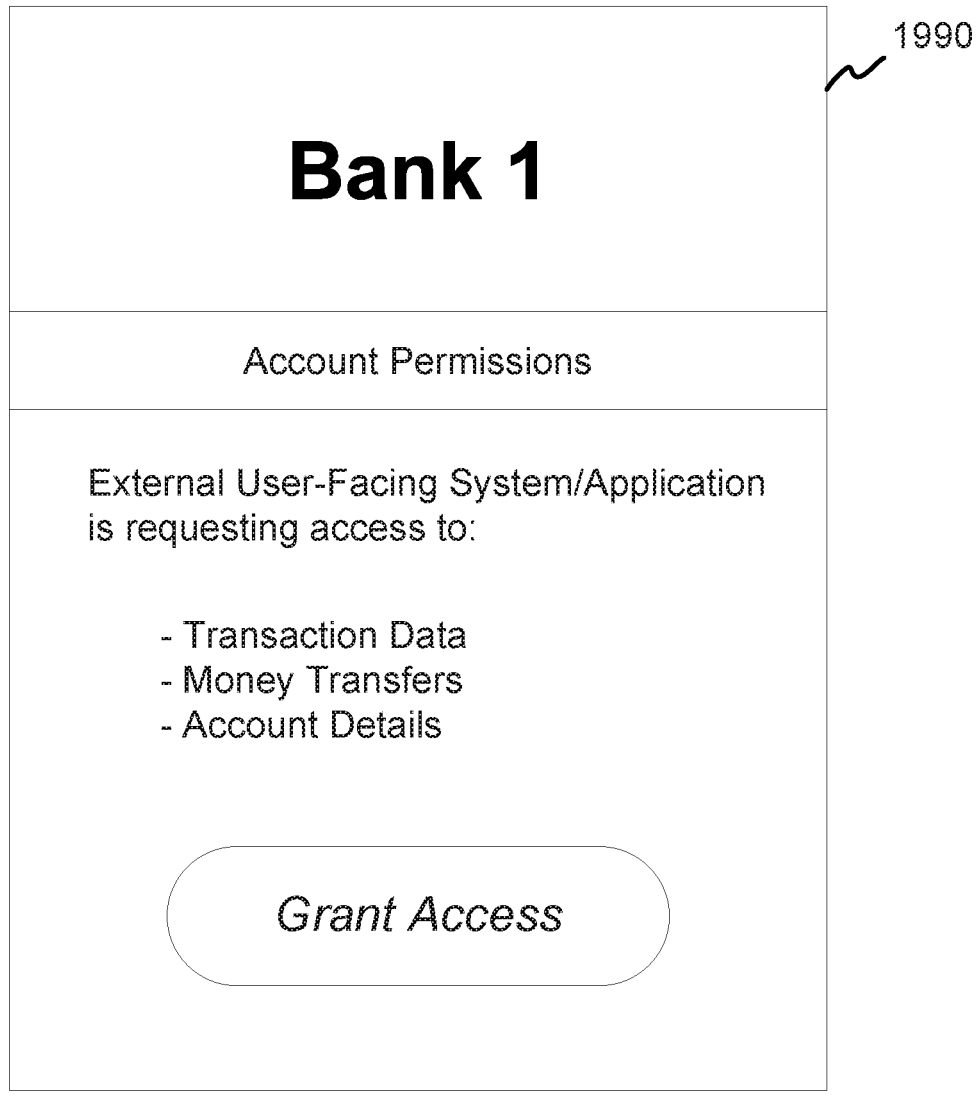
Figure 29J:
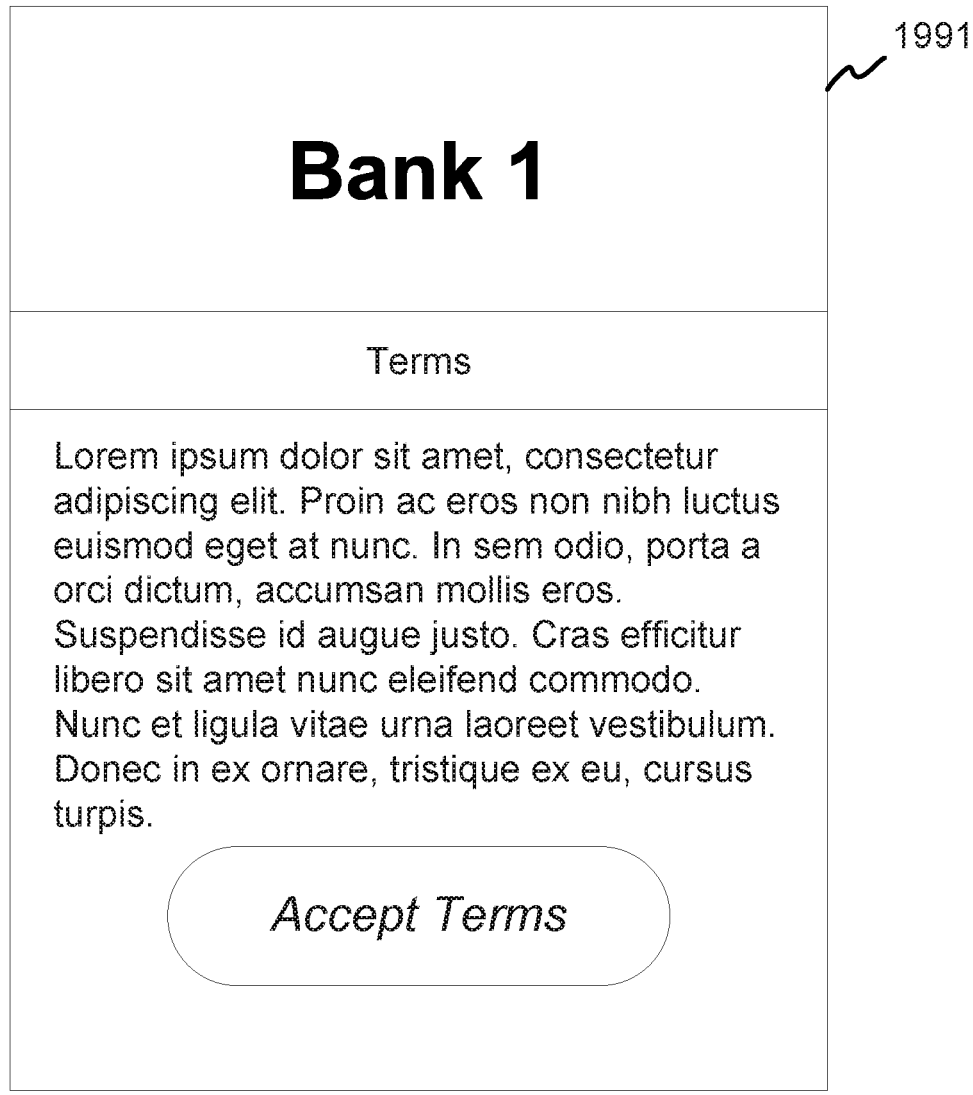

For example, user interface 1990 of FIG. 29I may be displayed to the user to allow the used to review and/or provide permissions to the external user-facing system/application. In another example, user interface 1991 of FIG. 29J may be displayed to the user to allow the user to review and/or accept terms and conditions or review other documents provided by the external user account system.

In yet another example, user interface 2010 of FIG. 30A may be displayed to the user, and may list each account of the user from the institution. As shown, various items of information related to the accounts may be displayed. The user may select a button, such as button 2020 to indicate selection of a particular account to authorize/associate with the external user-facing system/application. Further, as mentioned, upon selection of an account, the user may indicate particular permissions associated with that authorization via a similar user interface.

User interface 2030 of FIG. 30B shows an example user interface by which the user may de-authorize an account (as described above in reference to FIG. 24). For example, the user interface 2030 may indicate all accounts (or tokens) associated with a particular external user-facing system/application, and allow the user to de-authorize the external user-facing system/application by, for example, selection of button 2040. Further, as mentioned, the user may also optionally change particular permissions associated with the authorized account(s) via a similar user interface. Using button 2042, the user may de-authorize the external user-facing system/application from accessing data for all listed accounts.

User interface 2050 of FIG. 30C may be displayed to the user, and similar to user interface 2010 of FIG. 30A, may list each account of the user from the institution. As with user interface 2010, user interface 2050 may include various items of information related to the accounts. The user may select a button, such as button 2052 to indicate selection of a particular account to authorize/associate with the external user-facing system/application. For example, the user may authorize the external user-facing system/application to access data associated with each account, for example, to use the data with the external user-facing system/application. Further, as mentioned, upon selection of an account, the user may indicate particular permissions associated with that authorization via a similar user interface. In another example, the user may select button 2054 to authorize access to data from all the accounts by the external user-facing system/application.

In various implementations, the user interfaces of FIGS. 29A-29I and 20A-20C may be displayed in orders different from the order shown and described.

In some implementations, one or more of the user interfaces of the system may comprise popups that overlay other user interfaces of the external user-facing system/application. In other implementations, one or more of the user interfaces of the system are integrated with user interfaces of the external user-facing system/application such that a user may not be able to distinguish the user interfaces of the system from the user interfaces of the external user-facing system/application. In yet other implementations, one or more of the user interfaces of the system may be generated on the user computing device.

4.12 Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes that come within the meaning and range of equivalency of the claims are to be embraced within their scope.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A computer-implemented method for digital authentication with an external account service comprising:
   receiving, by a device of an account linking computing service, a request to establish an account link for a first application of a plurality of applications,
      wherein the account linking computing service provides a proxy service that simulates the plurality of applications and facilitates interaction between the plurality of applications and one or more external account services including the external account service;
   establishing, by the device, the account link to a user account of the external account service using user credentials collected through an application client of a first application context;
   receiving, by the device, user identifying information of the first application context and storing the user identifying information in association with the account link;
   receiving, by the device, user identifying information of a second application context for a second application of the plurality of applications, wherein the second application is an independent application from the first application operable on a computing device;
   searching and identifying, by the device, a candidate account link using the user identifying information of the second application context;
   verifying, by the device, eligibility for access to the account link based on verification of association of the user identifying information of the second application context and the user identifying information of the first application context;
   permitting, by the device and upon successful verification of eligibility, access to the account link in the second application context without collecting the user credentials of the user account; and
   establishing, by the device and in response to failing to verify eligibility, the account link to the user account using user credentials collected via the application client of the second application context.

2. The method of claim 1, wherein establishing the account link to the user account comprises:
   serving an authentication module to an application client of the first application context;
   collecting authentication credentials from the authentication module;
   performing an authentication process with the external account service using account credentials; and
   storing the account credentials as part of a secure data store of the account link in response to successful authentication with the accounts service.

3. The method of claim 2, wherein performing the authentication process with the external account service comprises authenticating with the external account service with a virtualized instance of an application as a form of virtualized authentication.

4. The method of claim 1, further comprising, within the first application context, storing user identifying information with an association to the account link, wherein the user identifying information comprises at least a phone number,
   wherein verifying eligibility for access to the account link comprises performing one-time passcode verification with the phone number.

5. The method of claim 4, wherein verifying eligibility for access to the account link comprises verifying a second eligibility condition.

6. The method of claim 5, wherein verifying the second eligibility condition comprises requesting phone number change information from a phone carrier data application programming interface and indicating success of the second eligibility condition if the phone number is indicated to not have changed in a defined time window.

7. The method of claim 5, wherein receiving user identifying information of the first application context comprises receiving a first device profile of a first application client,
   wherein receiving user identifying information in the second application context comprises receiving a second device profile of a second application client, and
   wherein verifying the second eligibility condition comprises confirming a match of the first device profile and the second device profile.

8. The method of claim 1, further comprising:
   receiving, within the first application context, confirmation of an account service application client instantiated on a user device of the user;
   initiating, if there is an available account service application client for the user, user verification through the account service application client; and
   receiving confirmation of user verification from the external account service.

9. The method of claim 1, wherein establishing the account link to the user account comprises serving a first instance of an authentication module and storing a cookie through the authentication module, wherein the method further comprises serving, within the second application context, a second instance of an authentication module, and wherein receiving user identifying information of the second application context comprises reading the cookie from the second instance of the authentication module.

10. The method of claim 1, wherein the external account service is a financial account service with transaction data of the user account, wherein the method further comprises receiving, within the second application context, transaction information from a second application, and wherein verifying eligibility for access to the account link comprises querying the external account service through the account link and confirming the transaction information in the transaction data of the user account.

11. The method of claim 1, further comprising:

receiving, within the second application context, an account link access request that includes a set of requested access permissions, wherein verifying eligibility for access to the account link comprises for a first set of access permissions verifying a first set of eligibility conditions and for a second set of access permissions verifying a second set of eligibility conditions.

12. The method of claim 1, wherein the account linking computing service performs at least one of:

providing access to application programming interfaces (APIs) associated with the external account service, or providing a virtualized application instance associated with an institution of the external account service.

13. A non-transitory computer-readable medium storing instructions that, when executed by one or more computer processors of a communication platform, cause the communication platform to:

receive a request to establish an account link for a first application of a plurality of applications, wherein the communication platform provides a proxy service that simulates the plurality of applications and facilitates interaction between the plurality of applications and one or more external account services;

establish the account link to a user account of an external account service, of the one or more external account services, using user credentials collected through an application client of a first application context;

receive user identifying information of a first application context and storing the user identifying information in association with the account link;

receive user identifying information of a second application context for a second application of the plurality of applications, wherein the second application is an independent application from the first application operable on a computing device;

search and identify a candidate account link using the user identifying information of the second application context;

verify eligibility for access to the account link based on verification of association of the user identifying information of the second application context and the user identifying information of the first application context;

permit, upon successful verification of eligibility, access to the account link; and establish, in response to failing to verify eligibility, the account link to the user account of the account service using user credentials collected from the application client of the second application context.

14. The non-transitory computer-readable medium of claim 13, wherein establishing the account link to the user account comprises:

serving an authentication module to an application client of the first application context;

collecting authentication credentials from the authentication module;

performing an authentication process with the account service using the account credentials; and storing the account credentials as part of a secure data store of the account link in response to successful authentication with the accounts service.

15. The non-transitory computer-readable medium of claim 14, wherein the one or more instructions, when establishing the account link to the user account further cause the communication platform to serve a first instance of an authentication module and store a cookie through the authentication module, wherein the one or more instructions further cause the communication platform to serve a second instance of an authentication module, and wherein the one or more instructions, when receiving user identifying information of the second application context, further cause the communication platform to read the cookie from the second instance of the authentication module and use the cookie as verification if phone number is not available.

16. The non-transitory computer-readable medium of claim 13, wherein the one or more instructions further cause the communication platform to store, within the first application context, user identifying information with an association to the account link, wherein the user identifying information comprises at least a phone number, and wherein verifying eligibility for access to the account link comprises performing one-time passcode verification with the phone number.

17. A system comprising:

one or more memories; and one or more processors, associated with an account-linking service, configured to:

receive a request to establish an account link for a first application of a plurality of applications, wherein the account-linking service provides a proxy service that simulates the plurality of applications and facilitates interaction between the plurality of applications and one or more account services;

establish the account link to a user account of an account service, of the one or more account services, using user credentials collected through an application client of a first application context;

receive user identifying information of a first application context and storing the user identifying information in association with the account link;

receive user identifying information of a second application context for a second application of the plurality of applications, wherein the second application is an independent application from the first application operable on a computing device;

search and identify a candidate account link using the user identifying information of the second application context;

verify eligibility for access to the account link based on verification of association of the user identifying information of the second application context and the user identifying information of the first application context;

permit, based on successful verification of eligibility, access to the account link; and establish, in response to failing to verify eligibility, the account link to the user account of the account service using user credentials collected from the application client of the second application context.

18. The system of claim 17, wherein establishing the account link to the user account comprises:

serving an authentication module to the application client of the first application context;

collecting authentication credentials from the authentication module;

performing an authentication process with the account service using the account credentials; and storing the account credentials as part of a secure data store of the account link in response to successful authentication with the accounts service.

19. The system of claim 17, further comprising, within the first application context, storing user identifying information, with an association to the account link, wherein the user identifying information comprises at least a phone number; and wherein verifying eligibility for access to the account link comprises performing one-time passcode verification with the phone number.

20. The system of claim 19, wherein establishing the account link to the user account comprises serving a first instance of an authentication module and storing a cookie through the authentication module, wherein a second instance of an authentication module is served within the second application context, and wherein receiving user identifying information of the second application context comprises reading the cookie from the second instance of the authentication module and using the cookie as verification if phone number is not available.

\* \* \* \* \*